United States Patent [19]

Yuasa et al.

[11] Patent Number: 4,575,225
[45] Date of Patent: Mar. 11, 1986

[54] COLOR ENLARGER

[75] Inventors: Yoshio Yuasa, Kawachinagano; Hidetoshi Yasumoto, Tondabayashi; Kazuhiko Naruse, Nabari; Nobukazu Kawagoe, Sakai; Masahito Inaba, Ikeda, all of Japan

[73] Assignee: Minolta Camera Kabushiki Kaisha, Osaka, Japan

[21] Appl. No.: 532,718

[22] Filed: Sep. 14, 1983

[30] Foreign Application Priority Data

Sep. 16, 1982 [JP] Japan .................... 57-161754

[51] Int. Cl.$^4$ .................. G03B 27/73; G03B 27/72
[52] U.S. Cl. ..................... 355/38; 355/68; 355/69
[58] Field of Search .................. 355/35–38, 355/68, 69, 77; 356/404–406

[56] References Cited

U.S. PATENT DOCUMENTS 3,397,612 8/1968 Ludloff et al. .................. 355/69
3,640,620 2/1972 Shatz et al. .................... 355/38
4,246,514 1/1981 Metzger ...................... 315/241 P
4,255,064 3/1981 Corona ........................ 355/68
4,371,259 2/1983 Howitt ........................ 355/38

Primary Examiner—L. T. Hix
Assistant Examiner—Della Rutledge
Attorney, Agent, or Firm—Price, Gess & Ubell

[57] ABSTRACT

A color enlarger for use in photography capable of printing a color copy from a color original film includes a plurality of source lights for separately generating lights corresponding to a plurality of primary colors; a monitor for separately picking-up the plurality of source lights to monitor the light generated from the light source, and light measuring circuit for separately measuring the plurality of source lights transmitted through the color original film. The color enlarger further includes a microcomputer which has various functions which are: for providing a color data representative of a color to be reproduced on the color copy; for separately calculating the whole light quantities for the plurality of source lights to be generated upon printing the color copy, in response to the monitor, the light measuring circuit, and the provided color data; and for controlling light sources upon printing the color copy in response to the calculating value.

25 Claims, 50 Drawing Figures

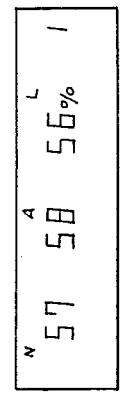 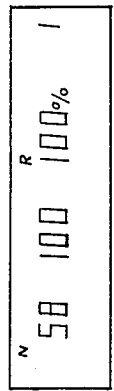 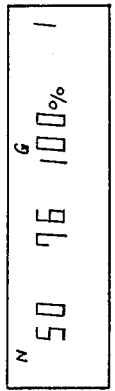 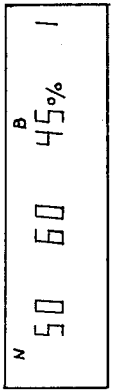
Fig.3(n)   Fig.3(o)   Fig.3(p)   Fig.3(q)
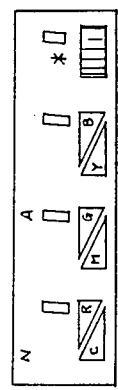 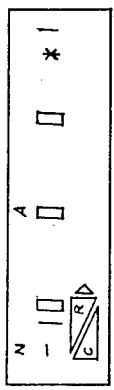 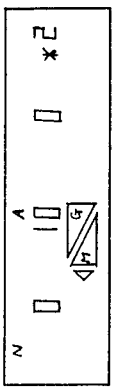 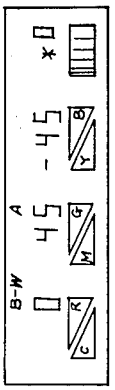 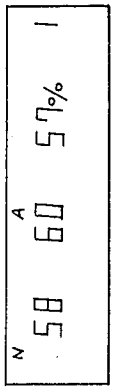
Fig.3(i)   Fig.3(j)   Fig.3(k)   Fig.3(ℓ)   Fig.3(m)

COLOR ENLARGER

BACKGROUND OF THE INVENTION

1. Field of the Invention

The present invention relates to a color enlarger for making color photographic prints from original color films.

2. Description of the Prior Art

A prior art color enlarger, manufactured and sold by Burgie Marketing Companies under a trade name, "New-Omega Automatic D-5500 Darkroom System", utilizes a control box separate from an exposure head, but connected electrically therewith so that the exposure and the color balance given by the exposure head can be controlled according to data of exposure amount and color balance set in the control box. This is advantageous in that the data can be set at the location where a photographic paper is placed, and therefore, the color enlarger of the above described type is easier to handle than the type wherein the exposure and color balance adjustment is built in the exposure head.

However, with the above described prior art color enlarger, a procedure to precompute the data of the exposure value and the color balance is performed by the use of an analyzer (an equipment for measuring the light passing through a film to calculate and display the correctness or incorrectness of the color balance as well as the exposure value) which is also a member separate from the control box. Since no signal transmission take place between the color analyzer and the control box, the user of the prior art color enlarger now under discussion is required to change, while looking at the display given by the color analyzer, the exposure value and the color balance determined by the exposure head, the data, which have been set in the control box, being ones applicable to produce the best print when the display given the color analyzer become proper. In other word, the user is required to transfer signals between the color analyzer and the control box, and therefore, much complicated and time-consuming procedures are required.

On the other hand, a color enlarger of a type mainly installed at a developing and printing service station is of a design that can be used by setting data required to produce an acceptable photographic print, measuring the light passing through a film by the use of a so-called nega-color analyzer for measuring and precomputing data for printing work for each film, precomputing a lighting condition for a light emitting unit in correspondence with the data set, storing the precomputed data in a memory means, and controlling the light emitting unit on the basis of the data stored in the memory means. This type of color enlarger is for producing a large number of color prints of equal size and is not, therefore, equipped with capabilities of changing the magnification factor and effecting exposure on the basis of the data set manually in the device (for example, making trial prints). Thus, the color enlarger generally installed at the professional establishment has a problem in that the capabilities or functions it can provide are short of the requirement to be provided in a small-size color enlarger to which the present invention pertains.

SUMMARY OF THE INVENTION

The present invention has been developed with a view to substantially eliminating the above described disadvantages and inconveniences inherent in the prior art color enlargers and has for its essential object to provide an improved color enlarger wherein the handling thereof including the handling of the analyzer is improved.

Another object of the present invention is to provide an improved color enlarger which is easy to handle and has a multiplicity of functions.

According to one aspect, a color enlarger of the present invention for use in photography capable of printing a color copy from a color original film comprises means for separately generating a plurality of source lights corresponding to a plurality of primary colors, means for separately picking-up the plurality of source lights to monitor the light generation from the generating means, means for providing a color data representative of a color to be reproduced on the color copy, means for separately measuring the plurality of source lights transmitted through the color original film, means for separately calculating the whole light quantities for the plurality of source lights to be generated upon printing the color copy, in response to the picking-up means, the providing means and the measuring means, and means for controlling the generating means upon printing the color copy in response to the calculating means.

Accordingly, the control of the light from the light source so as to realize colors to be reproduced on a photographic color print can be performed easily, and the handling is much improved.

According to another aspect, the present invention is featured in the provision of an improved color enlarger which is so designed as to enable various techniques of dodging (shutting light method) such as desired in making photographic prints. By way of example, the color enlarger according to the present invention has a feature in that there is provided means for separately generating a plurality of source lights corresponding to a plurality of primary colors, means for separately picking-up the plurality of source lights to monitor the light generation from the generating means, means for separately producing a plurality of exposure data representative of the whole light quantities for the plurality of source lights to be generated upon printing the color copy, respectively, means, responsive to the picking-up means and the producing means, for estimating a ratio of the actually monitored light quantity to the whole light quantity represented by the exposure data during the generation of the source light, with respect to each of the source lights, respectively, means, connected to the generating means, for dividedly firing the whole source light unit by unit with respect to each of the source lights, respectively, so that the firings of the unit of source lights time-sharedly occur in a mixed order, the amount of the unit of the source light being determined in accordance with the producing means; and means, responsive to the estimating means, for governing the firing means to unify the ratios for the respective source lights on the way from the initiation to the termination of generating the whole source lights represented by the exposure data.

This is for the purpose of avoiding any possible destruction of the ND balance of the resultant color print which would tend to occur during the dodging. Moroever, the present invention has a feature in having means for separately generating a plurality of source lights corresponding to a plurality of primary colors, means for selecting between a first and a second mode of exposing the color copy to the source lights transmitted through the original color film, means for separately producing a plurality of exposure data representative of the whole light quantities for the plurality of source lights to be generated upon printing the color copy, respectively, means, connected to the generating means, for dividedly firing the whole source light unit by unit with respect to each of the source lights, respectively, so that the firings of the unit of source lights time-sharedly occur in a mixed order, and means for determining the amount of the unit of the source light at a first value in accordance with the providing means in the first mode and at a second value less than the first value in the second mode, with respect to each of the source lights.

This enables to retard the print-making speed to facilitate the dodging. According to a further aspect, the present invention is featured in having means for separately generating a plurality of source lights corresponding to a plurality of primary colors, means for selecting between a first and second modes of exposing the color copy to the source lights transmitted through the original color film, means for separately producing a plurality of exposure data representative of the whole light quantities for the plurality of source lights to be generated upon printing the color copy, respectively, means for advancing the generation of the plurality of source lights in accordance with the producing means, means responsive to the selecting means for governing the advancing means so that the advancement of all the plurality of source lights occur in a substantially parallel manner in the first mode and that the advancement of an optionally chosen one of the plurality of source lights is only extracted in the second mode.

Because of this, the hue of the resultant color print can be partially adjusted by performing the dodging.

As has been understood from the above description even where the dodging is desired to be performed, the color enlarger according to the present invention can exhibit the improved manipulatability.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE EMBODIMENTS

Figure 1:
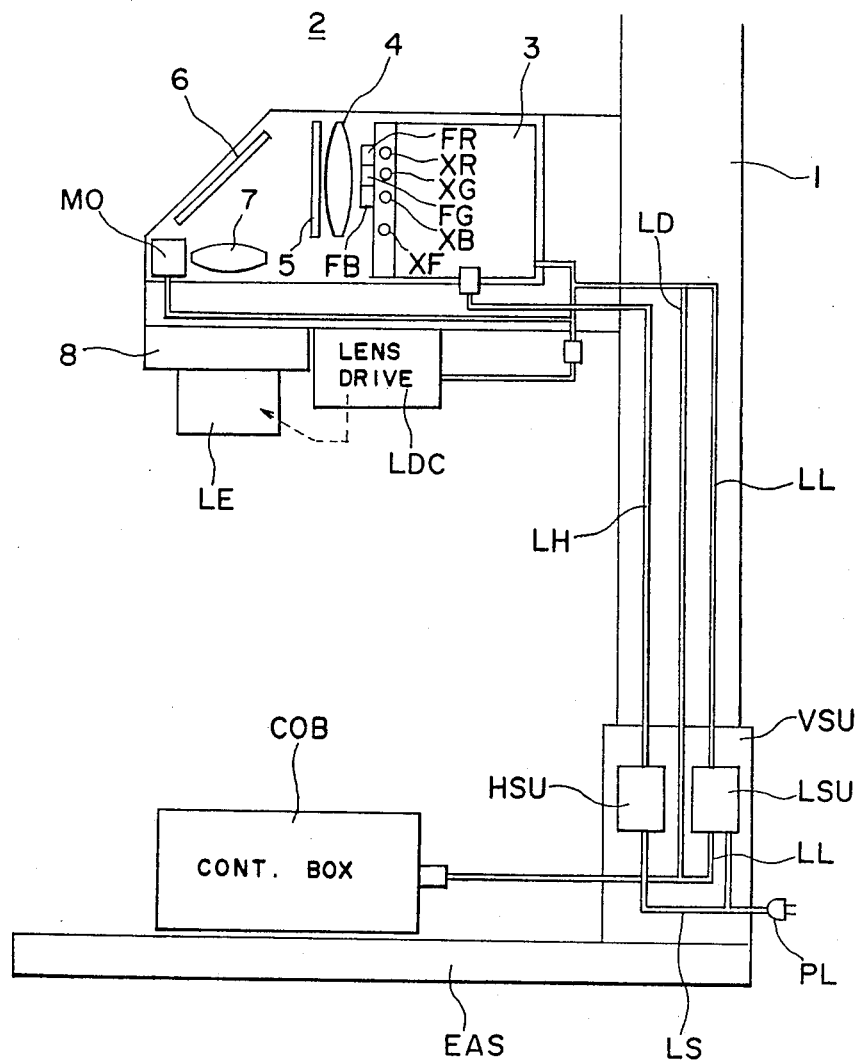
FIG. 1 is diagrammatic view of a color enlarger according to one embodiment of the present invention.

Before the description of the present invention proceeds, it is to be noted that like parts are designated by like reference numerals throughout the accompanying drawings.

Referring to FIG. 1, a photographic color enlarger to which the present invention is applied comprises a generally upstanding pillar 1 having an exposure head 2 mounted thereon for adjustment up and down therealong in a manner known to those skilled in the art. The exposure head 2 accommodates therein light sources which are, in the illustrated instance, constituted by xenon discharge tubes XR, XG and XB each capable of emitting a flash of light when electrically triggered on, and also red, green and blue filters FR, FG and FB disposed frontwardly of and on the paths of travel of light from the xenon discharge tubes XR, XG and XB, respectively. The exposure head 2 also accommodates a xenon discharge tube XF providing a light source for use during the focus adjustment. The xenon discharge tubes XR, XG, XB and XF are individually controlled by a lighting control 3 which receives a high voltage power from a high voltage power source HSU, a low voltage power from a low voltage power source LSU, and a control signal from a control box COB.

A power unit VSU has a power supply line LS for external electric connection with a commercial electric power outlet by means of a plug PL and distributes the commercial electric power to the high and low voltage power sources HSU and LSU so that a high voltage power can be fed to the lighting control 3 through a line LH and a low voltage power can be fed through a line LL to the lighting control 3, a monitor unit MO, a lens drive LDC and the control box COB. The exposure head 2 includes separate condenser lenses 4 and 7, a diffuser 5 which may be in the form of a lenticular lens, and a reflector 6 together with the monitor unit MO operable to monitor the intensity of color lights from the respective discharge tube XR, XG or XB. This monitor unit MO has its output connected to the control box COB through a line LD.

The color enlarger shown in FIG. 1 includes a film support 8 adapted to receive and support a film bearing an image to be printed, and a projector lens assembly LE. The focus adjustment of the projector lens assembly LE is carried out by the lens drive LDC in response to a lens drive signal fed thereto from the control box COB when an operator of the color enlarger manipulates a predetermined key arranged in the control box COB. Disposed immediately below the projector lens assembly LE is an easel for the support of a photographic paper. This easel can be removable so that, where an enlargement to a size larger than the size of the easel is desired, the photographic paper can be placed on the floor in a darkroom in alignment with the lens assembly LE.

Figure 2:
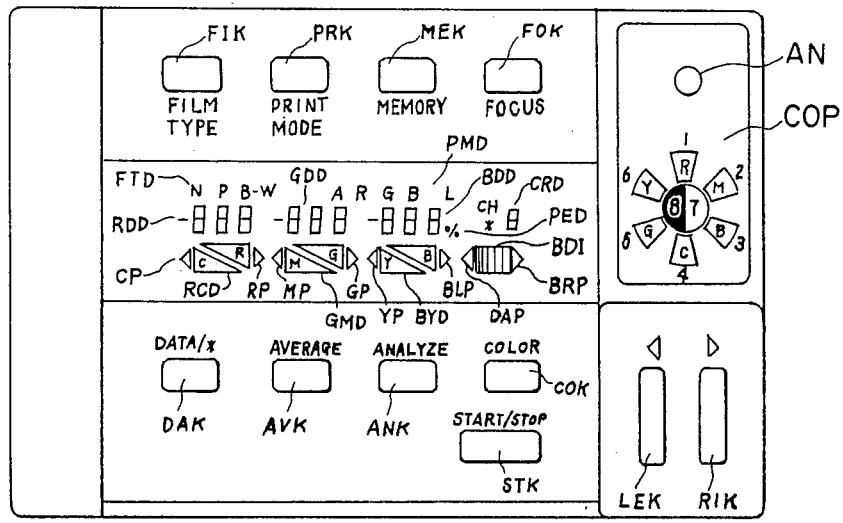
FIG. 2 is a plan view of a control and display panel.
Figure 3A:
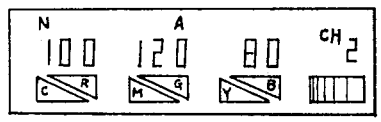
FIGS. 3(a) to 3(q) show various displayed conditions through the display panel.

The control box COB has control keys and display panel as shown in FIG. 2. The display panel is located at the center of the control box COB and displays information in a manner as shown in FIGS. 3(a) to 3(q), according to different modes of operation. Hereinafter, the functions of the color enlarger will be described separately with reference to FIGS. 1 to 3.

A. Selection of Film Type

When a film type key FIK shown in FIG. 2 is depressed successively, figures "N", "P" and "B-W" in a display area FTD are successively lit one after another. When carrying out a printing with a negative film, the key FIK should be depressed until the figure "N" representing a negative film lights. Similarly, when carrying out a printing with a positive film or a slide film, the key FIK should be depressed so as to lit the figure "P" representing a positive film or slide film, and when carrying out a printing with a black-and-white film, the key FIK should be depressed so as to lit the figure "B-W" representing a black-and-white. It is to be noted that the film type key FIK is disabled during a memory mode of operation, which will be described later. In addition, when the film type key FIK is depressed during a ring mode of operation as will be described later, the mode is automatically changed to a display mode for the display of data (exposure value data). When the display mode takes place, a display area CRD for a memory channel or a ring channel displays a memory channel corresponding to the type of the film used for an actual printing. The memory channel will also be described later.

B. Focus Adjustment

When a focus key FOK is pushed once, the xenon discharge tubes FX and GX are alternately fired continuously at a high speed in a small amount to effect illumination necessary to enable the operator to focus the projected image, and to bring a light receiver AN (FIG. 2) to a position within the projected image, such as to a cheek if the image is a portrait, for the light amount analysis at a particular point.

According to the enlarger of the present invention, the focus adjustment is carried out not by turning a focusing ring, but by the depression of keys LEK and RIK. More particularly, While the illumination is being effected by the depression of the focus key FOK, the depression of the left key LEK results in the retraction of the projector lens assembly LE by the action of the lens drive LDC and depression of a right key RIK results in the extension of the lens assembly LE by the action of the lens drive LDC. Thus, without manipulating a focusing ring of the projector lens assembly LE, the operator can effect the intended focus adjustment by manipulating one or both of the keys LEK and RIK arranged on the control box COB, with the manipulativity of the color enlarger according to the present invention consequently improved as compared with that of the prior art devices.

The subsequent push of the focus key FOK will result in the deactivation of the xenon discharge tubes FX and GX to cease the illumination.

During the illumination being made for the focus adjustment, the display area remains the same as during the focus key FOK being depressed, and when any one of a color key COK, a memory key MEK, the film type key FIK, a print mode key PRK and a data/ring key DAK is depressed, the illumination is terminated to effect an operation corresponding to the respective key. However, when an analyze key ANK and a start/stop key STK are simultaneously depressed, while the illumination for the focus adjustment is being taken place, an automatic exposure data setting operation (hereinafter referred to as "analyze start") is initiated. When the analyze key ANK and the memory key MEK are simultaneously depressed during that time, a reference color memorizing operation (hereinafter referred to as "analyze memory") is initiated. The illumination is temporarily interrupted during these operations. In addition, when the analyze key ANK and an average key AVK are simultaneously depressed during that time, a preparatory operation (as will be described later) necessary to calculate the average value of the data obtained during the analyze start or the analyze memory.

C. Manual Exposure Value Setting

To set red, blue and green exposure values manually to desired amounts, it is necessary to set the enlarger to a data mode. When the enlarger is set to the data mode, as accomplished by the depression of a data/ring key DAK, a display area CRD displays both a symbol "CH" and one of the figures "1", "2" and "3", and at the same time, these numbers, such as "100", "120" and "80", are displayed in display areas RDD, GDD and BDD, respectively, as shown in FIG. 3(a). It is to be noted that the three numbers, such as "100", "120" and "80" are the exposure values for red, green blue, respectively, set in the previous operation and carried over to the present operation. When the data/ring key DAK is depressed again, the mode is changed to a ring mode, which will be described later, and if it is depressed again, the mode returns back to the data mode.

Now, the meaning of the numbers shown in the display areas RDD, GDD and BDD is described. The number shown in each display area, e.g., RDD, is in relation to the amount of total red light to be emitted from the red xenon tube, and is given in a logarithmically compressed order. More specifically, the number C displayed in the display area RDD can be defined as $$C = 100 \log_{10}(L/K),$$

wherein L is an A/D converted amount of total red light to be emitted from the red xenon tube, and K is a constant determined by the constants in an analog circuit. This equation can be rearranged as $$L = K \times 10^{C/100}.$$

From this equation, it is understood that when the number C is increased by 1, the amount of total red light is increased by the multiple of 1.023 ($=10^{0.01}$). That is, every time the number C increases by 1, the amount of total red light increases 2.3%. Thus, when the number C is increased by 30, the amount of total red light is increased by the multiple of $10^{0.3}$, that is about twice as much light as before. Furthermore, when the number C is increased by 100, the amount of total red light increased by the multiple of $10^1$, that is exactly ten times as much light as before. The same can be said to the numbers shown in the display areas GDD and BDD.

When the data mode is established in the above described manner, a color key COK may be depressed to chose a color that is required to be set with an exposure value. According to the enlarger of the present invention, when the color key COK is depressed, color markings RCD, GMD, BYD and BDI are successively automatically switched over and displayed one after another while the color key COK is depressed. The color key COK should be released from the depressed condition when one of the color markings corresponding to the desired color is displayed. By so doing, the setting of the exposure value data of the desired color is possible. More specifically, when the exposure value data of a red color is desired to be changed, the color key COK should be kept depressed until the color marking RCD is displayed. Similarly, when the exposure value data of a green color is desired to be changed, the color key COK should be kept depressed until the color marking GMD is displayed. When the exposure value data of a blue color is desired to be changed, the color key COK should be kept depressed until the color marking BMD is displaced. When all three primary colors are desired to be changed, i.e., when the density of the image itself is desired to be changed, the color key COK should be depressed until the color marking BDI is displayed. The display shown in FIG. 3(b) is assumed when the exposure value data of the red color is desired to be changed.

When either one of the right or left key RIK or LEK is depressed within a predetermined period of time, for example, 15 seconds, subsequent to the release of the color key COK from the depressed condition, the numeral shown above one of the color markings RCD, GMD and BYD progressively increases or decreases by 1. It is to be noted that, according to preferred embodiment show, the respective exposure value data undergo a change between 0 and 255. An exemplified operation for setting desired exposure values will now be described.

First, the data/ring key DAK is depressed to set the enlarger to the data mode, whereby the display panel shows as illustrated in FIG. 3(a). Then, when the color key COK is kept depressed until the color marking RCD is displayed, the display panel shows as illustrated in Fig. 3(b). Thereafter, when the right key RIK is depressed, the numeral above the color marking RCD, which is now "100", progressively decreases by 1 to a smaller value, and at the same time, a triangle index RP representing an arrow is displayed, indicating that the result of printing on a photographic paper will become more red-enriched than that which would be obtained with the initial data (100 as shown in FIG. 3(b)). The condition represented by the display shown in FIG. 3(c) is established when the initial exposure value data reading 100 is varied to an exposure value data reading 95 by depressing the right key RIK.

Figure 3B:
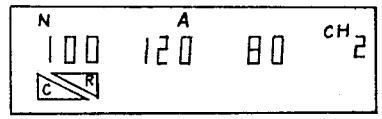
Figure 3C:
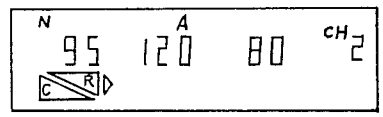

On the contrary thereto, when the left key LEK is depressed while the display is such as shown in FIG. 3(b), the numerical data shown above the color marking RCD is progressively increased by 1 to a larger value, and at the same time, a triangle index CP is displayed to indicate that the result of printing on a photographic paper will become more cyan-enriched than that which would be obtained with the initial exposure value data.

After the exposure value data for red has been changed to a desired value in the above described manner, the exposure value data for green can be changed in a similar manner. More specifically, after the exposure value data for red has been changed to a desired value, the color key COK is depressed again, thereby lighting the color marking GMD. Then, when the right key RIK is depressed, the numerical data displayed in the display area GDD above the color marking GMD is progressively decreased by 1 during the depression of the right key RIK, and at this time, the index GP is displayed to indicate that the resultant print would be more green-enriched than that which would be obtained with the initial data. Conversely, when the left key LEK is depressed, the numerical data displayed in the display area GDD is progressively increased by 1, and a triangle index MP is displayed to indicate that the resultant print will be more magenta-enriched than that which would be obtained with the initial data.

Likewise, when it is desired to change the exposure value data for blue, the color key COK is depressed once again, thereby lighting the color marking BYD. Then, when the right key RIK is depressed, the numerical data displayed in the display area BDD above the color marking BYD is progressively decreased by 1, and at the same time, a triangle index BLP is displayed to indicate that the resultant print will be more blue-enriched than that which would be obtained with the initial numeral. On the other hand, when the left key LEK is depressed when and after the color marking BYD has been displayed, the numerical data displayed in the display area BDD is progressively increased by 1, and at the same time, a triangle index YP is displayed to indicate that the resultant print will be more yellow-enriched than that which would be obtained with the initial data.

Next, when it is desired to change the exposure values for red, green and blue at the same time, the color key COK is depressed once again to light the color marking BDI. Then, when the right key RIK is depressed, the exposure value data for the three colors decreases simultaneously and progressively by 1, and at the same time, a triangle index BRP is displayed to indicate that the resultant print will bear an image of faint color, or lower density, than that which would be obtained with the initial data. Contrary, when the left key LEK is depressed, the exposure value data for the three colors increase simultaneously and progressively by 1, and at the same time, a triangle index DAP is displayed to indicate that the resultant print will bear an image of deep color, or high density, than that which would be obtained with the initial data.

The above exemplification is given when the printing is carried out with a negative film. But, when a positive film is used for printing with the enlarger according to the present invention, the depression of the right key RIK results in the display of one of the triangle indexes RP, GP, BLP, and BRP which corresponds to the color marking then displayed and the data corresponding to such color marking is progressively increased by 1. However, when the left key LEK is depressed, one of the triangle indexes CP, MP, YP and DAP which corresponds to the color marking then displayed is displayed, and the data corresponding to such color marking is progressively decreased by 1.

Where a black-and-white film is used for the printing, various displays similar to those obtained where the negative film is used take place. In particular, in the case with the black-and-white printing, the control of contrast can be accomplished by changing the ratio between the amount of green light to be projected and that of blue light to be projected, provided that the photographic paper is a variable contrast paper, such as "Polycontrast rapid II RC paper" (trade mark of EASTMAN KODAK COMPANY). The relationships hereinabove can be summarized as tabulated in Table 1 below.

TABLE 1

| Film Type | Left/Right | Color Marking | Index | Data to be Changed | Enriched Color |
|---|---|---|---|---|---|
| N | Right Key Depression I | RCD GMD BYD BDI | R P G P BLP BRP | −RDD −GDD −BDD −RDD, GDD, BDD | Red Green Blue Faint |
|  | Left Key Depression II | RCD GMD BYD BDI | C P M P Y P DAP | +RDD +GDD +BDD +RDD, GDD, BDD | Cyan Magenta Yellow Deep |
| P | Right Key Depression II | RCD GMD BYD BDI | R P G P BLP BRP | +RDD +GDD +BDD +RDD, GDD, BDD | Red Green Blue Faint |
|  | Left Key Depression I | RCD GMD BYD BDI | C P M P Y P DAP | −RDD −GDD −BDD −RDD, GDD, BDD | Cyan Magenta Yellow Deep |

Note:
+ indicates increase of exposure value and
− indicates decrease of exposure value.

For the purpose of avoiding an undesired change of the data, which may occur by the accidental depression of the right of left key RIK or LEK, any subsequent depression of the right and left keys RIK and LEK will not be accepted after a predetermined period of time, for example 15 seconds, subsequent to the release of an operator's finger from the color key COK or either one of the right or left key RIK or LEK. When said predetermined period of time passes, every one of the color markings are displayed as shown in FIG. 3(a).

As hereinbefore described, since the triangle index is displayed together with the color marking during the setting (change) of the exposure value data, the operator can immediately understand which color tone will be enriched or emphasized without the knowledge of color printing relating to the fill type. Therefore, with the enlarger according to the present invention, the operator can determine intuitively the result of the printing.

D. Ring Around

Usually, before making a final color print using a color film, a number of trial printings are carried out in addition to a standard or initial trial printing. For example, the first additional trial printing may be carried out by enriching the quantity of the source light of the color red in predetermined degrees, with the source lights of the other colors, blue and green, remaining in the same quantities to change the total tone of the source lights toward red. The second trial printing may be carried out by fading the source light quantity for the color red in the same degrees, with the source lights for the other colors, blue and green, remaining in the same quantities, that is by changing the total tone of the source lights toward the color cyan. In this manner, further trial printings may be carried out by selectively enriching or fading the source light quantity for the color blue, or by selectively enriching or fading the source light quantity for the color green. Furthermore, the trial printings may be carried out by enriching or fading all source light quantities for the three colors simultaneously to totally brighten or darken the light source without the change in hue. Thus, according to this example, the additional trial printings may be carried out in eight different directions of change in tone in total, i.e., toward the color red, green, blue, cyan, magenta, or yellow tone, or toward dark or bright tone around the standard or initial trial print.

According to the above method of test printing, the final color print with the best tone can systematically found among the set of trial color prints. Such a method is sometimes called "ring around". The ring around method is also available when making a black-and-white print using a black-and-white film.

According to the enlarger of the present invention, the trial printings according the ring around method are carried out in an extremely easy manner. Now, the ring around operation according to the present invention is described with reference to Tables 2, 3 and 4, in which Table 2 shows ring channel operation for color printing using the negative film, Table 3 shows ring channel operation for color printing using the positive film, and Table 4 shows ring channel for black-and-white printing with the variable contrast paper used.

Before the ring-around mode, the data setting mode must be effected so that the exposure value for red, green and blue is temporarily set by manual setting or automatic setting, through an analyze operation described later. Such a temporarily set exposure value is referred to as a center value. During the data setting mode, the center values for red, green and blue are displayed in the display areas RDD, GDD and BDD, respectively. It is assumed that the center values for red, green and blue are "100", "80" and "60", respectively. Then, when a data/ring key DAK is depressed to change the mode from the data setting mode to the ring-around mode, a numeral with an asterisk symbol, such as "* 0" representing ring channel 0, is displayed in the display area CRD. Furthermore, when the ring-around mode is established, the center value disappears from the display areas RDD, GDD and BDD, and instead, zeros appear in each area, as indicated in Table 2, "Ring Channel 0", under the column "Display", indicating that no change is given to each exposure value at present. Thus, at present, the exposure value data for red, green and blue are "100", "80" and "60", respectively, as indicated in Table 2, "Ring Channel 0⇌", under the column "Exposure Value Data". The indication of the display panel when the ring channel 0 is selected, is also shown in FIG. 3(i). It is to be noted that in FIG. 3(i), a character "N" is displayed at upper left corner thereof for indicating that the exposure is carried out with a negative film, and a character "A" is displayed at upper center thereof for indicating that the exposure is carried out under an additive mode of light emission, which will be described later. For the same purpose, the characters "N" and "A" are depicted in Table 3, under column "Display".

Then, when a single depression is given to the color key COK, the numeral in the display area CRD increases from "* 0" to "* 1", indicating that the ring channel has changed to channel 1. When the ring channel 1 is selected, the center exposure value for red is reduced by 10, while the center exposure value for green and blue remains the same. Thus, as shown in Table 2, when the ring channel 1 is selected, "−10" is displayed in the display area RDD, and zeros are displayed in the display areas GDD and BDD. Thus, exposure value data for red, green and blue result in "90", "80" and "60", as shown in Table 2. Furthermore, during the ring channel 1, the color marking RCD and the triangle index RP are displayed to show that the exposure will be carried out with red enriched when compared with the exposure carried out with the center exposure value. The indication of the display panel when the ring channel 1 is selected, is also shown in FIG. 3(j).

While the ring channel 1 is selected in the above described manner and when a start/stop key STK is depressed, xenon lamps XR, XG and XB flash alternately in the order of (XR XG XB XR XG XB XR XG XB . . . ), or in the order of (XR XR XR . . . XG XG XG . . . XB XB XB) depending on the selected exposure mode described later, with the total light amount for red, green and blue correspond to "90", "80" and "60", respectively. This completes the exposure for the first trial printing in which the red is enriched.

Then, when another depression is given to the color key COK, the numeral in the display area CRD increases from "* 1" to "* 2", indicating that the ring channel 2 has selected. When the ring channel 2 is selected, the center exposure value for green is increased by 10, while the center exposure value for red and blue remains the same. Thus, as shown in Table 2, when the ring channel 2 is selected, "10" is displayed in the display area GDD, and zeros are displayed in the display areas RDD and BDD. Furthermore, during the ring channel 2, the color marking GMD and the triangle index MP are displayed to show that the exposure will be carried out with magenta enriched (green faded) when compared with the exposure carried out with the center exposure value. The indication of the display panel when the ring channel 2 is selected, is also shown in FIG. 3(k). While the ring channel 2 is selected, the start/stop key STK may be depressed to effect the exposure for the second trial printing in which the magenta is enriched.

Then, when a ring channel 3 is selected, in a similar manner described above, the center exposure value for blue is decreased by 10, while the center exposure value for red and green remains the same. Thus, "−10" is displayed in the display area BDD, and zeros are displayed in the display areas RDD and GDD, and at the same time, the color marking BYD and the triangle index BP are displayed to show that the exposure will be carried out with blue enriched when compared with the exposure carried out with the center exposure value. While the ring channel 3 and when the start/stop key STK is depressed, the exposure for the third trial printing can be carried out with blue enriched.

In a similar manner, when the ring channel 4 is selected, cyan is enriched; when a ring channel 5 is selected, green is enriched; and when the ring channel 6 is selected, yellow is enriched.

Next, when a ring channel 7 is selected in a similar manner described above, the center exposure values for red, green and blue are all decreased by 10. Thus, "−10" is displayed in each of the display areas RDD, GDD and BDD, and at the same time, the color marking BDI and the triangle index PRP are displayed to show that the exposure will be carried out with a faint color when compared with the exposure carried out with the center exposure value. Then, the acutal exposure may be carried out by the depression of the start/stop key STK.

Then, when a final ring channel 8 is selected, the center exposure values for red, green and blue are all increased by 10. Thus, "10" is displayed in each of the display areas RDD, GDD and BDD, and at the same time, the color marking BDI and the triangle index DAP are displayed to show that the exposure will be carried out with a deep color when compared with the exposure carried out with the center exposure value. Then, the acutal exposure may be carried out by the depression of the start/stop key STK.

The above description is directed to a case of ring-around mode wherein the color exposure is carried using a negative film. Next, the description is directed to a case of ring-around mode wherein the color exposure is carried out using a positive film with reference to Table 3.

In the ring-around mode carried out for the color exposure using a positive film, it is also assumed that the center values for red, green and blue are "100", "80" and "60", respectively, set up in the data setting mode. Then, when the data/ring key DAK is depressed to change the mode from the data setting mode to the ring-around mode, "* 0" representing ring channel 0 is displayed in the display area CRD, and zeros appear in the display areas RDD, GDD and BDD, as indicated in Table 3, "Ring Channel 0", under the column "Display". It is to be noted that, instead of the character "N", a character "P" is displayed indicating that the the type of film used for the exposure is a positive film.

Then, when a single depression is given to the color key COK to select the ring channel 1, the display in the area CRD changes from "* 0" to "* 1", and at the same time, "10" is displayed in the display area RDD, and zeros are displayed in the display areas GDD and BDD, indicating that the center exposure value for red is increased by 10, and that the center exposure value for green and blue remains the same. Thus, exposure value data for red, green and blue result in "110", "80" and "60", as shown in Table 3. Since the exposure is effected with the positive film, the increase in exposure value for red results in enriched red. Then, the acutal exposure may be carried out by the depression of the start/stop key STK.

As shown in Table 3, under the ring-around mode wherein the color exposure is carried out using a positive film, red, magenta, blue, cyan, green, or yellow can be enriched or the colors can be fainted or deepened, thereby simplifying the trial printings.

According to the ring-around mode described above the exposure value is varied by the amount of 10, but this amount, referred to as ring width, can be changed to any other amount between 0 and 15 by the depression of the left and right keys LEK and RIK during the ring-around mode.

Next, the description is directed to a case of ring-around mode wherein black-and-white exposure is carried out using a black-and-white film of a variable contrast type with reference to Table 4.

In the ring-around mode carried out for the black-and-white exposure using a variably contrast type black-and-white film, it is also assumed that the center values for red, green and blue are "100", "80" and "60", respectively, set up in the data setting mode. Then, when the data/ring key DAK is depressed to change the mode from the data setting mode to the ring-around mode, "* 0" representing ring channel 0 is displayed in the display area CRD, and "0", "45" and "−15" appear in the display areas RDD, GDD and BDD, respectively, as indicated in Table 4. Thus, the exposure value data for red, green and blue result in "100", "125" and "45", as shown in Table 4, providing the softest gradation of printing. It is to be noted that, instead of the character "N", a character "B-W" is displayed indicating that the the type of film used for the exposure is a black-and-white film.

Then, when a single depression is given to the color key COK to select the ring channel 1, the display in the area CRD changes from "* 0" to "* 1", and at the same time, "0", "30"and "−10" are displayed in the display areas RDD, GDD and BDD, respectively, indicating that exposure will be carried out with a higher contrast. Then, the acutal exposure may be carried out by the depression of the start/stop key STK.

As shown in Table 4, under the ring-around mode wherein the exposure is carried out using a black-and-white film, the gradation relative to a variable contrast paper, such as Polycontrast rapid II RC paper (Trade Mark of EASTMAN KODAK COMPANY, U.S.A) can be varied from soft gradation to high contrast, and also between faint and deep, thereby simplifying the trial printings.

As has been described above, the ring-around mode operation eliminates the possibility for the operator to set the data each time a print is made when a plurality of prints are to be made on a trial basis in order to obtain the best print, and therefore, the manipulativity of the enlarger according to this invention can advantageously be improved.

TABLE 2

| Ring Channel | Exposure Value Data | | | Display | | | |
|---|---|---|---|---|---|---|---|
| | R | G | B | N | A | | |
| 0 | 100 | 80 | 60 | 0 | 0 | 0 | *0 |
| 1 (Red) | 90 | 80 | 60 | −10 | 0 | 0 | *1 |
| 2 (Magenta) | 100 | 90 | 60 | 0 | 10 | 0 | *2 |
| 3 (Blue) | 100 | 80 | 50 | 0 | 0 | −10 | *3 |
| 4 (Cyan) | 110 | 80 | 60 | 10 | 0 | 0 | *4 |
| 5 (Green) | 100 | 70 | 60 | 0 | −10 | 0 | *5 |
| 6 (Yellow) | 100 | 80 | 70 | 0 | 0 | 10 | *6 |
| 7 (Faint) | 90 | 70 | 50 | −10 | −10 | −10 | *7 |

TABLE 2-continued

| Ring Channel | Exposure Value Data R | G | B | Display | | | |
|---|---|---|---|---|---|---|---|
| 8 (Deep) | 110 | 90 | 70 | 10 | 10 | 10 | *8 |

Negative Film Type
Center values: R = 100; G = 80; and B = 60
Ring Width: 10

TABLE 3

| Ring Channel | Exposure Value Data R | G | B | Display | | | |
|---|---|---|---|---|---|---|---|
| 0 | 100 | 80 | 60 | P 0 | A 0 | 0 | *0 |
| 1 (Red) | 110 | 80 | 60 | P 10 | A 0 | 0 | *1 |
| 2 (Magenta) | 100 | 70 | 60 | P 0 | A −10 | 0 | *2 |
| 3 (Blue) | 100 | 80 | 70 | P 0 | A 0 | 10 | *3 |
| 4 (Cyan) | 90 | 80 | 60 | P −10 | A 0 | 0 | *4 |
| 5 (Green) | 100 | 90 | 60 | N 0 | A 10 | 0 | *5 |
| 6 (Yellow) | 100 | 80 | 50 | P 0 | A 0 | −10 | *6 |
| 7 (Faint) | 110 | 90 | 70 | P 10 | A 10 | 10 | *7 |
| 8 (Deep) | 90 | 70 | 50 | P −10 | A −10 | −10 | *8 |

Positive Film Type
Center values: R = 100; G = 80; and B = 60
Ring Width: 10

TABLE 4

| Ring Channel | Exposure Value Data R | G | B | Display | |
|---|---|---|---|---|---|
| | | | | B-W | A |

TABLE 4-continued

| Ring Channel | Exposure Value Data | | | Display | | | |
|---|---|---|---|---|---|---|---|
| | R | G | B | | | | |
| (Soft gradation) | 100 | 125 | 45 | B-W 0 | A 45 | −15 | *0 |
| 1 | 100 | 110 | 50 | B-W 0 | A 30 | −10 | *1 |
| 2 | 100 | 95 | 55 | B-W 0 | A 15 | −5 | *2 |
| 3 | 100 | 80 | 60 | B-W 0 | A 0 | 0 | *3 |
| 4 | 100 | 65 | 65 | B-W 0 | A −15 | 5 | *4 |
| 5 | 100 | 50 | 70 | B-W 0 | A −30 | 10 | *5 |
| 6 (High Contrast) | 100 | 35 | 75 | B-W 0 | A −45 | 15 | *6 |
| 7 (faint) | 100 | 70 | 50 | B-W 0 | A −10 | −10 | *7 |
| 8 (deep) | 100 | 90 | 70 | B-W 0 | A 10 | 10 | *8 |

Center values: R = 100; G = 80; and B = 60 for "Polycontrast rapid II RC paper"(EASTMAN KODAK COMPANY)

It is to be noted that for guiding the operator, an index COP is provided at right-hand side of the display panel, as shown in FIG. 2, and has a center circle half colored with dark gray with a numeral "8" and the other half colored with white with a numeral "7". The index COP further has six sectors around the center circle which are colored, respectively, with red, magenta, blue, cyan, green and yellow, and are provided with numerals "1", "2", "3", "4", "5" and "6". The numerals "1" through "8" corresponds to the ring channel, and accordingly, the operator will immediately understand which ring channel correspond to which color.

E. Reference Color Memorization (Analyze Memory)

After carrying out a number of trial printings through the manual exposure value setting, or through the ring-around mode operation described above, the operator finds his best combination of exposure values for red, green and blue to obtain a print according to his requirement. Furthermore, for the different types of photographing objects, the operator may find a number of best combinations of exposure values, such as one for portrait, one for scenary, one for indoor scenary, and one for outdoor scenary, such best combinations should be memorized. To free the operator from memorizing the best combinations, a memory means is provided in the enlarger. And, the best combinations are memorized in different memory channels and displayed while the enlarger is in a memory mode.

First, a memory key MEK is depressed to select one of the memory channels for storing the data. According to one embodiment, three memory channels are available for storing three different combinations of the exposure values for the negative film, two memory channels are available for the positive film, and two memory channels are available for the black-and-while film.

Figure 3D:
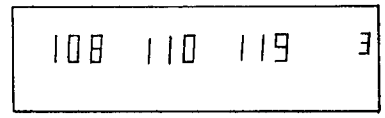

Then, the focus key FOK is depressed to effect the firing of xenon tubes XF and XG for focusing the projected image and for positioning the light receiver AN to a spot within the projected image for measuring the information relating to the color thereat. When both the analyze key ANK and the memory key MEK are depressed simultaneously, the blue, green and red xenon discharge tubes XB, XG and XR are successively fired one after another to emit blue, green and red lights. The emitted light is directly received by the monitor unit MO, and is also received by the light receiver AN through the film and the lens. By taking a ratio of light amount received by the monitor unit MO and the light receiver AN, the degree of transparancy of the film and the lens at the measuring spot is obtained. Using the obtained ratio, together with the best exposure value data, a reference color necessary for an analyzer to automatically set an exposure value data is computed in a microcomputer housed within the control box COB, and is stored in the memory channel selected by the memory key MEK. This reference color is referred to as a memory data. This memory data is displayed in such a manner as shown in FIG. 3(d). And, when the data/ring key DAK is depressed, the exposure value data setting mode is again resumed and the display will be such as shown in FIG. 3(a) with the firing for illumination stops consequently.

Figure 3E:
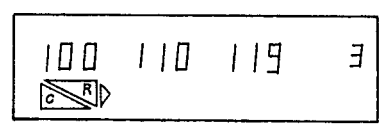

When and while the memory data is displayed, the color key COK and the right and left keys RIK and LEK are manipulated in a manner similar to that carried out during the manual exposure value setting mode described under the item C so as to change the memory data. FIG. 3(e) illustrates the display effected during this manipulation and, in this example, the display indicates that the memory data has been changed in such a direction that, if a print is to be made with the exposure value data automatically set by the analyzer, the resultant print will be red-enriched in a certain degree corresponding to 8.

F. Automatic Exposure Value Setting by Analyzer (Analyze Start)

When the aperture size is changed, the light amount impinging on the spot to be measured changes and, therefore, the best exposure data for that portion changes. The same can be said when the enlarging size is changed or when a film is changed. In other words, when conditions change, the best exposure data for that spot change. In order to obtain a revised best exposure data, first a memory channel storing the reference color for that spot is selected by depressing the memory key MEK. If that measured spot is a cheek of the projected image, and if the reference color for the cheek is stored in memory channel 3, the memory key MEK should be depressed until the display area CRD shows a numeral 3 without displaying characters "CH" nor "*", indicating that the selected memory channel is 3, as illustrated in FIG. 3(d). Subsequently, the focus key FOK is depressed to effect the firing for illumination while the light receiver AN is positioned at the cheek. Then, when the analyze key ANK and the start/stop key STK are simultaneously depressed, the blue, green and red xenon discharge tubes XB, XG and XR are successively fired one after another to emit light. At this time, based on the measurements done by the monitor unit MO and the light receiver AN and the memory data (reference color data), the microcomputer in the control box COB calculates the revised best exposure value data necessary to produce a print that would result very similar to the best print as obtained before the condition change. The revised best exposure value data is shown on the display panel in a manner, such as shown in FIG. 3(a), although the numerals 100, 120 and 80 may be different.

G. Average Value Computation

When a measurement is effected to a certain spot of an image, that spot does not always represent an average density for all areas of the image depending on the lighting condition. In addition, the condition of a measured portion of a film providing the basis for the memorization and the condition of a measured portion of a film used for the actual printing are not always the same. Accordingly, the spot measurement will not always provide the best print and thus, spot measurement carried out at a single point lacks precision when evaluating the entire image. In order to improve the precision, however, the enlarger according to the present invention is provided with a capability of computing the exposure value data or the memory data based on the result of measurement done at up to three different spots. If the printing is carried out using the exposure value data based on the average value of these measurement, the possibility of the occurrence of quality variation can advantageously be minimized.

Figure 3F:
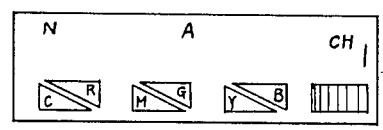
Figure 3G:
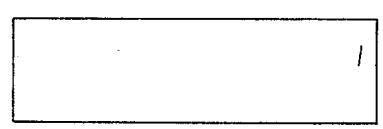
Figure 3H:
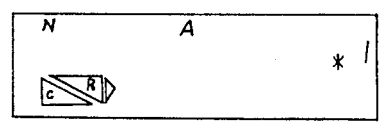

When the analyze key ANK and the average key AVK are simultaneously depressed prior to the analyze memory operation or the analyze start operation, the average value is ready to be calculated. At this time, the display will be such as shown in FIG. 3(f) in the case of the exposure value data display (setting) mode; in FIG. 3(g) in the case of the memory data display mode; and in FIG. 3(h) in the case of the ring around mode. Subsequently, the previously described analyze memory operation or the analyze start operation is carried out two to three times. Any key manipulation for the fourth and onward analyze start operation will not be accepted. It is, however, to be noted that, each time the operation terminates, the memory data or the exposure value data based on the measurements done at that time is displayed. When the average key AVK is depressed after the second to third analyze memory or analyze start operation has terminated, the average value of a plurality of the memory data or exposure value data calculated up until this time can be computed by the microcomputer in the control box COB and then displayed. The contents of the display so effected correspond to that shown in FIG. 3(a) or FIG. 3(d).

H. Selection of Exposure Mode (Print Mode)

When a print mode key PRK is depressed, the exposure mode changes in sequence from additive mode, additive low mode, separation mode and again to the additive mode and so on.

When the start/stop key STK is depressed while the additive mode or additive low mode is chosen, the blue, green and red xenon tubes are fired one after another repeatedly, such as 12 Hz in the additive mode which 24 Hz in the additive low mode. During the additive mode, although the shots from the xenon tubes vary a little in quantity of each shot, generally they all have a greater quantity of light. Thus, one exposure operation under the additive mode completes in a short period of time. During the additive low mode, however, although the shots from the xenon tubes vary a little in quantity, generally they all have a less quantity of light, such as 1/16 of those during the additive mode. Further, the frequency of shots is increased in the additive low mode, such as twice. Thus, one exposure operation under the additive low mode completes in a long period of time, such as 8 times as long as that under the additive mode.

When the start/stop key STK is depressed while the separation mode is chosen, only a selective one of the red, green and blue xenon tube is fired repeatedly at 12 Hz, the light quantity of each shot being identical with that of the additive low mode. The selection of xenon tube can be optionally changed.

When it is in additive mode, "A" is displayed in the display area PMD. Similarly, when it is in additive low mode, "A L" is displayed, and when it is in separation mode "R" or "G" or "B" is displayed depending on whether the red, green or blue light source is fired, respectively.

More specifically, during the additive mode, the red, green and blue xenon tubes XR, XG and XB are fired one after another in the order given above at the frequency of 12 Hz, each shot emitting a given amount of light which is determined by the remaining amount of the exposure. The number of times of firing of each tube is made approximately constant so that a period of time from the start of the exposure to the termination of such exposure is constant. During the exposure, the percentage of the rest of the exposure value of each color relative to the total exposure value of the corresponding each color can be displayed in a manner as shown in FIG. 3(m). For example, immediately after the depression of the start/stop key STK, under the additive mode, the display area PED shows "%" and each of the display areas RDD, GDD and BDD show "100". Then, when the red xenon tube flashes, the numeral in RDD is reduced to, e.g., "93"; thereafter when the green xenon tube flashes, the numeral in GDD is reduced to, e.g., "91"; thereafter when the blue xenon tube flashes, the numeral in BDD is reduced to, e.g., "92"; and so on, until all the three numerals are reduced to "0".

In the case of the additive low mode, the red, green and blue xenon discharge tubes XR, XG and XB are fired one after another in the order given above at the frequency of 24 Hz, each emitting a given amount of light. Although the given amount of light is also determined by the remaining amount of the exposure value, the time required to complete the exposure is about 8 times that required during the additive mode, because the given amount of light emitted is 1/16 of that emitted during the additive mode for the same remaining amount of the exposure value. Therefore, during this prolonged period of time, a partial cover-up printing (partial intensive burning) can be easily performed in such a way as to insert and remove a light interceptor selectively during the interruption of exposure or during the exposure.

Even during this additive low mode, the percentage of the remaining amount of the exposure value of each color relative to the total exposure value of all three colors can be displayed in a manner as shown in FIG. 3(n).

In the case of the separation mode, only a designated one of the xenon discharge tubes is fired at the frequency of 12 Hz, each shot emitting a given amount of light which is determined in a manner similar to that during the additive low mode. Similarly, the percentage of the remaining amount of the exposure value is also displayed in a manner as shown in FIG. 3(o) in the case of the firing of the red xenon discharge tube XR, in FIG. 3(p) in the case of the firing of the green xenon discharge tube XG, and in FIG. 3(q) in the case of the firing of the blue xenon discharge tube XB.

It is to be noted that, during the additive mode and the additive low mode, a balance adjustment is carried out such that the given amount of light emitted is so adjusted that the percentages for the three colors decrease in the same rate. Thus, the projected amount of light for the three colors are well balanced every moment. This balance adjustment is effected particularly when the percentage difference between the two colors becomes greater than 4% in the case of the additive mode or when it becomes greater than 1% in the case of the additive low mode. One purpose of having this balance adjustment is to keep the three colors in a well balanced condition relatively to the set exposure value, even when the partial intensive burning is carried out. In other words, if the three colors should lose their balance during the exposure, and if a partial cover-up operation is carried out while the color balance is lost, the ratio of three colors exposed on the cover-up portion after the exposuring operation, and that on the non-cover-up portion are different, resulting in a color variation between the two portions.

It is to be noted that the above described balance adjustment will not be carried out when the percentage becomes very small. The reason for this is becaused when the percentage becomes very small, the amount of light emitted in each shot becomes very small so as to end the exposure operation precisely to the required amount. But, if such a balance adjustment is carried out at the ending, the total exposure amount of light may undesirably exceed the required amount.

It is also to be noted that, since in the case of additive mode or additive low mode, the percentages of the remaining light amount for the three colors are about the same, only one numeral carrying the lowest percentage may be displayed, instead of three as described in the above example.

I. Exposing Operation

The exposure is initiated when the start/stop key STK is depressed during the exposure value data setting (display) mode or the ring-around mode. When the exposure operation starts, the percentages are consequently displayed as shown in FIGS. 3(m) to 3(q). However, the exposure will not be initiated even if the start/stop key STK is depressed, while the focus mode, in which the xenon discharge tubes XG and XF are alternately fired at high speed, is taking place, while an error marking is displayed, while the condition ready for the computation of the average value is established, or while the memory data is displayed. This is for the purpose of inhibitting the initiation of the exposure during the focus adjustment because no one do not effect the exposure during the focus adjustment and also of inhibitting the initiation of the exposure because no exposure value data is displayed in the other events.

When the start/stop key STK is depressed for the first time, the exposure operation initiates from the very beginning as described above. Then when the start/stop key STK is depressed for the second time, the exposure operation temporarily stops. And then, when the start/stop key STK is depressed again for the third time, the exposure operation continues. In this manner, the exposure operation can be interrupted any time, and can be started again any time to continue it from where it had stopped, thereby completing one exposure operation. If the start/stop key STK is depressed to interrupt the exposure operation during the additive mode or the additive low mode, the three xenon tubes will not stop firing immediately, but will stop after a couple small firings, so that after such small firings, the remaining amounts of exposure for the three colors result in difference in percentage not more than ±1%.

However, if the start/stop key STK is depressed to interrupt the exposure operation during the separation mode, the firing stops immediately when the start/stop key is depressed.

If the firing is immediately interrupted at the time of depression of the start/stop key STK in the case of additive mode or additive low mode in which green, blue and red xenon discharge tubes are fired one after another with the balance adjustment being carried out among three colors, there may occur a case in which the firing is interrupted while effecting the balance adjustment. If this occurs, the percentage of remaining amount of exposure for one color will be much different from that of the other colors, resulting in out-of-balance.

The reason for keeping the difference of the remaining amounts of exposure for the three colors in percentage not more than ±1% when intercepting exposure, will now be described. In the event of the presence of variation at the time of interruption of the exposure, when the partial cover-up printing is subsequently performed by partly covering the paper with the light interceptor and then again effecting the exposure, the color balance at the time of termination of the exposure and that at the time the exposure is interrupted differ from each other. Because of this, a color variation occurs between a portion covered by the light interceptor and a portion not covered thereby. In order to enable the partial cover-up printing to be performed with no occurrence of such a color variation, the balance adjustment is carried out when the exposure is interrupted, as hereinbefore described.

When the print mode key PRK is depressed while the exposure is interrupted, the print mode can be changed, e.g., from additive mode to additive low mode, or vice versa, or from additive mode to separation mode, or vice versa, or from additive low mode to separation mode, or vice versa. Accordingly, a single printing work can be performed using a combination of the additive mode, additive low mode, single firing of the red xenon discharge tube, single firing of the blue xenon discharge tube and single firing of the green xenon discharge tube as desired. Accordingly, a print can be produced to any desired design by using a combination of light interceptor of different shapes.

Where the printing work is desired to be cut off while the exposure has been interrupted, what is to do is to depress a data/ring key, and the display will resume the initial state similar to that before the start of the exposure.

Where the exposure is desired to be effected again, what is to do is to depress the start/stop key STK.

When the remaining exposure value of all the three colors becomes 0%, the exposure is terminated and the display resumes the initial state similar to that before the start of the exposure.

It is to be noted that, even in the case of the use of the black-and-white film in the actual printing work, the analyze memory, the analyze start and the manual setting of the exposure value data (although there is a difference in the operation under the ring-around mode) can be performed in a manner similar to that performed with the use of the negative or positive color film, and the exposing operation can be carried out in a similar manner.

Circuit Arrangement

Figure 4:
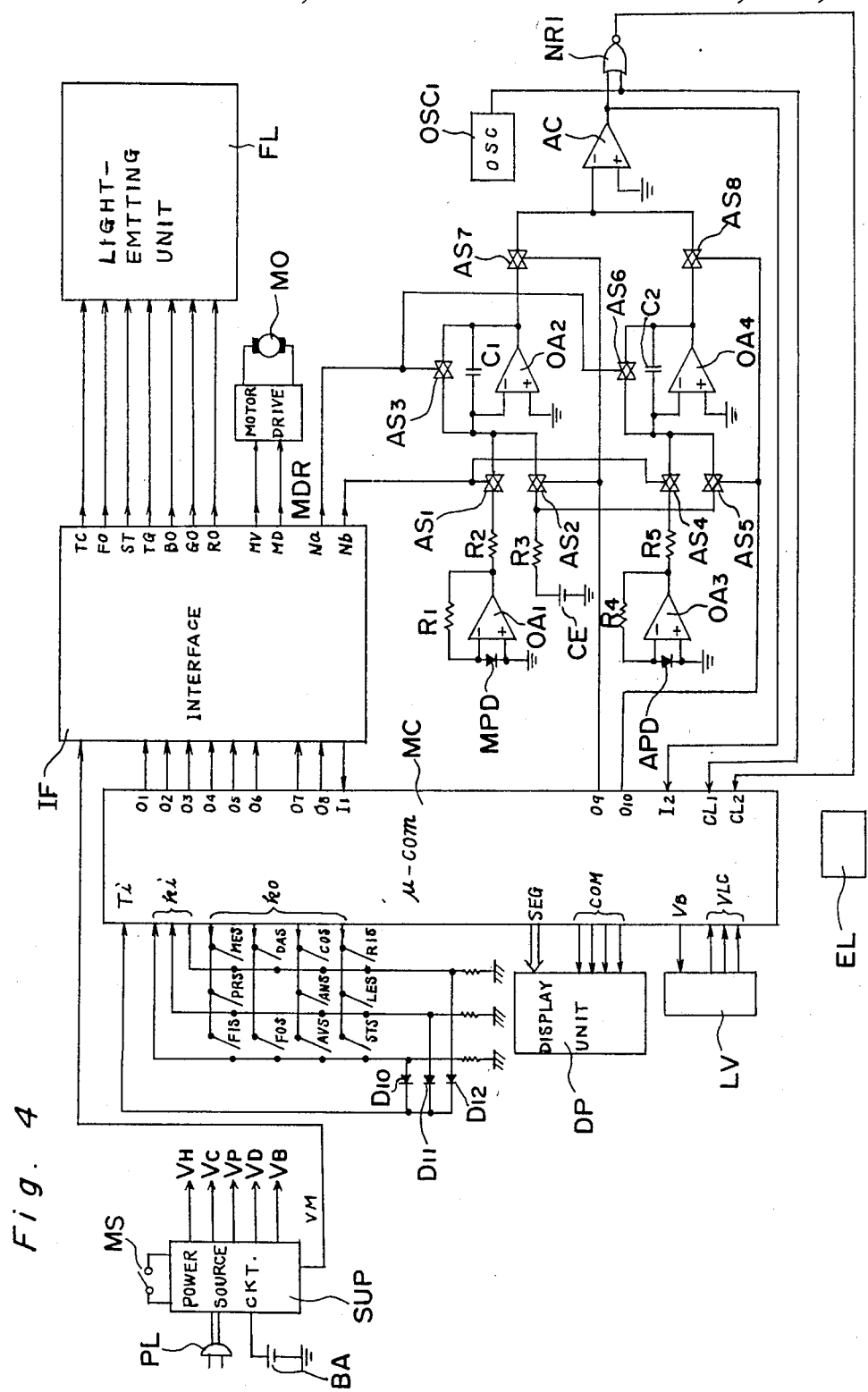
FIG. 4 is a circuit diagram showing an entire circuit arrangement for controlling the enlarger.

FIG. 4 illustrates a schematic block diagram of the entire circuit arrangement employed in the color enlarger embodying the present invention. Referring now to FIG. 4, reference character PL represents a power intake plug adapted to be plugged in a commercial A.C. power outlet socket, and reference BA represents a battery providing back-up power source for the microcomputer MC. Reference character MS represents a power control switch. So long as this power control switch MS is opened, no D.C. high voltage is supplied from a terminal VH to a light-emitting unit FL. Reference character SUP represents a power source circuit having the terminal VH through which the D.C. high voltage of, for example, 300 volts is supplied to the light-emitting unit FL. The power source circuit SUP also has a terminal VC through which the A.C. power is supplied to an EL plate used for back-lighting a liquid crystal display unit DP, a terminal VP through which a D.C. voltage of, for example, 10 volts is supplied to a motor drive circuit MDR and a portion of the light-emitting unit FL, a terminal VD through which a D.C. voltage of, for example, 5 volts is supplied to an interface circuit IF and both an analog circuit portion of the circuit of FIG. 4 and a portion of the light-emitting unit FL, and a terminal VB through which a D.C. voltage of, for example, 5 volts is supplied. In the case of this terminal, no A.C. electric power is supplied from the plug PL, an output voltage from the battery BA can be outputed therethrough as a power source voltage. This terminal VB provides a power source for the microcomputer MC and an oscillator OSC1. The power source circuit SUP further has a terminal VM through which "LOW" is outputted when the voltage appearing on the terminal VH connected to the light-emitting unit FL is lower than a predetermined voltage, for example, 150 volts, and "HIGH" is outputted when the same is higher than the predetermined voltage. And when and so long as the main switch MS is opened, the terminal VM produces "LOW".

The microcomputer MC used in the present invention may be a commercially available microcomputer, for example, a model manufactured and sold by Nippon Electric Co., Ltd. under a trade mark "μ PD 7503G". The microcomputer MC has a group of terminals, identified generally by ko, from which strobe signals emerge to find which one of the keys has been depressed, and also another group of terminals, generally identified by ki for receiving one of the strobe signals which is fed thereto after having passed through such one of the keys then depressed. Where no keys are scanned, all of the terminals ko are held in "HIGH" state, and when any one of the keys is depressed, a terminal Ti is rendered "HIGH" by a corresponding one of the diodes D10, D11, and D12. The terminal Ti is an interrupt terminal, and when the "HIGH" signal is fed thereto, the microcomputer starts its operation from a specific address location.

Reference character FIS represents a switch adapted to be closed when the film type key FIK is depressed, reference character PRS represents a switch adapted to be closed in response to the depression of the print mode key PRK, reference character MES represents a switch adapted to be closed in response to the depression of the memory key, reference character FOS represents a switch adapted to be closed in response to the depression of the focus key FOK, reference character DAS represents a switch adapted to be closed in response to the depression of the data/ring key, reference character AVS represents a switch adapted to be closed in response to the depression of the average key AVK, reference character ANS represents a switch adapted to be closed in response to the depression of the analyze key ANK, reference numeral COS represents a switch adapted to be closed in response to the depression of the color key COK, reference character STS represents a switch adapted to be closed in response to the depression of the start/stop key STK, reference character LES represents a switch adapted to be closed in response to the depression of the left key LEK, and reference numeral RIS represents a switch adapted to be closed in response to the depression of the right key RIK.

The liquid crystal display unit DP effects one of the various displays as shown in FIGS. 3(a) to 3(q) according to input signals fed from a group of common terminals COM and a group of segment terminals SEG of the microcomputer MC. A block identified by LV receives a power source voltage VB from the microcomputer MC and supplies three voltages of different levels through a group of terminals VLC, respectively, for driving a liquid crystal. Reference character EL represents an EL plate for back-lighting the liquid crystal display unit DP.

Figure 18:
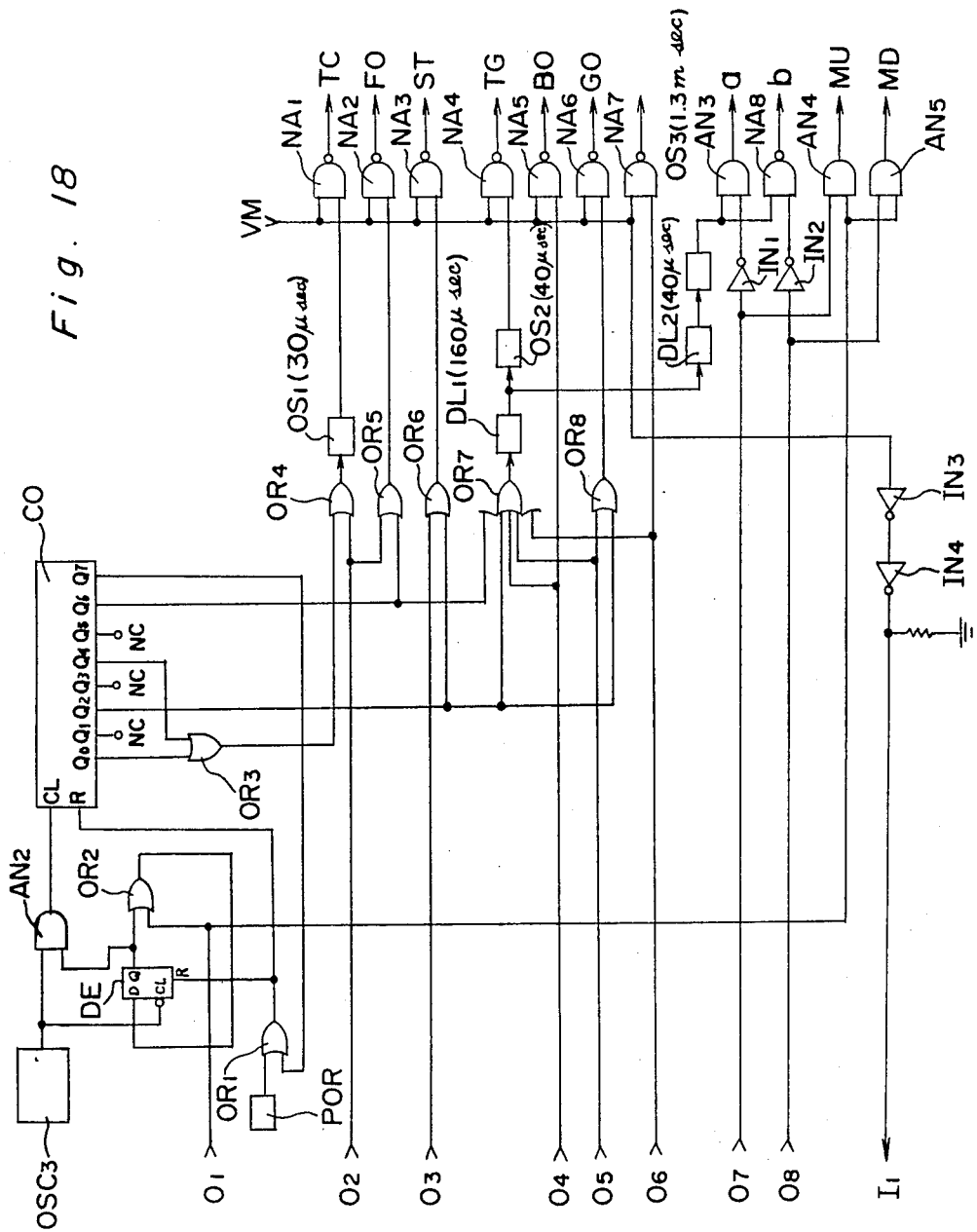
FIG. 18 is a circuit diagram showing a detail of an interface circuit IF shown in FIG. 4.
Figure 21:
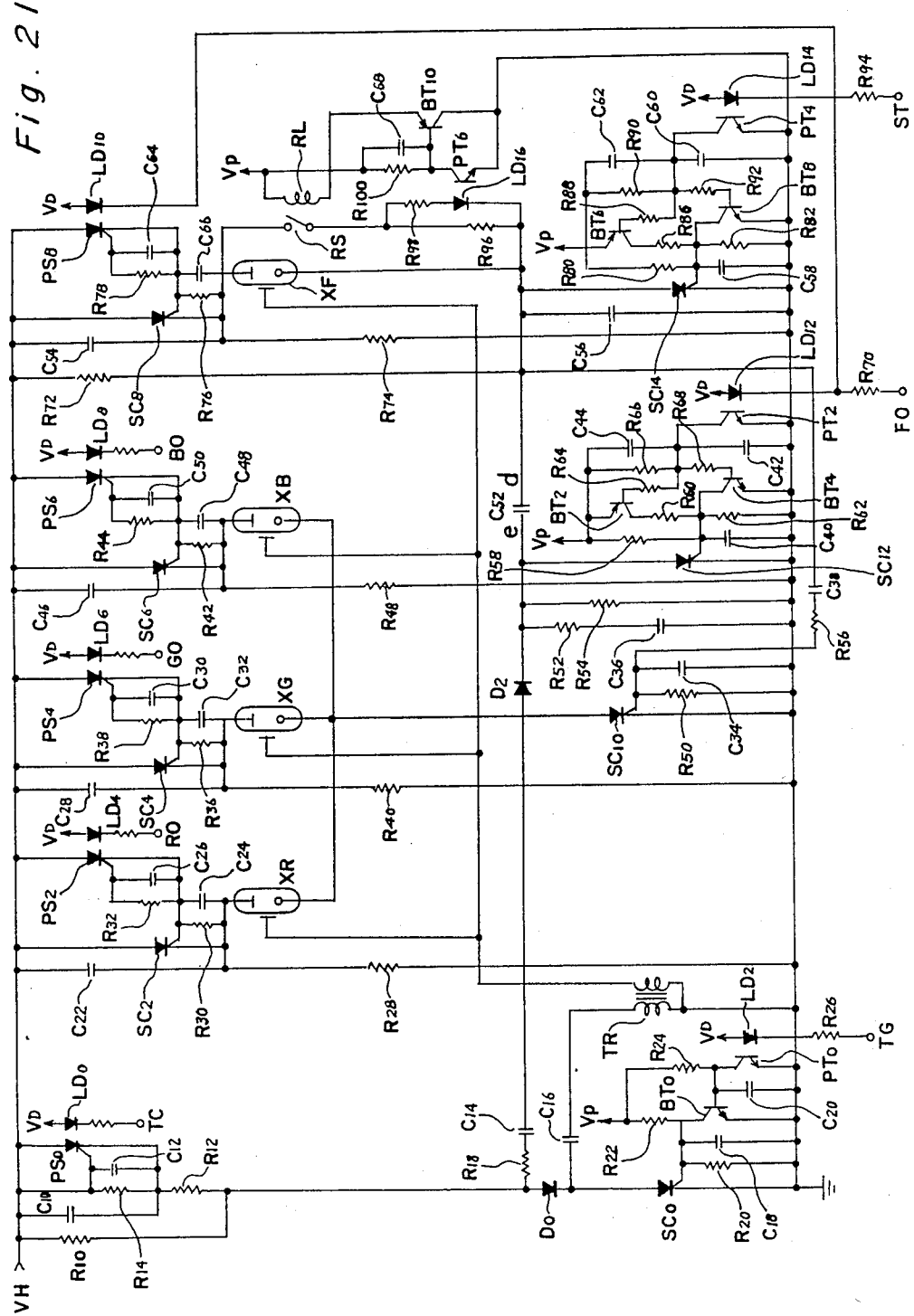
FIG. 21 is a circuit diagram showing a detail of firing circuit FL.

The interface circuit IF has a plurality of output terminals TC, FO, ST, TG, BO, GO and Ro from which respective outputs are generated for controlling the light-emitting unit FL according to output signals generated thereto from output terminals 01 to 06 of the microcomputer MC, and also output terminals MV and MD from which respective output signals for controlling the motor drive circuit MDR are generated during the focus mode in response to output signals applied thereto from output terminals 07 and 08 of the microcomputer MC. The interface circuit IF also has output terminals Na and Nb from which output signals are generated during the analyze light-measurement to control the analog-to-digital conversion and the light measurement performed by the analog circuit portion of the circuit of FIG. 4. The detail of this interface circuit IF is shown in FIG. 18 and will be discussed later. Also, the detail of the light-emitting unit FL is also shown in Fig. 21 and will be discussed later.

Terminals 09, 010 and I2 are utilized during the analog-to-digital conversion, the function of each of which will be described in detail later.

The oscillator OSC1 applies clock pulses continuously to an input terminal CL1 of the microcomputer MC, and also applies to an input terminal CL2 of the microcomputer MC through a NOR gate NR1 for the analog-to-digital conversion.

FIGS. 5 to 17 illustrate flow chars showing the sequence of operation of the microcomputer MC, to which reference will now be made for the discussion of the operation of the circuit arrangement shown in FIG. 4.

The microcomputer MC is fed continuously with the electric power and the clock pulses, and is held in a "HALT" state it does not perform any function. During the "HALT" state, the microcomputer MC consumes a small amount of electric power. Starting from this "HALT" state, and when an interrupt signal, which is generated as a result of the interruption of an internal timer of the microcomputer MC or as a result of the depression of any one of the keys, is applied to the interruption terminal Ti of the microcomputer MC, the microcomputer MC is released from the "HALT" state for executing commands from a particular address location.

In the case of the timer interruption, the program proceeds to a step #1 to determine whether or not the firing is effected. If it is determined as YES at step #1, i.e., the interruption is effected during the firing, the terminal 03 produces a "HIGH", thereby interrupting the firing operation. Thereafter, a firing/light-measuring subroutine is then executed. However, if it is determined at step #1 that the firing is not effected, the program proceeds to step #4 to determine whether or not the exposure is taking place. If it is determined in step #4 that the exposure is taking place, the terminal 02 produces "LOW", thereby interrupting the charging of a commutating capacitor C52 shown in FIG. 21 and the program then proceeds to step #367.

If it is determined in step #4 that the exposure is not performed, the program advances to step #8, and 15 seconds subsequent to the depression of the color key COK is counted in the timer interruption which takes place every 0.3 second in this case.

At step #8, it is determined whether or not the terminal I1 is producing "HIGH". It is to be noted that the terminal I1 produces "HIGH" when a high voltage, such as 150 volts or higher, is produced through the terminal VH after the closure of the main switch MS, and "LOW" when no such a high voltage is produced. If the terminal I1 is producing "LOW", a flag 15FS signifying the 15 second counting is reset and, at the same time, the display unit DP is maintained blank, i.e., with nothing consequently displayed through the display unit DP. Thereafter, the program proceeds to step #25 permitting the interruption and, at the same time, establishing the "HALT" state.

If it is determined at step #8 that the terminal I1 is producing "HIGH" as occurs when the high voltage is outputed through the terminal VH, the program proceeds to step #12 to determine whether or not the flag 15SF carrying "HIGH" indicating that the microcomputer MC is counting 15 seconds. If the flag 15FS is carrying "HIGH", a program proceeds to step #13 in which a data for counting the 15 seconds as stored in a register 15SD is subtracted by one, and then the program proceeds to step #14 to determine whether or not the data in the register 15SD has reached down to 0. If it is determined at step #14 that the data in the register 15SD has reached down to 0, the program proceeds to step #15 in which it is determined whether or not the mode is memory data display mode. If it is in the memory mode, the color markings are turned off to establish the display shown in FIG. 3(d), and if it is not in the memory mode, and, hence, in the exposure value data mode, all of the color markings, RCD, GMD, BYD and BDI are displayed in the manner as shown in FIG. 3(a). Thereafter, the program proceeds to step #24 to reset the flag 15FS and then to step #25. On the other hand, if it is determined at step #12 that the flag 15FS is carrying "0", the program skips to step #25. Accordingly, such a display, for example, as shown in FIG. 3(a) is retained.

In the event that any one of the keys has been depressed and the interruption signal is accordingly inputed to the interruption terminal Ti, it is discriminated in step #18 whether or not the terminal I1 is "HIGH". If the terminal I1 is determined as "LOW" at step #18, the microcomputer MC performs no function and the program proceeds to step #25. Thus, unless the main switch MS is closed, no display is effected at step #10 and any further key manipulation is not accepted.

If it is discriminated at step #18 that the terminal I1 is "HIGH", the program proceeds to step #19 in which it is discriminated whether or not the display is effected. In case of no display, a condition in which the previous display is effected is revived immediately. That is, in response to the opening of the main switch MS, a condition wherein the display is erased and no operation takes place is established, and then, by the closure of the main switch MS, it would not result in the display mode unless any one of the keys is subsequently depressed. It is, however, to be noted that no function corresponding to the depressed key is performed, but the key manipulation so effected under these circumstances is merely to carry on the preceding display.

If it is determined at step #19 that the display is effected, all of the indexes CP, RP, MP, GP, YP, BLP, DAP, and BRP are erased (reset) and, then, the program proceeds to step #21 to discriminate which one of the keys has been depressed. At the subsequent step #22, the function corresponding to the discriminated key is performed, and the program subsequently proceeds to step #25. Hereinafter, the functions performed at step #22 in correspondence with the keys will be individually described.

Figure 6:
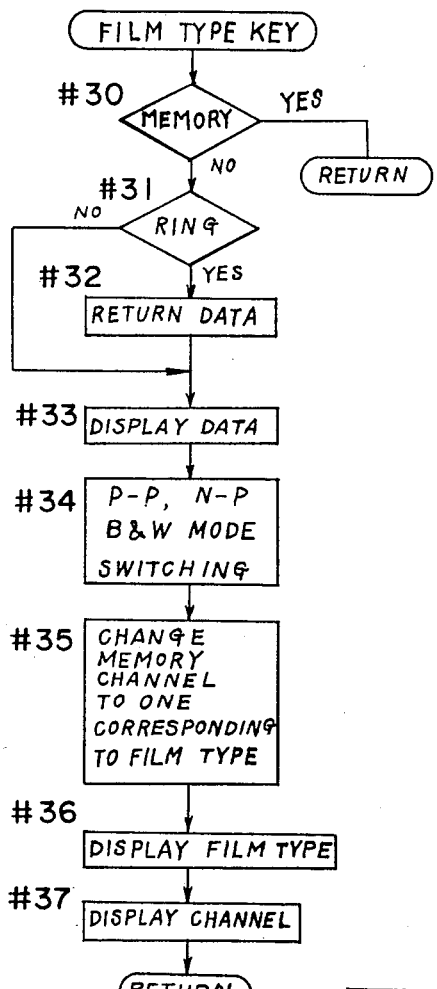
FIG. 6 is a flow chart showing an operation of microcomputer MC when a film type key FIK is depressed.

FIG. 6 illustrates a flow chart associated with the function to be performed when the film type key FIK has been depressed. As shown in FIG. 6, when the film type key FIK is depressed, it is determined at step #30 whether or not the memory data display mode is established. If YES, the program returns through a main flow to step #25 to establish the "HALT" state. Thus, during the memory mode, the film type key FIK can not be accepted. However, if it is determined as NO in step #30, the program proceeds to the subsequent step #31 to determine whether or not the ring-around mode is established. If it is determined that the ring-around mode has been established, the exposure value data which has been held back is restored, which data is subsequently displayed. However, if it is not determined that the ring-around mode has been established, the exposure value data is displayed in the form as it is.

Thereafter, the mode is switched over in such a way as to assume the mode in which the positive film is used, if it is the mode in which the negative film is used; the mode in which the black-and-white film is used, if it is the mode in which the positive film is used; and the mode in which the negative film is used, if it is the mode in which the black-and-white film is used. Then, the program proceeds to step #35 wherein the memory channel is switched over to correspond with the particular film type. The memory channels are provided with the numbers 0 to 6, respectively, and, therefore, in total, 7 memory channels are available: three channels, 0 to 2, are allocated to the negative film; two channels, 3 and 4, to the positive film; and two channel, 5 and 6, to the black-and-white film. The three channels for the negative film are designated and displayed as Channel 1 of negative, Channel 2 of negative and Channel 3 of negative. Similarly the two channels for the positive film are designated and displayed as Channel 1 of positive and Channel 2 of positive, and the two channels for the black-and-white film are designated and displayed as Channel 1 of black-and-white and Channel 2 of black-and-white. When the film type key FIK is depressed, the memory channel 0, 3 or 5 is automatically selected in correspondence with a new film type and the display is either Channel 1 of positive, Channel 1 of negative, or Channel 1 of black-and-white. It is to be noted that the memory channel represents the number of a register in which the memory data obtained during the previously described reference color memorizing operation (analyze memory) is stored.

At the subsequent step #36, the film type is displayed and, at the following step #37, the aforesaid memory channel is displayed. Then, the program returns to step #25.

Figure 7:
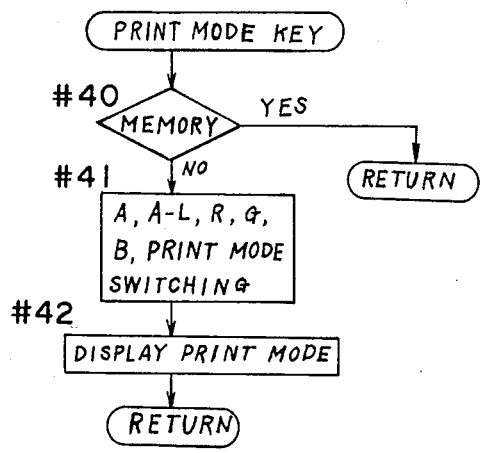
FIG. 7 is a flow chart showing an operation microcomputer MC when a print mode key is depressed.

FIG. 7 illustrates a flow chart associated with the function to be performed when the print mode key PRK has been depressed. As shown in FIG. 7, subsequent to the depression of the print mode key PRK, a decision step #40 is initiated to determine whether or not the memory mode is established. If it is determined that the memory mode is established, the program skips to step #25. Thus, during the memory mode, the print mode key PRK can not be accepted.

However, if it is determined at step #40 that the memory mode is not established, the mode is changed to the additive low exposure mode in the case of the additive exposure mode, the red light exposure mode in the case of the additive low exposure mode, the green light exposure mode in the case of the red light exposure mode, the blue light exposure mode in the case of the green light exposure mode, or the additive exposure mode in the case of the blue light exposure mode, accompanied by the display, through the display area PMD, of a symbol corresponding to the switched exposure mode. Thereafter, the program returns to step #25.

Figure 8:
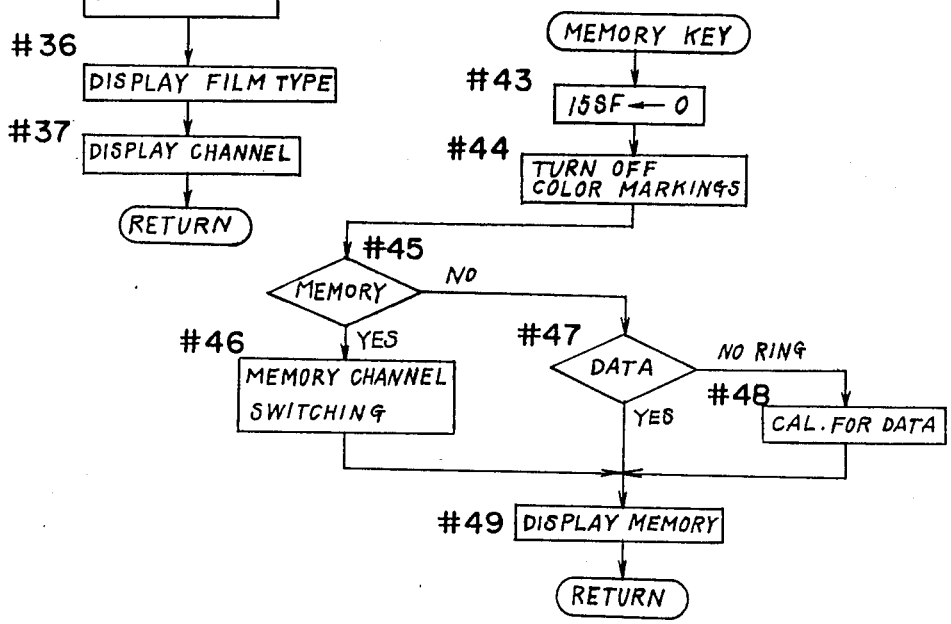
FIG. 8 is a flow chart showing an operation of microcomputer MC when a memory key MEK is depressed.

FIG. 8 illustrates a flow chart associated with the function to be performed when the memory key MEK has been depressed. Referring to FIG. 8, subsequent to the depression of the memory key MEK, the flag 15SF is reset at step #43 and the color markings are subsequently erased. Then, in step #45, it is determined whether or not the memory mode is established. If the memory mode has been established, the program proceeds to step #46 at which the memory channel is changed. The channel displayed will be such that Channel 1, 2 or 3 will be changed to Channel 2, 3 or 1, respectively, in the case of the negative film, or Channel 1 or 2 will be changed to Channel 2 or 1, respectively, in either one of the case of positive film or black-and-white film. If this is discussed in terms of the channels represented by 0 to 6, the channel 0, 1, 2, 3, 4, 5 or 6 is switched over to channel 1, 2, 0, 4, 3, 6 or 5, respectively. At the next step #49, the designated channel and the memory data stored in that channel are displayed. Thereafter, the program returns to step #25.

However, if it is determined at step #45 that the memory mode is not established, the program advances to step #47 in which it is determined whether or not the mode is the exposure value data mode. If YES, the memory data stored at the memory channel then designated is displayed. Thereafter, the program returns to step #25. It is to be noted that, since "CH" is displayed at the display area CRD during the exposure value data mode, this display "CH" is erased.

On the other hand, if the determination at step #47 is NO, it means that the mode is ring-around mode and, therefore, the program proceeds to step #48 at which computation is performed to change the exposure value data, which has been changed by the ring arithmetic operation, back to the center value data. Then, the program advances to step #48 in which a calculation for changing the data from the data for the ring-channel calculation to the data for the original center value is carried out. Then, the program advances to step #49 in which the display of the memory channel then designated, and the display of memory data stored at that channel are carried out. Thereafter, the program returns to step #25. It is to be noted that, if no memory data is stored in the designated memory channel, 0 is displayed for the memory data.

Figure 9:
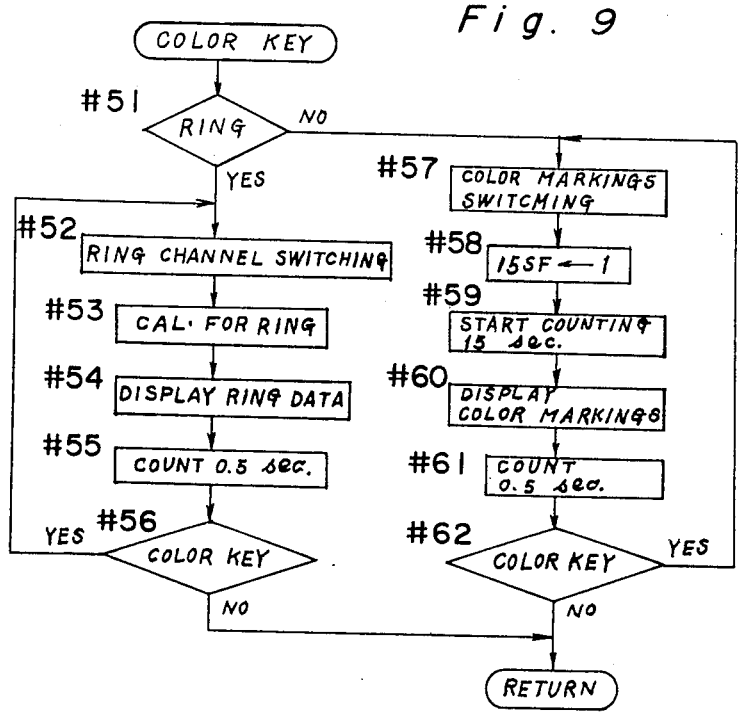
FIG. 9 is a flow chart showing an operation of microcomputer MC when a color key COK is depressed.
Figure 13A:
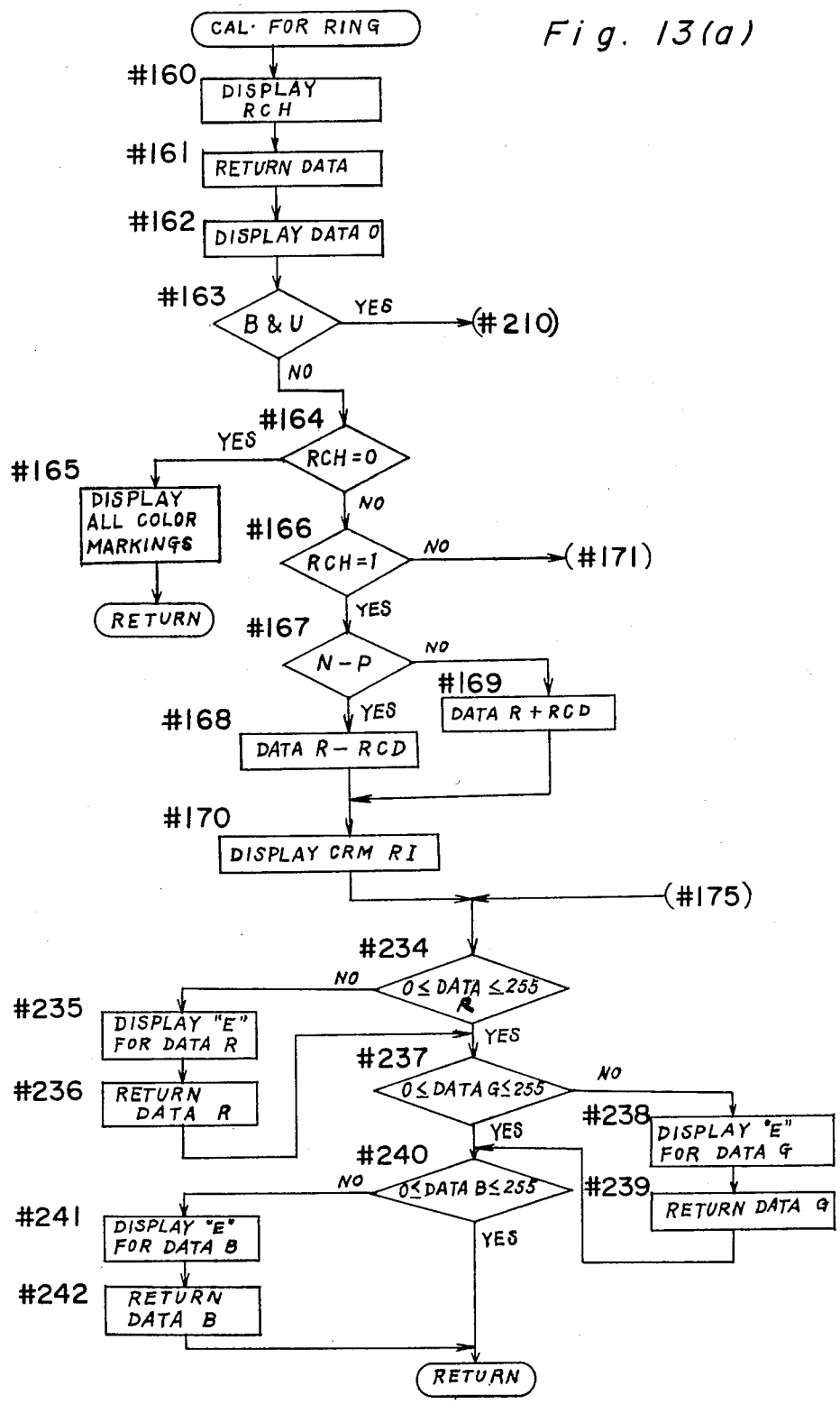
FIGS. 13(a), 13(b) and 13(c) taken together show a flow chart for the ring calculation.
Figure 13B:
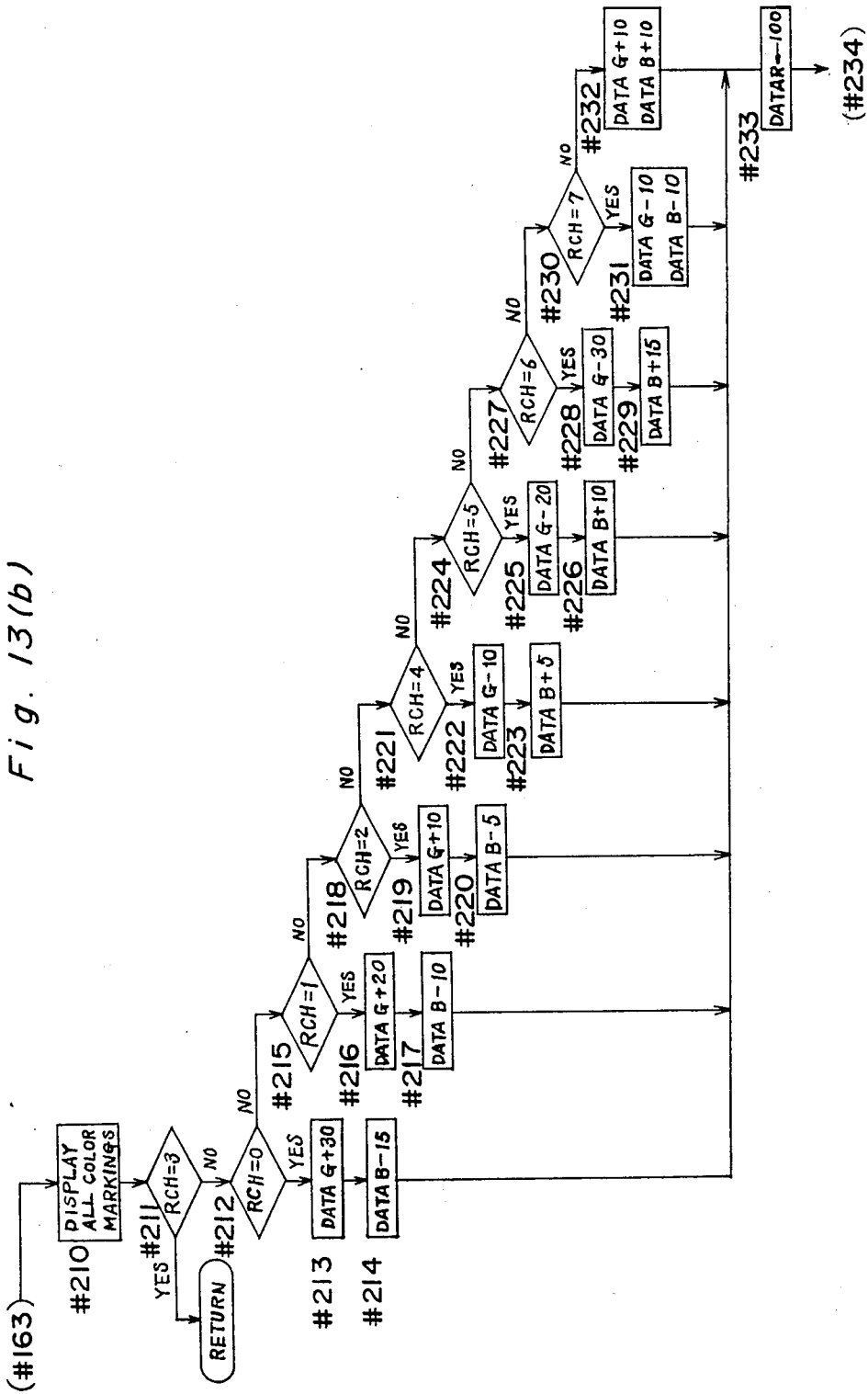
Figure 13C:
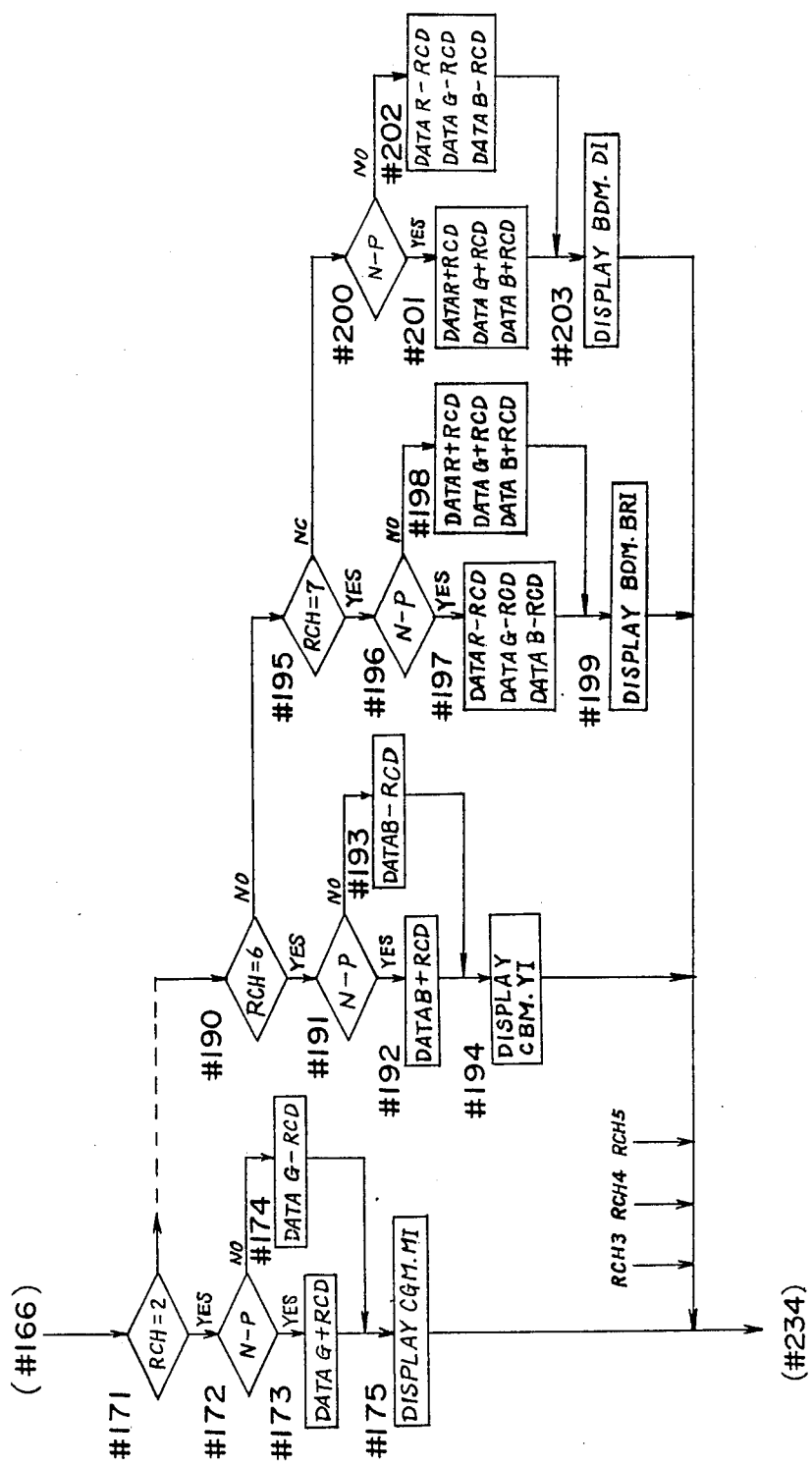

FIG. 9 illustrates a flow chart associated with the function to be performed when the color key COK is depressed. Referring to FIG. 9, subsequent to the depression of the color key COK, it is determined at step #51 whether or not it is a ring-around mode. If the determination is YES, the ring channel is switched so that the ring arithmetic operation corresponding to the switched ring channel is performed and, at the same time, the ring data is displayed. This arithmetic operation is, as described in Tables 2, 3 and 4, an operation to subtract the data of a ring width from the center exposure value data or to add the data of the ring width to the center exposure value data, and it depends on the ring channel to which data of the red, green and blue exposure value data the subtraction or addition should be subjected. A specific example of this ring arithmetic operation is shown in FIG. 13 and, therefore, the details thereof will be described later.

After the ring data display has been effected at step #54, and after 0.5 of a second has subsequently passed, it is determined at step #56 whether or not the color key COK is kept depressed. If the color key COK is kept depressed, the program returns back to step #52 to perform the previously described operation, but if the color key COK is not kept depressed, the program returns back to the step #25. Therefore, it is understood that when the color key COK is kept depressed, the ring channel changes at a rate of 0.5 of a second.

If it is determined at step #51 such that it is not ring-around mode (the exposure value data mode or the memory data mode), the switching of the color markings RCD, GMD, BYD and BDI takes place, so that the color markings RCD, GMD, BYD and BDI are displayed one at a time sequentially in given order. This corresponds to an operation wherein a register for color marking capable of registering a numeral data up to 3, changes its content in the order of 0, 1, 2, 3, 0, 1, 2, 3 and so on. And, 0, 1, 2 and 3 correspond respectively to the color markings RCD, GMD, BYD and BDI. At 0, 1 and 2, the exposure value data or memory data of the red, green and blue colors can be changeable, respectively, but at 3 that of the three colors can be changeable.

Subsequent to the switching of the color marking, the flag 15SF for indicating that the 15 second counting is performed is set to "1" to initiate the 15 second count. Then, the color marking is displayed, and after 0.5 of a second, the program proceeds to step #62. In step #62, it is determined whether or not the color key COK is kept depressed. If it is determined that the color key COK is kept depressed, the program returns to step #57, but if it is determined that the color key COK is not kept depressed, the program returns back to step #25. Thus, even in this case, if the color key COK is kept depressed, the color markings are sequentially switched on one at a time at a rate of 0.5 of a second. It is to be noted that the time of 15 seconds is adapted, as hereinbefore described, to accept the right key RIK or the left key LEK during this 15 seconds and, therefore, this 15 second interval is counted. Accordingly, as hereinbefore described with reference to FIG. 5, in the case of the exposure value data mode or memory data mode, if only one of the color markings is displayed, the data corresponding to such one of the color markings can be changeable, but if all of the color markings are displayed under the exposure value data mode or if all of the color markings are not displayed under the memory data mode, it is so indicated that it is impossible to change the data.

Figure 10:
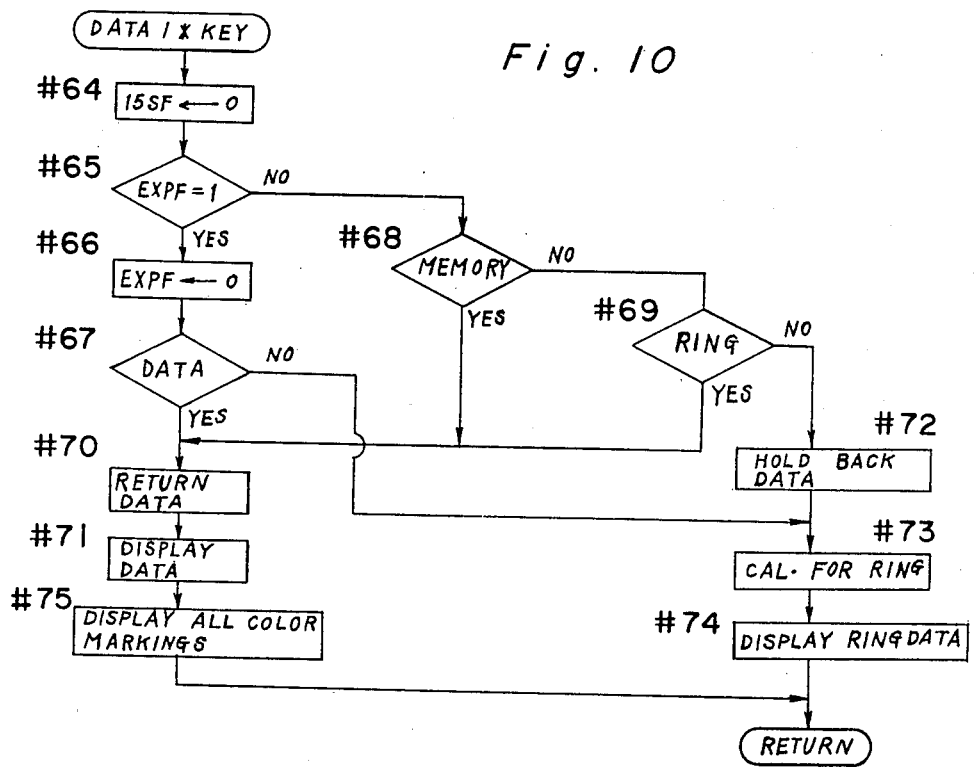
FIG. 10 is a flow chart showing an operation of microcomputer MC when a data/ring key DAK is depressed.

FIG. 10 illustrates a flow chart associated with the function to be performed when the data/ring key DAK is depressed. This function is performed also at the completion of the exposure. The program is such that at step #64 the flag 15FS is reset. Then, at step #65, it is determined whether or not a flag EXPF is carrying "1". This flag EXPF carries "1" during the exposure, and thus it is "1" at the time when the data/ring key DAK is depressed while the exposure is interrupted, or at the time of completion of the exposing operation. If it is determined at step #65 that the flag EXPF is carrying "1", the flag EXPF is subsequently reset at step #66, and then, it is determined at step #67 whether or not the mode is exposure value data mode. If it is the exposure value data mode as determined at step #67, the exposure value data is restored at the subsequent step #70. Thereafter, the exposure value data mode is displayed at step #71. Then, at step #75 all of the color markings (as shown in FIG. 3(a)) are displayed. Thereafter, the program returns to step #25.

However, if the mode is not the exposure value data mode as determined at step #67, it means that the mode is the ring-around mode, because that, in this case, no exposure is carried out from the memory mode. In such a case, the program proceeds to step #73 at which the ring arithmetic operation is performed, the resultant ring data being subsequently displayed (as shown in FIGS. 3(j), 3(k) and 3(l)). The displayed ring data is identical with what is displayed for the ring channel prior to the start of the exposure. Thereafter, the program returns to step #25.

On the other hand, if the flag EXPF is carrying "0" as determined at step #65, the program proceeds to step #68 wherein it is determined whether or not the data is memory data mode. If the mode is the memory data mode, the program advances to step #70 for changing the mode to the exposure value data mode. On the other hand, if the determination at step #68 is such that it is not the memory data mode, the program further proceeds to another decision step #69 to determine whether or not it is the ring-around mode. If it is the ring-around mode, the program proceeds to step #70 to change the mode to the exposure value data mode. However, if it is not the ring-around mode, but the exposure value data mode, the exposure value data is held back at step #72 and, then, the ring arithmetic operation is performed at step #73. Thereafter, the ring data is displayed at step #74. And, the program proceeds to step #25.

Figure 11:
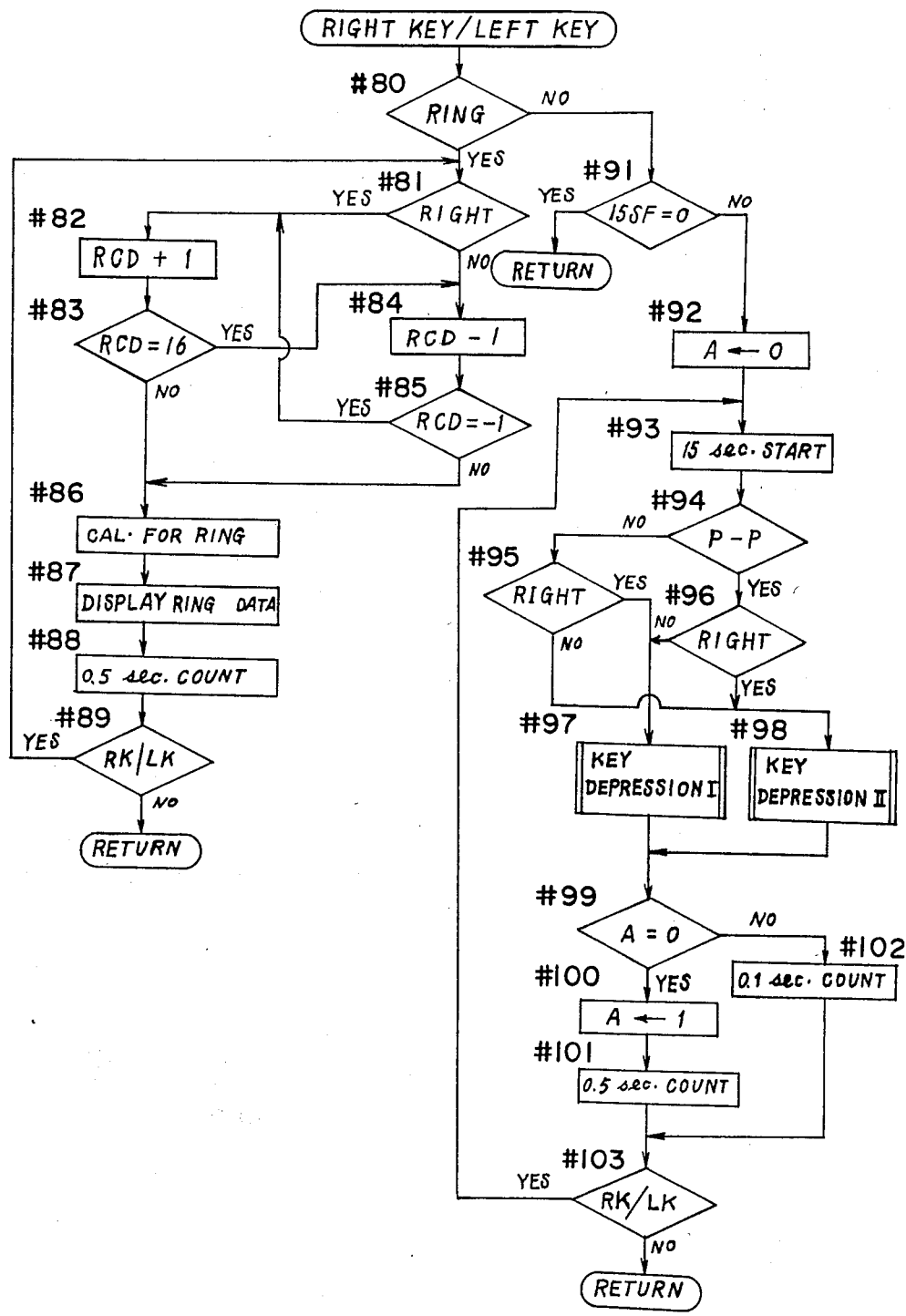
FIG. 11 is a flow chart showing an operation of microcomputer MC when a right key RIK or left key LEK is depressed.

FIG. 11 is a flow chart showing the function associated with the depression of any one of the right and left keys RIK and LEK. At step #80, whether or not it is the ring-around mode is determined. The program proceeds to step #80 when the mode is the ring-around mode and to step #91 when the it is not. The decision step #81 determines whether or not the right key LEK has been depressed and, if the right key LEK has been depressed, step #82 follows to add 1 to the data RCD of the ring width. At the subsequent decision step #83, it is determined whether or not the ring width data RCD has become 16. If the determination at step #83 indicates that the ring width data RCD has become 16, it means that the limit of the ring width has been exceeded, and therefore, the program proceeds to step #84 to subtract 1 from the data RCD to make it equal to 15. Thereafter, the program advances to step #85. On the other hand, if the determination at step #83 indicates that the ring width data RCD is not 16, the program advances to step #86.

Referring to step #81, if the determination at step #81 is such that the right key LEK has not been depressed, that is the left key RIK has been depressed, the program proceeds to step #84 to subtract 1 from the ring width data RCD. If the ring width data RCD has been found to be −1 at the decision step #85, the program proceeds to step #82 to add 1 to the data RCD to make it equal to 0. As hereinbefore described, step #82 is followed by step #86 through decision step #83. However, if the data RCD has been found not to be −1 at the decision step #85, the program proceeds to step #86.

At step #86, the ring arithmetic operation is performed based on the new ring width data RCD with the ring data subsequently displayed. After the lapse of 0.5 of a second at step #88, the program proceeds to a decision step #89 to determine if the right key RIK or the left key LEK has been depressed. If the right or left key has been depressed, step #89 is followed by step #81, but if it has not been depressed, the program returns to step #25. In other words, if the right or left keys RIK or LEK is kept depressed, the ring width data is changed by 1 at a rate of 0.5 of a second.

If it is determined at step #80 that it is not the ring-around mode, the program proceeds to the decision step #91 to determine whether or not the flag 15SF is "1". If the flag 15SF is found to be "0", the program returns immediately to step #25. Accordingly, during a period of 15 seconds subsequent to the release of the operator's finger from the color key COK that has been depressed, or when any one of the left and right keys RIK and LEK is depressed after 15 seconds subsequent to the release of the operator's finger from one of the right and left keys, neither the right key RIK nor the left key LEK is accepted.

Figure 12A:
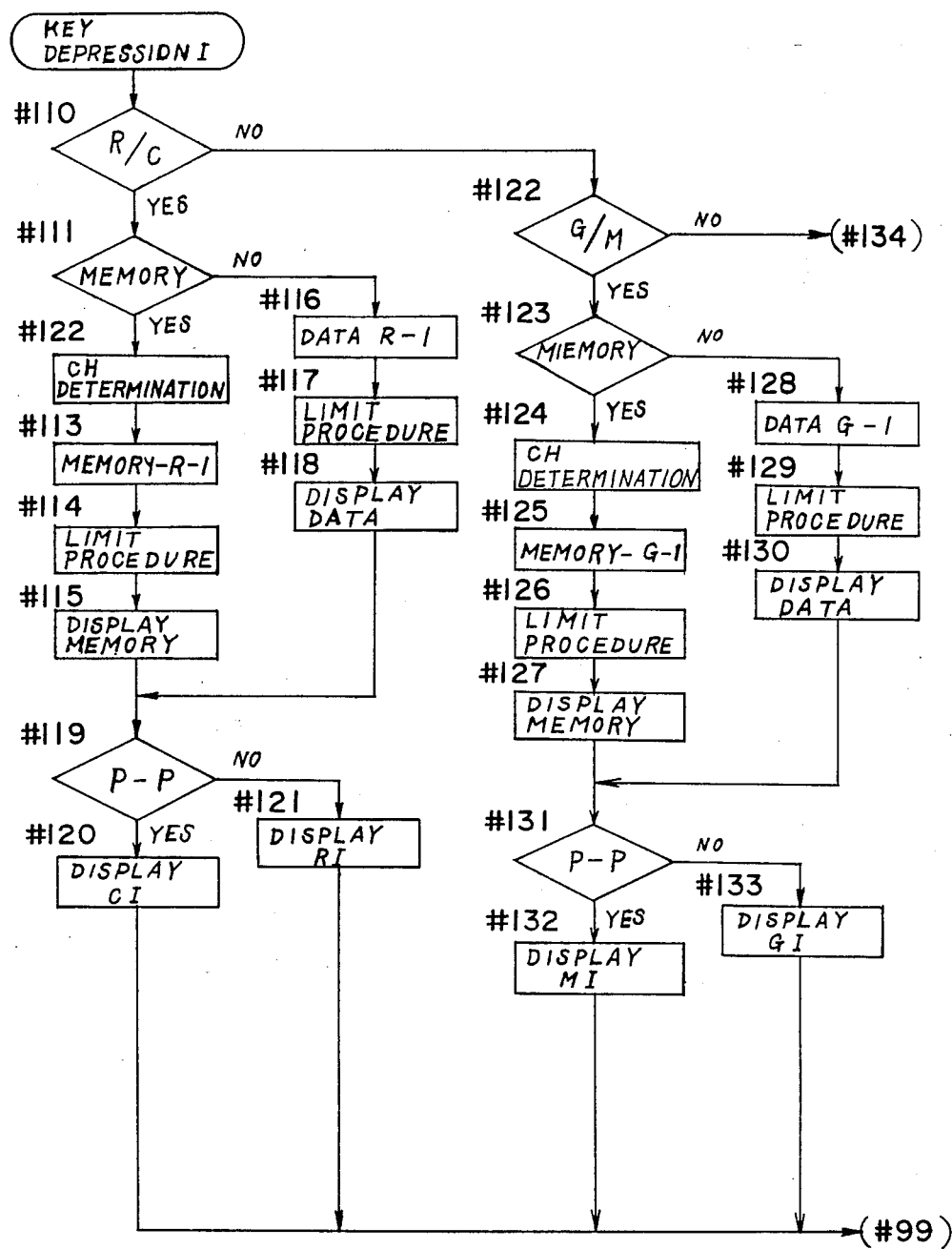
FIGS. 12(a) and 12(b) taken together is a flow chart showing a detailed operation of depression I.
Figure 12B:
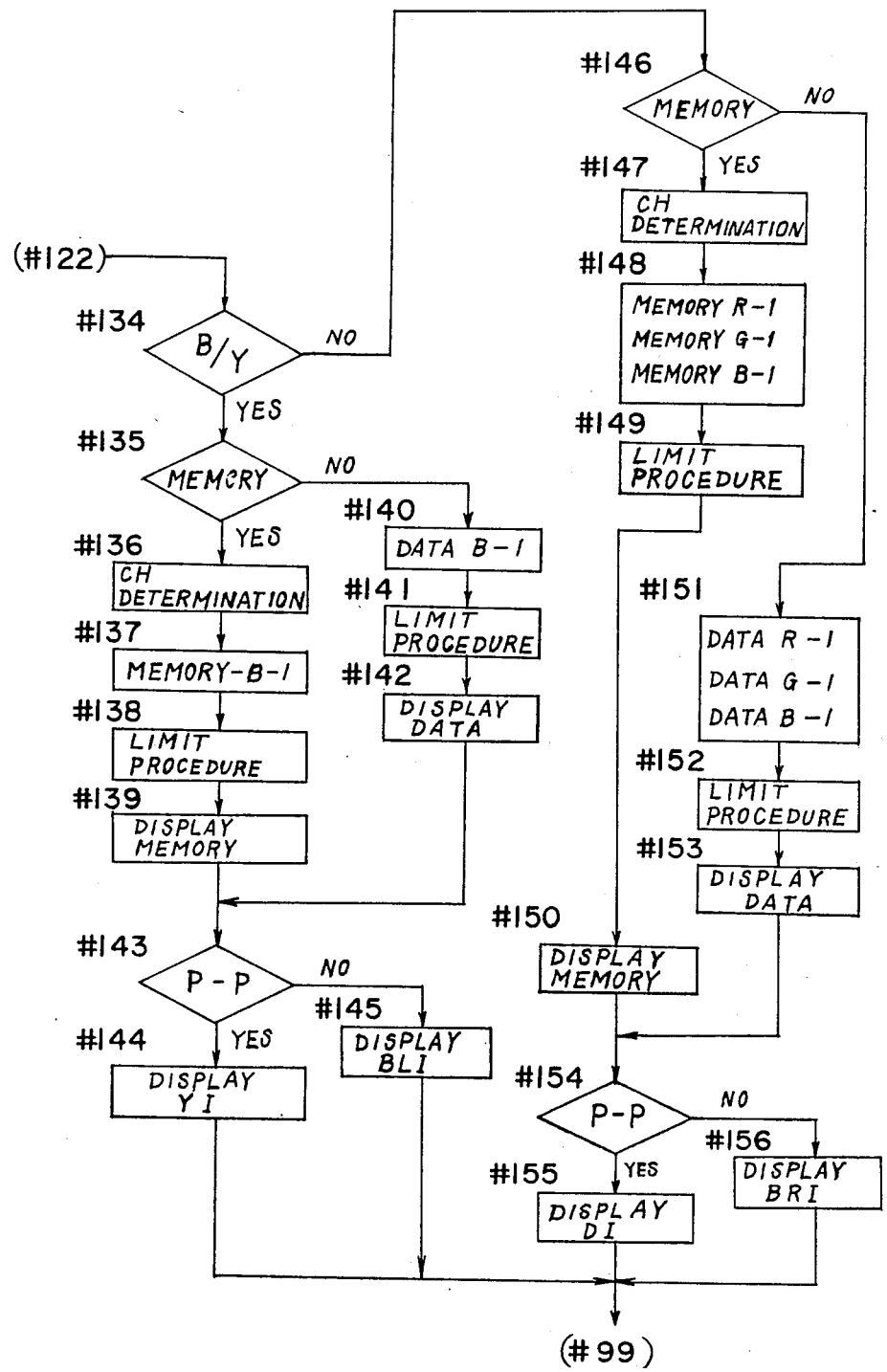

If the determination at step #91 indicates that the flag 15SF is "1", the program proceeds to step #92 to set a register A to "0". Then, the counting of 15 seconds is initiated, and at step #94, it is determined whether or not the positive film is used. If the positive film is used, the program advances to step #96, but if the positive film is not used, the program advances to step #95. Then, it is determined at step #95 whether or not the right key RIK is depressed. If it is determined at step #95 that the right key RIK is depressed, the program proceeds to step #97 for carrying out the operation of "Right Key Depression I" as indicated in Table 1, but if it is such that the right key RIK is not depressed, the program proceeds to step #98 for the operation of "Key Depression II". On the other hand, at step #96, whether or not the right key RIK is depressed is determined. If the right key RIK is depressed, the program proceeds to step #98 for the operation of "Key Depression II", but if it is not, it proceeds to step #97 for the operation of "Key Depression I". The details of step #97 for the operation of "Key Depression I" are shown in FIG. 12 and will be discussed later. Thus, as shown in Table 1, when the right key RIK is depressed while the negative film is used, the operation for the "Key Depression I" is performed; when the left key LEK is depressed while the negative film is used, the operation for the "Key Depression II" is performed; when the right key RIK is depressed while the positive film is used, the operation for the "Key Depression II" is performed; and when the left key LEK is depressed, while the positive film is used, the operation for the "Key Depression I" is performed. In the case of the black-and-white film being used, the operations similar to that in the case of the use of the negative film take place one at a time.

Upon completion of step #97 or #98, a decision step #99 is performed to determine if the content of the register A is "0". If the determination at step #99 is YES, the register A is set to "1" and, after 0.5 of a second subsequent thereto, a decision step #103 is performed. On the other hand, if the determination at step #99 is NO, that is, if the content of the register A is "1", the program proceeds to step #103 after the lapse of 0.5 of a second. At the decision step #103, the determination is made to find whether or not any one of the right and left keys RIK and LEK is depressed. If the result of determination at step #103 shows that one of the right and left keys RIK and LEK is depressed, step #93 is resumed, but if it shows that neither the right key RIK nor the left key LEK is depressed, the program returns to step #25. Thus, if the right or left key RIK or LEK is kept depressed, the change of the data takes place at first at intervals of 0.5 of a second and then at a cycle of 0.1 second.

FIG. 12 is a flow chart showing the function associated with the operation of "Key Depression I". Referring to FIG. 12, a decision step #110 is provided for determining if the color marking RCD is displayed. If the determination is YES, the program proceeds to another decision step #111 to determine if it is the memory mode. If the determination at step #111 indicates the memory mode, step #111 is followed by step #112 to discriminate the memory channel and, at the subsequent step #113, the red data of the memory data corresponding to that channel is decreased by 1. Thereafter, at step #114, the data is examined as to whether or not it is smaller than the limit (0). If it is smaller, the data is rendered to be of a value (0) of the (−1) limit with the memory data subsequently displayed, and thereafter, the program proceeds to a decision step #119. On the other hand, if the result of determination at step #111 is that it is not the memory mode, step #111 is followed by step #116 to reduce 1 from the red data of the exposure value data and, subsequently, when the data is smaller than the limit (0), (−1) is rendered to be the limit (0) with the exposure value data consequently displayed. Thereafter, step #118 is followed by step #119 to determine if the film type is the positive film. If the determination at step #119 is YES, the program proceeds to step #120 to display the index CP and then to step #99 shown in FIG. 11. However, if the determination at step #119 is NO, the program proceeds to step #121 to display the index RI and then to step #99. On the other hand, if it has been found at step #110 that the color marking RCD is not displayed, step #110 is followed by step #122 to determine if the color marking GMD is displayed. If the determination at step #122 is YES, the program proceeds to a flow starting from step #123. In other words, the green exposure value data or memory data is reduced by 1 and, if it becomes smaller than the limit (0), it is rendered to be the limit value. Then, the index MP or the index GP is displayed if the film type is the positive film or if it is not the positive film, respectively. Thereafter, step #99 is resumed.

However, if it has been found at step #122 that the color marking GMD is not displayed, step #122 is followed by step #134 to determine if the color marking BYD is displayed. If the determination at step #134 is YES, the program proceeds to a flow starting from step #135. In other words, the blue exposure value data or memory data is reduced by 1 and, if it becomes smaller than the limit (0), it is rendered to be the limit (0). Then, the index YP or the index BLP is displayed if the film type is the positive film or if it is not the positive film, respectively. Thereafter, step #99 is resumed. However, if the color marking BYD is determined not displayed at step #134, this means that the color marking BDI is displayed, and a flow of the program starting from step #146 takes place. In this flow, the red, green and blue exposure value data or memory data are respectively reduced by 1. At this time, if at least one of the data becomes smaller than the limit (0), the previous data before all of the data are reduced is resumed. Then, the index DAP or the index BRP is displayed if the film type is the positive film or if it is not the positive film respectively, and thereafter, step #99 is resumed.

While the flow chart for the function associated with the operation of "Key Depression II" is not shown, it is basically similar to that shown in FIG. 12. More specifically, if the color marking RCD is displayed, the red memory data or exposure value data is increased by 1 and the index RP or CP is then displayed in the event that the film type is the positive film or is not the positive film, respectively. If the color marking GMD is displayed, the green memory data or exposure value data is increased by 1 and the index GP or MP is displayed if the film type is the positive film or it is not the positive type, respectively. If the color marking BYD is displayed, the blue memory data or exposure value data are increased by 1 and the index BLP or YP is displayed if the film type is the positive film or it is not the positive film respectively. Furthermore, if the color marking BDI is displayed, the red, green and blue memory data or exposure value data are increased by 1 and the index BRP or DAP is displayed if the film type is the positive film or it is not the positive film, respectively. Thus, it is to be noted that, in the case of the operation of "Key Depression II", since the data is increased, it is necessary to avoid the excess over the limit (255) and, in addition, in the event that at least one of the data becomes 256, the data must be restored to that before it is increased when and so long as the color marking BDI is displayed. In summary, the flow chart for the operation of the "Key Depression II" differs from that for the "Key Depression I" in that "−1" appearing in the respective blocks for steps #113, #116, #125, #128, #137, #140, #148 and #151 shown in FIG. 12 should be "+1" in the case for the operation of "Key Depression II", and that, while the limit processing at each of steps #114, #117, #126, #129, #138, #141, #149 and #152 shown in FIG. 12 is such that the data should not become smaller than 0, that for the operation of the "Key Depression II" is such that the data should not become greater than 255. In addition, while in the case of the operation for the "Key Depression I" the CI display (step #120), the MI display (step #132), the YI display (step #144) and the DI display (step #155) have been described as effected if the film type is the positive film, and if the film type is not the positive film, the RI display (step #121), the GI display (step #133), the BLI display (step #145) and the BRI display (step #156) have been described as effected. The reverse is applicable in the case of the operation of the "Key Depression II". In other words, in the case of the operation of the "Key Depression II", if the film type is the positive film, the RI display, the GI display, the BLI display and the BRI display are effected, but if it is not the positive film the CI display, MI display, the YI display and the DI display are effected.

FIG. 13 is a flow chart showing a detailed example of the sequence of the ring arithmetic operation. Referring to FIG. 13, and at step #160, the ring channel is displayed. And then, step #161 is performed to restore the exposure value data, which has been held back to an arithmetic register, and 0 is displayed at each of the display areas RDD, GDD and BDD at the subsequent step #162. Thereafter, the program proceeds to a decision step #163 to determine if the film type is the black-and-white film. A flow starting from step #210 is initiated, if the determination at step #163 is YES, to perform the ring-around arithmetic operation for the variable contrast paper shown in Table 4. However, if the determination at step #163 is NO, a flow starting from step #164 is initiated to perform the ring-around arithmetic operation for the negative film or the positive film as shown in Table 2 or 3, respectively.

Whether or not the ring channel is 0 is determined at step #164 and, if it is 0, the initial flow is resumed after all of the color markings have been displayed. However, if it is not 0, another decision step #166 takes place to find if the ring channel is 1 and, if it is 1, the program proceeds to step #167 to determine if the film type is the negative film. If the determination at step #167 is YES, the ring width data RCD is subtracted from the red exposure value data, but if the determination at step #167 is NO, the ring width data RCD is added to the red exposure value data. In either case, the program then proceeds to step #170 to display the color marking RCD and the index RP, followed by step #234. In the event that the determination at step #166 shows that the ring channel is not 1, step #166 is followed by another decision step #171 to determine if the ring channel is 2. If the determination at step #171 is YES, the data RCD is added to the green exposure value data if the film type is the negative film, but the data RCD is subtracted from the green exposure value data if the film type is not the negative film. The program then proceeds to step #175 to effect the display of the color marking GMD and the index MP, followed by step #234. However, in the event that the determination at step #166 is NO, a decision step #171 is performed to determine if the ring channel is 2. Where the ring channel is determined 2, the data RCD is added to or subtracted from the green exposure value data if the film type is the negative film or the positive film, respectively. In either case, the color marking GMD and the index MP are displayed at step #175, followed by step #234.

In a manner similar to that described above, the arithmetic operation (Refer to Tables 2 and 3) and display corresponding to each of the discriminated ring channels are performed and, in any of these cases, the program proceeds to step #234.

Referring to step #163, if the determination indicates that the film type is the black-and-white film, all of the color markings are displayed at step #210. This step #210 is followed by a decision step #211 to determine if the ring channel is 3. Should the ring channel so determined be 3, step #233 is immediately resumed since no data adjustment is carried out as shown in Table 4. On the other hand, if the ring channel is found not 3, whether or not the ring channel is 0 is determined at the subsequent decision step #212. If the ring channel as determined at step #212 is 0, 45 is added to the green data while 15 is subtracted from the blue data, and the program then proceeds to step #233, but if it is not 0, step #212 is step #215 to determine if the ring channel is 1. If the determination at step #215 is 1, 30 is added to the green exposure value data while 10 is subtracted from the blue exposure value data, and the program then proceeds to step #233. Similarly, for each of the discriminated ring channels, the arithmetic operation (Refer to Table 4) is performed with the program consequently proceeding to step #233. At step #233, 100 is set as a red exposure value data. Although the exposure to the red color is meaningless to the variable contrast paper, the operator may feel it will not be natural without the red light being emitted during the exposure, and therefore 100 is set to enable a standard amount of red light to be emitted. Upon completion of this step #233, the program proceeds to step #234.

At step #234, it is determined whether or not the red exposure value data obtained by the ring arithmetic operation is within the range of the limits (0 and 255) and, if it is found that the red exposure value departs from the limit range, the original data (the data which has been held back) is restored as the exposure value data so that an error marking E can be displayed at the exposure value data display area RDD associated with the red color. Thereafter, the program proceeds to step #237. However, if it is determined at step #234 that the red exposure value data is within the limit range, step #234 is followed by a decision step #237 to determine whether or not the green exposure value data is within the range of the limits. If the determination at step #237 is NO, the error marking is displayed at the exposure value data display area GDD at step #238 which is followed by step #239 to restore the original data before the ring arithmetic operation as the exposure value data, the program thereafter proceeding to step #240. On the contrary, if the determination at step #237 is YES, step #237 is followed by step #240 to determine whether or not the blue exposure value is within the range of the limits. If the determination at step #240 is NO, the error marking is displayed at the blue exposure value data display area BDD and the original exposure data is then restored, the program thereafter returning to the initial flow. However, if the determination at step #240 is YES, the program immediately returns to the initial flow. It is to be noted that the steps to be resumed subsequent to the completion of the operation shown in FIG. 13 are step #54 of FIG. 9, step #74 of FIG. 10 and step #87 of FIG. 11.

Figure 14A:
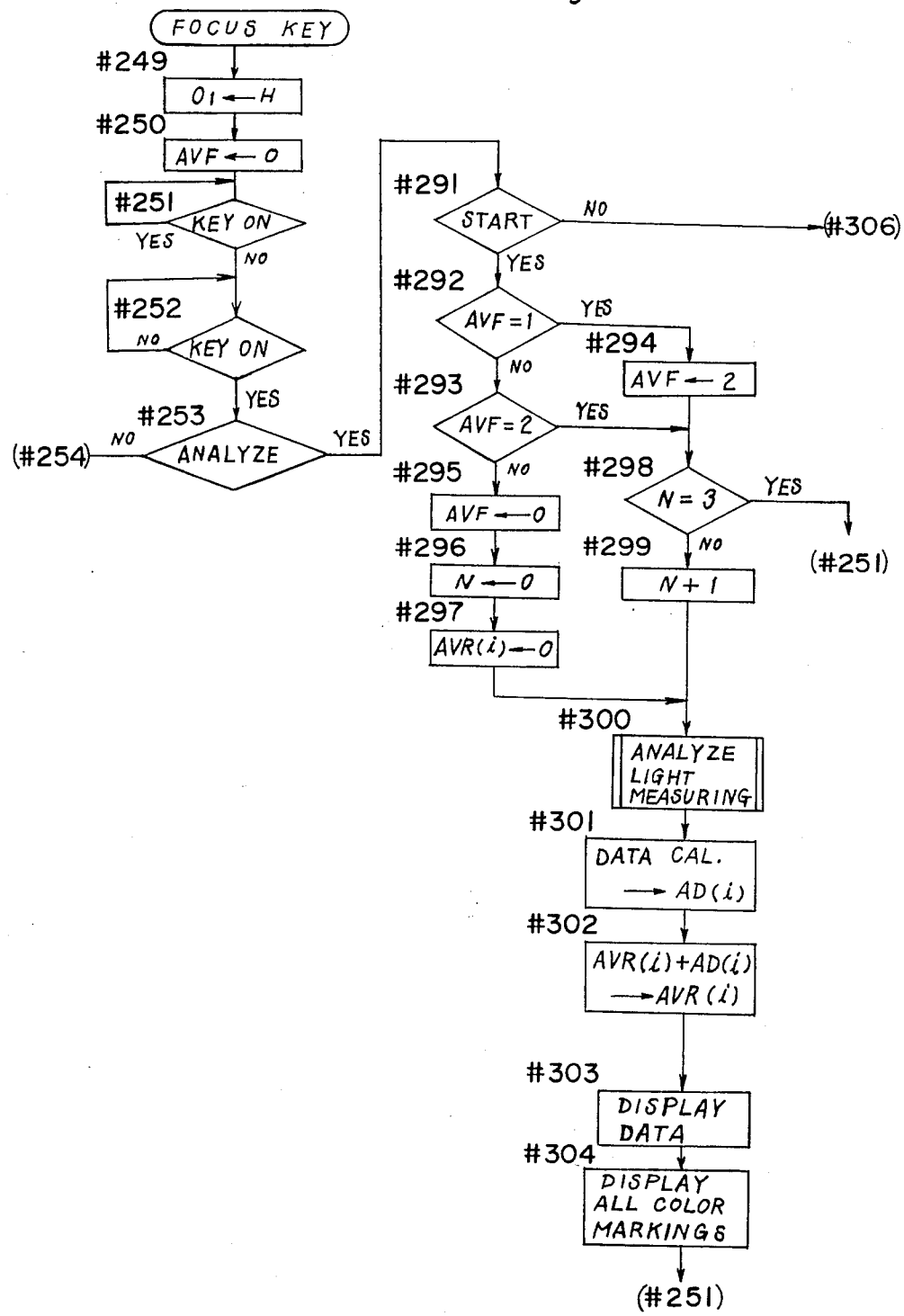
FIGS. 14(a), 14(b) and 14(c) taken together show a flow chart of an operation of microcomputer when a focus key FOK is depressed.
Figure 14B:
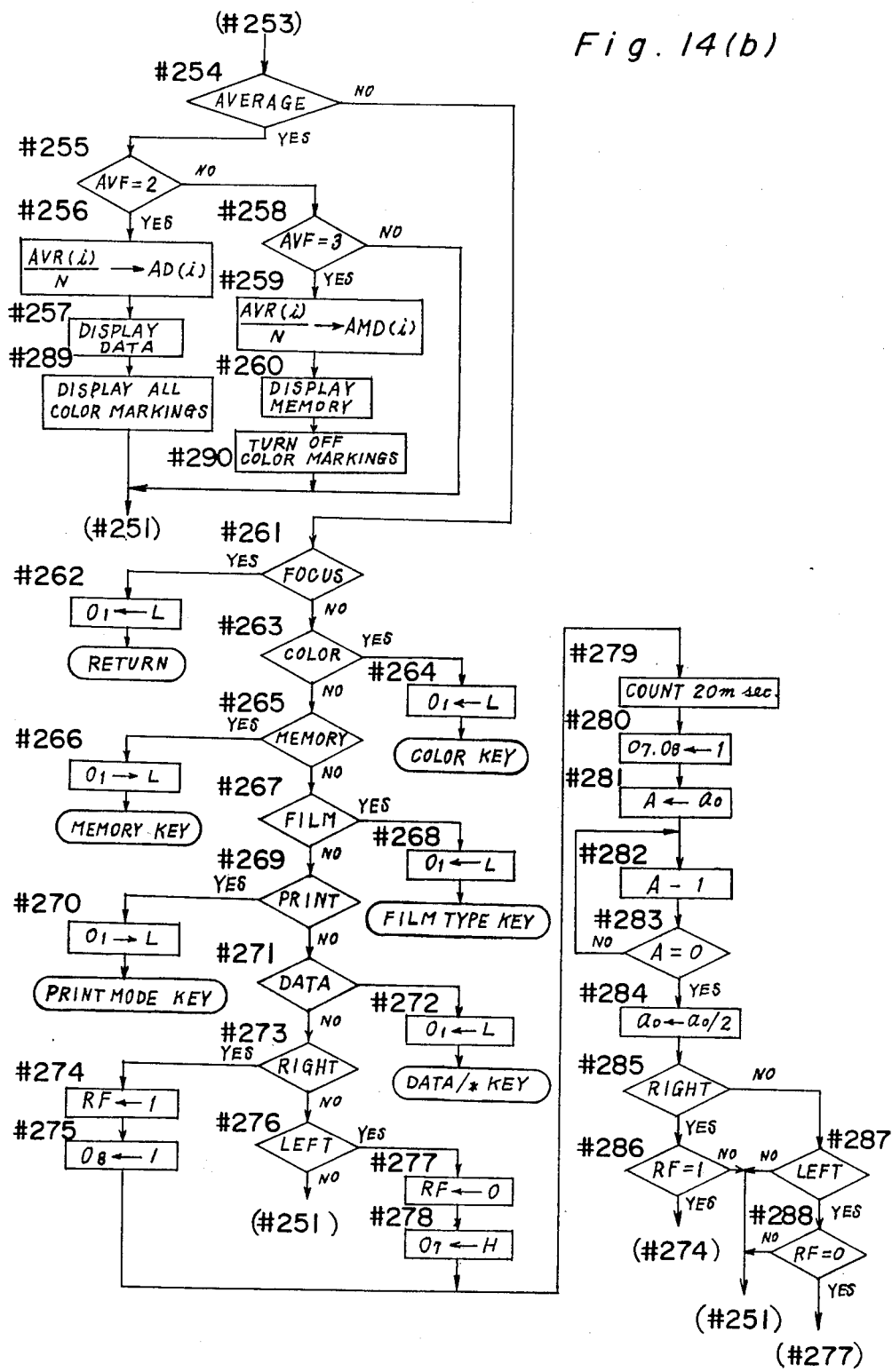
Figure 14C:
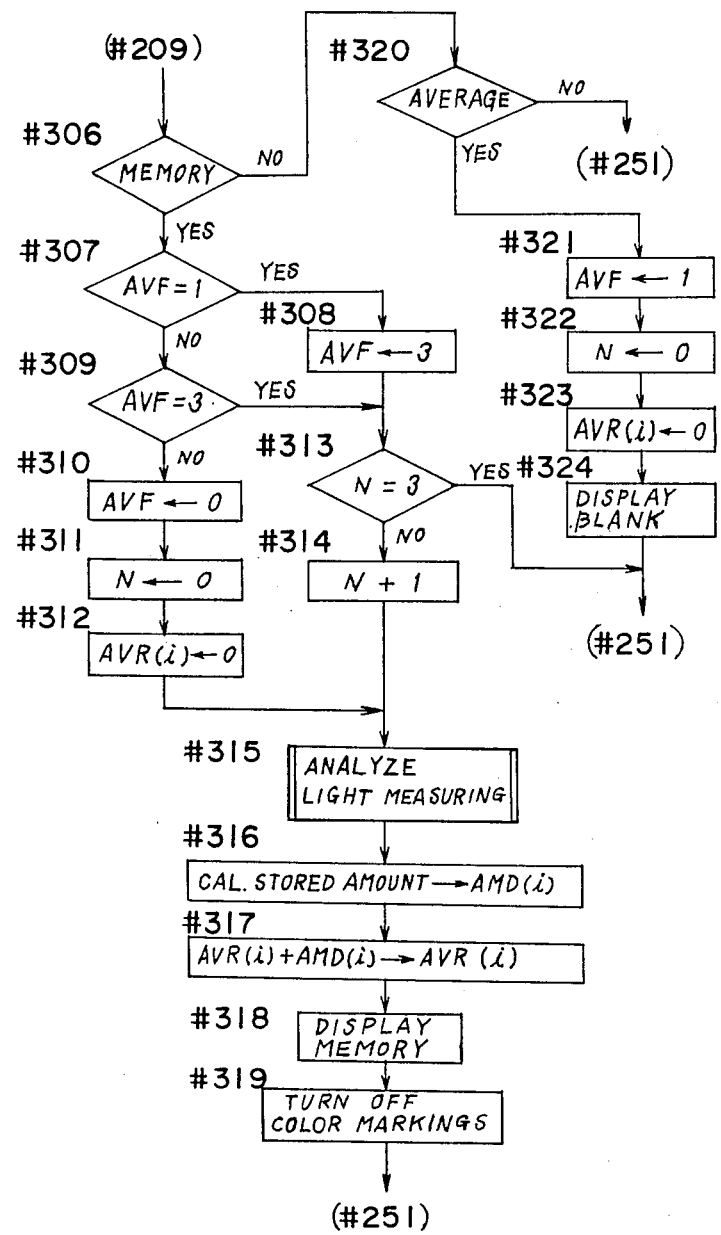
Figure 19:
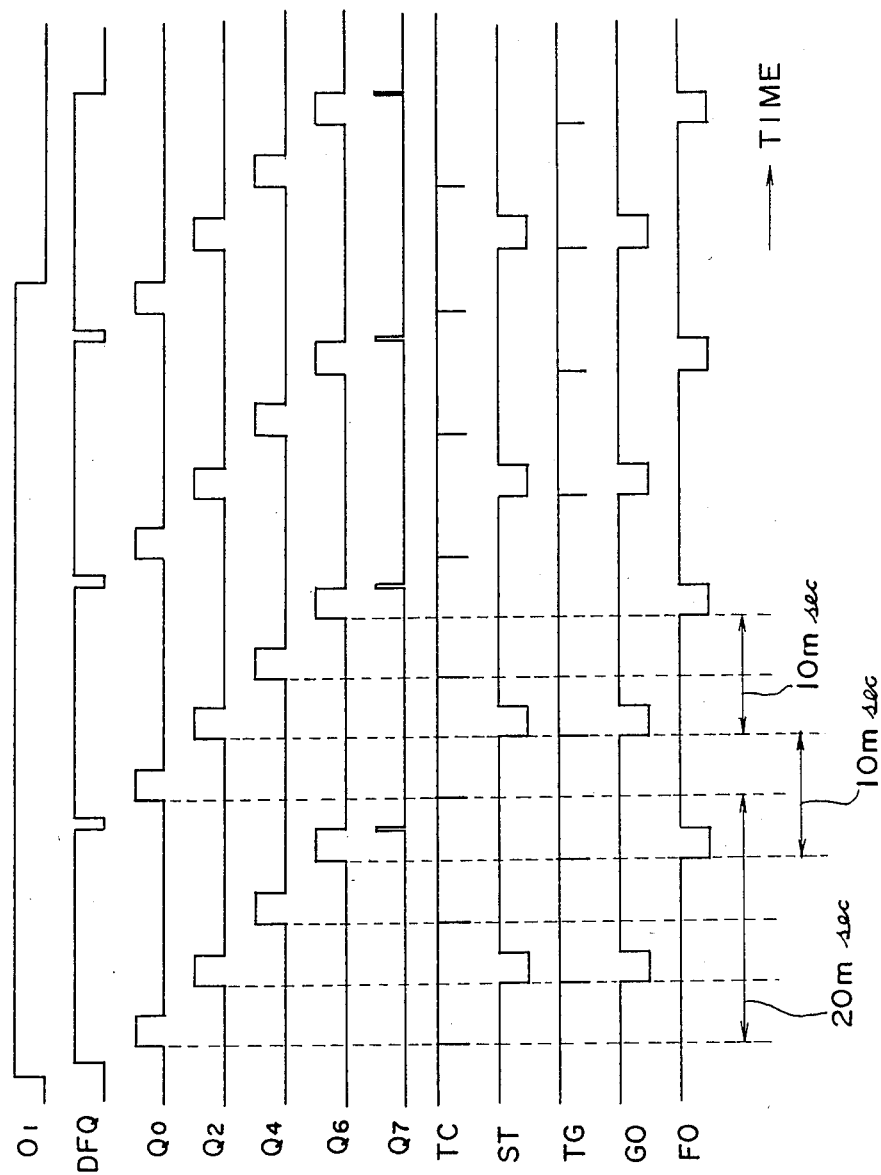
FIG. 19 is a time chart showing an operation of the interface circuit IF when carrying out an illumination for focussing.

FIG. 14 illustrates a flow chart of the function to be performed when the focus key FOK is depressed. When the focus key FOK is depressed, the output terminal Q1 is rendered "HIGH" to effect a rapid firing operation for illumination. This operation will now be described with reference to FIGS. 18, 19 and 21. FIG. 18 illustrates the details of the interface circuit shown in FIG. 4; FIG. 19 illustrates a timing chart at the time of the firing for illumination; and FIG. 21 illustrates the details of the light emitting unit shown in FIG. 4.

When the terminal O1 is rendered "HIGH", an OR gate OR2 generates a high level signal on the one hand and a D-type flip-flop DF generates a high level output from its Q output in response to the negative edge of a next clock pulse subsequently generated from an oscillator OS3 as shown by a waveform DFQ in FIG. 19. Therefore, 400 HZ clock pulses emerging from the oscillator OS3 are fed through an AND gate AN2 to a ring counter CO. Output terminals Q0 to Q7 of the ring counter CO are sequentially rendered "HIGH" in response to the positive edges of the clock pulses fed thereto (substantially as shown by waveforms Q0, Q2, Q4, Q6 and Q7 in FIG. 19). At the time the output terminal Q7 connected to one of the input terminals of an OR gate OR1 is rendered "HIGH", the OR gate OR1 generates a high level signal to reset both the D-type flip-flop DF and the counter CO and, therefore, the Q output of the flip-flop DF and the output Q7 of the counter CO are both rendered "LOW" as shown by wave forms DFQ and Q7 in FIG. 19. Since the terminal O1 remains "HIGH" at this moment, the output of OR gate OR2 also remains "HIGH". Therefore, D-type flip-flop DF will be rendered "HIGH" again by means of the negative edge of the clock pulse which has risen upon resetting the D-type flip-flop and counter CO as shown in FIG. 19, DFQ, thereby repeating the above described operation.

It is to be noted that, if the Q output of the D-type flip-flop DF is "HIGH" even though the terminal O1 is rendered "LOW", the output from the OR gate OR2 remains "HIGH" and, therefore, the Q output of the D-type flip-flop DF remains "HIGH". The above described operation is interrupted when the Q7 output of the counter CO sets up to reset both the counter CO and the D-type flip-flop DF with the output from the OR gate OR2 consequently rendered "LOW". A power-on reset circuit POR connected with the other of the input terminals of the OR gate OR1 is fed by a commercial A.C. power source through the plug PL (FIG. 4) and is operable to reset both the D-type flip-flop DF and the counter CO when the supply of the voltage VO is initiated from the power source circuit SUP to the interface circuit IF.

The Q0 and Q4 outputs of the counter CO are supplied to an OR gate OR3 and in turn to a one-shot circuit OS1 through an OR gate OR4. Accordingly, each time each of the Q0 and Q4 outputs sets up, a high level pulse of 30 microsecond in pulse duration is outputted from the one-shot circuit OS1 to one of the input terminals of a NAND gate NA1, the other of the input terminals thereof being connected with the terminal VM (FIG. 4). Thus, if the terminal VM is "HIGH", a low level pulse emerges from an output terminal TC of the NAND gate NA1 in response to the high level pulse from the one-shot circuit OS1. It will thus readily be seen that the low level pulses from the NAND gate NA1 are generated at a cycle of 10 milliseconds. The Q2 and Q6 outputs of the counter CO are fed to an OR gate OR7 which in turn generates an output to a delay circuit DL1 having a 160 microsecond delay time, an output from the delay circuit DL1 being supplied to a one-shot circuit OS2. Accordingly, the one-shot circuit OS2 generates a high speed level pulse of 40 microseconds in pulse duration delayed 160 microseconds after the set-up of each of the Q2 and Q6 outputs of the counter CO. This high level pulse from the one-shot circuit OS2 is applied to a NAND gate NA4 which, when and so long as the terminal VM is "HIGH", generates a low level pulse from its output terminal TG at a cycle of 10 milliseconds at a timing delayed about 5 milliseconds from the generation of the low level pulse from the terminal TC.

The Q2 output of the counter CO is supplied to a NAND gate NA3 through an OR gate OR6 and also to a NAND gate NA6 through an OR gate OR8. Accordingly, from each of the output terminals ST and GO, a low level pulse having a pulse duration of 2.5 milliseconds is generated at a cycle of 20 milliseconds in response to the Q2 output of the counter CO. Similarly, the Q6 output of the counter CO is supplied to a NAND gate NA2 through an OR gate OR5 and, accordingly, a low level pulse of 2.5 milliseconds in pulse duration is generated from a terminal FO at a cycle of 20 milliseconds in response to the Q6 output of the counter CO, but delayed 10 milliseconds from the generation of the low level pulse from any one of the terminals ST and GO.

Referring to FIG. 21, when the terminal TC is rendered "LOW" in the manner described above, a light emitting diode LD0 emits light with which a photo-thyristor PS0 is brought into conduction to permit a rapid charging on a trigger capacitor C16. When the voltage charged on the trigger capacitor C16 attains a value approximating to the voltage on the terminal VH, the photo-thyristor can be automatically brought into a non-conductive state. It is to be noted that a resistor R10 has a relatively high resistance, as compared with that of a resistor R12, so that, while the terminal VH is fed with the high voltage, the trigger capacitor C16 can be slowly charged before the low level pulse is applied to the light emitting diode LD0 through the terminal TC, the charged voltage on the capacitor C16 being substantially equal to the voltage on the terminal VH whereby, when the low level pulse is first generated from the terminal TC, the photo-thyristor PS0 will not conduct.

When the low level pulses are subsequently generated respectively from the terminals GO and ST, associated light-emitting diodes LD6 and LD14 emit light. In response to the light emitted by the light-emitting diode LD6, a photo-thyristor PS4 conducts and a thyristor SC4 is brought in condition ready to conduct, and in response to the light emitted by the light-emitting diode LD14, a phototransistor PT4 conducts, a transistor BT6 conducts, a transistor BT8 is switched off and a thyristor SC14 is brought in condition ready to conduct. Similarly, when the low level pulse emerges from the terminal TG, a light emitting diode LD2 emits light, causing a photo-transistor PT0 to conduct and, accordingly, a transistor BT0 and a thyristor SC0 sequentially brought into non-conductive and conductive states, respectively, thereby to permit the charged potential on the capacitor C16 to be discharged through the thyristor SC0. When this takes place, the xenon discharge tubes XR, XG, XB and XF are triggered by a trigger transformer TR. At this time, since a capacitor C52 is charged through resistors R72 and R54, the opposite ends d and e of the capacitor C52 are respectively connected to the terminal VH and the ground. When the trigger voltage is generated across the trigger transformer TR, since the thyristors SC4 and SC14 are then in condition ready to conduct, the current flows through the thyristor SC4, then the xenon discharge tube XG, the capacitor C52 and finally through the thyristor SC14, with the xenon discharge tube XG consequently fired. When the potential at the end e of the capacitor C52 and that at the end d of the same subsequently attain respective values equal to the voltage at the terminal VH and the ground potential, the thyristors SC4 and SC14 are switched off thereby interrupting the firing of the xenon discharge tube XG.

The low level pulse is subsequently generated from the terminal TC and, consequently, the photo-thyristor PS0 conducts in the manner as hereinbefore described to permit the capacitor C16 to be rapidly charged again. Subsequent generation of the low level pulse from the terminal FO results in the emission of light from the light-emitting diodes LD10 and LD12. In response to the light from the diode LD10, a photo-thyristor PS8 conducts and a thyristor SC8 is brought into a condition ready to conduct, and in response to the light from the diode LD12, a phototransistor PT2 is switched on resulting in that a transistor BT4 is switched off, a transistor BT2 is switched on and a thyristor SC12 is brought into a condition ready to conduct. However, when the low level pulse emerges from the terminal TG and the xenon discharge tubes XR, XG, XB and XF are consequently triggered, the current flows through the thyristor SC8, then the xenon discharge tube XF, the capacitor C52, and finally the thyristor SC12 with the xenon discharge tube XF consequently fired. Thereafter, when the respective potentials at the ends d and e of the capacitor C52 attain values equal to the potential at the terminal VH and the ground potential, respectively, the thyristors SC8 and SC12 are switched off and, accordingly, the firing of the xenon discharge tube XF is interrupted.

In a manner similar to that described above, the xenon discharge tubes XG and XF can also be fired one after another at a cycle of 10 milliseconds, each emitting light of an amount determined by the charged voltage on the capacitor C52. The light so emitted is used for the illumination purpose. It is to be noted that capacitors C10, C22, C28, C46, C46, C54, C36 and C56 are provided to avoid any possible premature conduction of the thyristors SC2, SC4, SC6, SC8, SC12 and SC14 which are respectively connected in parallel to those capacitors. It is also to be noted that each resistor-capacitor parallel connected circuit connected between the gate and cathode of the respective thyristors and each capacitor connected between the base and emitter of the respective transistor are provided for avoiding any possible unnecessary conduction of the respective thyristor and the respective transistor, respectively. While the foregoing operation is associated with the firing for illumination, the operation associated with the exposure will be described later.

Referring to the flow chart shown in FIG. 14, the function which takes place when the focus key FOK has been depressed will now be described. At step #250, "0" is set to a register AVF, the details of which register will be described later. At step #251, the disappearance of a key input is waited for and, if the key cannot be depressed at step #251, a subsequent depression of the key is waited for. This is for the purpose of providing the focus key FOK with a push-push switch function.

If the determination at a decision step #252 indicates that the key input has appeared, whether or not the analyze key ANK is kept depressed is determined at the subsequent step #253. Unless the analyze key ANK is depressed, the program proceeds to a flow starting from step #252, but if the analyze key ANK has been depressed, the program proceeds to a flow starting from step #291.

The flow starting from step #254 will first be described. At step #254, it is determined whether or not the average key AVK is depressed or not. If it is so determined that the average key AVK is depressed, the program advances to step #255, and if not, to step #261. At step #255, it is determined whether the register AVF is carrying "2" or not.

It is to be noted here that the register AVF carries either one of "0" to "3". The register AVF carries "1" when the analyze key ANK and the average key are depressed at the same time; it carries "2" when the analyze key ANK and start/stop key STK are depressed to carry out the analyze start operation (automatic setting operation of the exposure value data); it carries "3" when the analyze key ANK and memory key MEK are depressed simultaneously to carry out the analyze memory operation (operation for storing reference color data); and it carries "0" when the average key AVK and analyze key ANK are not depressed simultaneously.

If it is determined at step #255 that the register AVF is carrying "2", the program advances to the step #256 in which the content of the register AVR(i) (i=R, G, B) which is equal to the sum of exposure value data obtained in each light measuring operation, is divided by N, thereby obtaining an exposure value data average. The obtained exposure value data average is stored in an exposure value data register AD(i). Then, the exposure value data is displayed, and in step #289, all the color markings are displayed. Thereafter, the program returns to step #251. While displaying the color markings, the memory channel is also displayed, as shown in FIG. 3(a).

If it is determined at step #255 that the register AVF is not carrying "2", it is further determined at step #258 whether or not the register AVF is carrying "3". If YES, program advances to step #259 wherein the content of the register AVR(i) which is equal to the sum of memory data obtained in each light measuring operation, is divided by N, thereby obtaining a memory data average. The obtained memory data average is stored in a memory data register AMD(i). Then, the memory data is displayed. At step #290, the display of the color markings ends and, thereafter, the program returns to step #251. At this condition, memory channel is displayed, but no display is effected in display areas FID and PMD, as shown in FIG. 3(d).

If it is determined as NO at step #258, it is understood that the register AVF is either carrying "0" or "1". In this case, it is not necessary to obtain the average because there is no data obtained through the light measuring. Therefore, in this case, the program immediately returns to step #251.

At step #254, if it is determined that the average key AVK is not depressed, it is further determined at step #261 whether or not the focus key FOK is depressed. If YES, the terminal O1 produces "LOW" for stopping the firing of xenon tubes XF and XG for the illumination and, thereafter, the program returns to step #25. Contrary, if it is determined that the focus key FOK is not depressed, it is further determined in step #263 whether or not the color key COK is depressed. If the color key COK has been depressed, the terminal O1 produces "LOW" for stopping the firing of xenon tubes XF and XG for the illumination and, thereafter, the program jumps to the flow of FIG. 9, thereby changing the ring channel or color markings and turning into the condition of "HALT".

If it is determined at step #263 that the color key COK is not depressed, it is further determined at step #265 whether or not the memory key MEK is depressed. If it is determined in step #265 that the memory key MEK has been depressed, the program advances to step #266 in which the operation is so controlled that the terminal O1 produces "LOW" for stopping the firing of xenon tubes XF and XG for the illumination and, thereafter, the program jumps to the flow of FIG. 8, thereby changing the memory channel or memory mode and turning into the condition of "HALT".

If it is determined at step #265 that the memory key MEK is not depressed, it is further determined at step #267 whether or not the film type key FIK is depressed. If it is determined in step #267 that the film type key FIK has been depressed, the program advances to step #268 in which the operation is so controlled that the terminal O1 produces "LOW" for stopping the firing of xenon tubes XF and XG for the illumination and, thereafter, the program jumps to the flow of FIG. 6, thereby changing the film type and turning into the condition of "HALT". Contrary, if it is determined that the film type key FIK is not depressed, it is further determined in step #269 whether or not the print mode key PRK is depressed. If the print mode key PRK has been depressed, the terminal O1 produces "LOW" for stopping the firing of xenon tubes XF and XG for the illumination and, thereafter, the program jumps to the flow of FIG. 7, thereby changing the mode to print mode and turning into the condition of "HALT". Contrary, if the print mode key PRK is not depressed, it is further determined whether or not the data/ring key DAK is depressed. If the data/ring key DAK has been depressed, the terminal O1 produces "LOW" for stopping the firing of xenon tube XF and XG and thereafter the program carries out the flow of FIG. 10, thereby changing the mode to exposure value data mode or ring-around mode and turning into the condition of "HALT".

At step #271, if it is determined that the data/ring key DAK is not depressed, it is further determined at step #273 whether or not the right key RIK has been depressed. If the right key RIK has been depressed, the program advances to the step #274 for setting "1" in flag RF and producing "HIGH" from the terminal O8. Thereafter, the program advances to the step #279. On the other hand, if the right key RIK is not depressed, it is determined at step #276 whether or not the left key LEK has been depressed. If it is determined that the left key LEK has been depressed, the flag RF carries "0" at step #277, and the terminal O7 produces "HIGH". Then, the program advances to step #279 wherein 20 msec. are counted. After counting 20 msec., the terminals O7 and O8 produce "LOW", and data a0 is set in the register A. Then, the content of the register A is subtracted by 1, and then it is determined whether or not the content of the register A is reduced down to zero. This operation is carried out repeatedly until the content of the register A realy reaches down to zero. When the register A is reduced to zero, the data a0 is cut down to its half and, thereafter, the program advances to step #285. Then, at step #285, it is determined whether or not the right key RIK is kept depressed. If YES, it is further determined whether the flag RF is carrying "1" or not. If the flag RF is carrying "1", the program returns back again to step #274, thereby producing "HIGH" from the terminal O8 to carry out the above described operation. Contrary, if the flag RF is carrying "0", it is understood that the left key LEK has been depressed at step #276. Therefore, in this case, the program returns back to step #251, preventing the motor MO from being activated. If it is determined at step #285 that the right key RIK has not been depressed, it is further determined at step #287 whether or not the left key LEK has been depressed. At step #287, if the left key LEK has not been depressed, the program returns back to step #251, but if it has been depressed, the program advances to step #288 in which it is determined whether or not the flag RF is carrying "0". At step #288, if it is determined that the flag RF is not carrying "0", the program returns back to step #251, but if it is carrying "0", the program returns to step #277, thereby producing "HIGH" from the terminal O7 to carry out the above-mentioned procedure.

Referring to FIG. 18, now a manner in which the lens driving motor MO is controlled is described. While the light emissions for illumination (for focusing) is taking place, the terminal O1 produces "HIGH". When the right key RIK is depressed, the terminal O8 produces "HIGH", whereby AND gate AN5 produces "HIGH" from its output MD for a predetermined short period of time, such as 20 msec. Thus, the lens LE shifts outwardly. Then, if the right key RIK is kept on depressing, the output MD intermittently produces "HIGH" having a duration of 20 msec with time intervals progressively reduced in halves, such as 0.3 sec. (this is determined by the data a0), 0.15 sec., 0.075 sec., 0.037 sec., as so on. Thus, the speed of the lens shift gradually increases. Contrary, when the left key LEK is depressed, the terminal O7 produces "HIGH" and, therefore, the AND gate AN4 produces "HIGH" from its output MU. Thus, in this case, the lens LE shifts inwardly. A manner how the lens LE is shifted inwardly is similar to the manner how it is shifted outwardly as described above. Now, when one of left and right keys LEK and RIK has been released from the depression, and if the other of left and right keys is immediately depressed within a short period of time, such as 0.32 sec. or 0.17 sec., both outputs MU and MD produce "LOW". On the contrary, if one of the keys is depressed after the lapse of the short period of time subsequent to the release of the other key, the lens LE can start to shift in the counter direction.

Referring back to FIG. 14, the description is given to a program when the analyze key ANK is depressed as starting from step #291. At step #291, it is determined whether or not the start/stop key STK has been depressed simultaneously with the analyze key ANK. If it is determined that both keys STK and ANK have been depressed simultaneously, the program advances to step #292 wherein it is determined whether or not the register AVF is carrying "1". If the register AVF is carrying "1", it is indicated that the analyze key ANK and average key AVK have been depressed simultaneously just before, and, therefore, "2" is set in the register AVF, and then, the program advances to step #298. Contrary, if the register AVF is not carrying "1", it is further determined whether or not the register AVF is carrying "2". If it is determined that the register AVF is carrying "2", it is indicated that the analyze start operation has been carried out previously at least once, and, therefore, the program advances to step #298. Contrary, if the register AVF is not carrying "2", it is indicated that the register AVF is carrying "0" or "3". In the case where the register AVF is carrying "0", it is not necessary to calculate the average. And in the case where the register AVF is carrying "3", it is indicated that the analyze start operation has been initiated while calculating the average of memory data and, therefore, it is not necessary to calculate the average between the memory data already obtained and exposure value data now obtaining. Thus, in both cases, the program advances to step #295.

At step #295, "0" is set in the register AVF, and then, a data N in the measuring circuit is made "0", and further, a register AVR(i) (i=R, G, B) for storing the total amount of the data for the average calculation is set "0". Thereafter, the program advances to #300. Contrary, if it is determined in step #298 that the measuring operation has been carried out for three times, the program returns back to step #251. Since the average is calculated using, at most, three measured amounts, the program is so arranged that the simultaneous depression of the analyze key ANK and start/stop key STK for the fourth time and thereafter will not be accepted. At step #298, if it is determined that the measuring operation has been carried out less than three times, "1" is added to a number indicating the times of measuring operation and, thereafter, the program advances to step #300.

At step #300, an analyze/light-measuring subroutine is carried out and its detail will be described later in connection with FIG. 15. Then, in step #301, exposure value data for each color are calculated using the measured data as obtained at step #300, and the reference color memory data as obtained through the analyze/memory operation described later. A detail of the calculation carried in step #301 will also described later. Then, the calculated exposure value data for each of three colors is stored in respective register AD(i) (i=R, G, B). Thereafter, the exposure value data stored in the register AD(i) is added to the content of the register AVR(i) for carrying the sum of the data for each color. Then, the program advances to step #303. At step #303, the calculated exposure value data, memory channel, and all the color markings are displayed in a manner shown in FIG. 3(a), and, thereafter, the program returns back to step #251.

If it is determined in step #291 that the start/stop key STK has not been depressed, it is further determined at step #306 whether or not the memory key MEK has been depressed. If the memory key MEK has been depressed, the analyze/memory program starting from the step #307 is carried out. At step #307, it is determined whether or not the register AVF is carrying "1". If it is determined that the register AVF is carrying "1", "3" is set in the register AVF and then, the program advances to step #313. This indicates that it is necessary to obtain an average value of memory data obtained from the analyze memory, in the case where the analyze memory operation is carried out after the simultaneous depression of analyze key ANK and the average key AVK. Contrary, if the register AVF is not carrying "1" at step #309, it is further determined at step #309 whether or not the register AVF is carrying "3". If the register AVF is carrying "3", the program advances to step #313, but if it is carrying "0" or "2", the program advances to step #310. When the register AVF is carrying "0", it is not necessary to obtain the average, and when the register AVF is carrying "2", the exposure value data has been already obtained through the analyze start operation and it is not necessary to obtain the average between thus obtained exposure value data and memory data which is obtained in the next analyze memory operation.

At step #310, "0" is set in the register AVF, and the data representing the number of measuring times is made "0", and also, "0" is set in the register AVR(i) for storing the sum for the average calculation. Thereafter, the program advances to step #315. Contrary, at step #313, it is determined whether or not the data N representing the number of times of measuring is "3". If it is "3", the program returns back to step #251 for the same reason as that effect in the analyze start operation. If it is not "3", "1" is added to the number of times of measuring at step #314 and, thereafter, the program proceeds to step #315.

At step #315, an analyze/light-measuring subroutine is carried out, and then, memory data is calculated using the measured value. The calculated memory data is stored in a register AMD(i) (i=R0, G0, B0, R1, G1, B1 ... R5, G5, B5, R6, G6, B6; the suffix number representing the channel) and, thereafter, the content of the register AMD(i) is added to the content of register AVR(i) carrying the sum. Then, the calculated memory data as stored in the register AMD(i) is displayed, while at the same time, the display for color markings stops. Furthermore, at step #318, the memory channel is displayed, while the display of print mode and film type stops, in a manner shown in FIG. 3(d). Thereafter, the program returns back to step #251.

At step #306, if it is determined that the memory key MEK is not depressed, it is further determined at step #320 whether or not the average key AVK is depressed. If the average key is not depressed, the program returns immediately back to step #251. Contrary, if the average key AVK has been depressed, a program starting from step #321 is effected for the preparation of average calculation. At step #321, "1" is set in the register AVF for the indication that the analyze key ANK and average key AVK are depressed simultaneously. Then, the data indicating the number of times of measuring is set to "0", and "0" is set in the register AVR(i), which is for storing the sum to be used in the average calculation. And, nothing is displayed at the data display portions, as in a manner shown in FIG. 3(f), 3(g) or 3(h) and then, the program returns back to step #251.

Next, a manner for calculating the exposure value data and memory data will be described. It is to be noted that since this calculation is described in detail in Japanese Patent Application No. 57-33245, its detailed description is omitted. When characters are defined as follows:

Ft(i) (i=R, G, B): exposure value data for obtaining the best print;

M1(i): amount of light received by the monitor unit MO when xenon tubes XR, XG and XB emit a predetermined amount of light under the analyze memory operation; and E1(i): amount of light received by the analyzer AN on the easel plane, a following equation is satisfied.

$$Et(i) = Ft(i) \times (E1(i)/M1(i)). \tag{1}$$

Here, E1(i)/M1(i) is a ratio between amount of light emitted from the light source, i.e., xenon tubes, and amount of light projected on the photographic paper. Since this ratio is multiplied by Ft(i), representing amount of light emitted from the light source for obtaining the best print, Et(i) represents an appropriate amount of light exposed on the photographic paper for obtaining the best print. Therefore, notwithstanding the change of film or optical system, the best print can be obtained so long as the amount of light exposed on the photographic paper is controlled to be Et(i). Thus, the calculated data Et(i) by the equation (1) is memorized as a memory data. And, this data serves as a reference data for the exposure value data to be calculated in the subsequent analyze/start operation, and consequently as a reference color for the analyzing operation.

After inserting a film, and setting the optical system to a desired condition, the analyze start operation can be started. In this case, when M2(i) is defined as amount of light received by the monitor unit MO when xenon tubes XR, XG and XB emit predetermined amount of light, and E2(i) is defined as amount of light received by the analyzer AN, a relationship $$F't(i) = Et(i) \times (M2(i)/E2(i)) \tag{2}$$

is satisfied. This equation can be so interpreted that to obtain the exposure value Et(i), that produces the best print, the light source must produce an amount of light equal to F't(i), and this light amount F't(i) is and has been referred to as exposure value data. Therefore, at step #316 shown in FIG. 14, the equation (1) is calculated, and at step #301, the equation (2) is calculated. It is to be noted that when the calculated data exceeds a value 255, the calculated data is considered as 255 and, at the same time, "E" representing error is displayed. The "E" display also occurs when the calculated value is less than zero as will be mentioned later. Furthermore, the exposure value data is in relation to logarithmically compressed value of the actual amount of light. Since the calculations according to the equations (1) and (2) are carried out in linear domain, it is necessary to convert the calculated result from the linear domain to a domain in which the numerals are represented in logarithmically compressed manner.

Next, a manner for converting the numbering system from logarithmic domain to linear domain, and vice versa, will be described. If C represents a number (corresponding to exposure value data) in logarithmic linear domain, and L represents a number (corresponding to A-D converted value of emitted light amount) in linear logarithmic domain, a following relationships can be obtained, $$L = K \times 10^{C/100} \tag{3}$$

$$C = 100 \times \log_{10}(L/K), \tag{4}$$

wherein K is a constant, such as $2^{11}$. When estimated as, $$10^{0.3} = 1.995 \div 2 \tag{5}$$

and $$\log_{10} 2 = 0.3010 \div 0.3, \tag{6}$$

the above equations (3) and (4) can be revised as follows using the equations (5) and (6).

$$L = K \times (10^{30/100})^n \times 10^{(C-n \times 30)/100} \div K \times 2^n \times 10^{(C-n \times 30)/100} \tag{7}$$

wherein n is any integer, and $$C = 100 \times \log_{10} 2^n + 100 \times \log_{10}(L/K \times 2^n)$$
$$30 \times n + 100 \times \log_{10}(L/K \times 2^n). \qquad (8)$$

When it is necessary to change the number in logarithmic domain to linear domain, first C is divided by 30 and then, n and C-n×30 are calculated. Then, using ROM and its lookup table, C-n×30 is converted to $10^{(C-n \times 30)/100}$. Thus obtained $10^{(C-n \times 30)/100}$ is shifted n+11(K=$2^{11}$) bits leftwardly, resulting in multiplication of $10^{(C-n \times 30)/100}$ times $2^{11} \times K$, thereby obtaining L as defined in equation (7). Contrary, when it is necessary to change the number in linear domain to logarithmic domain, L is being shifted leftwardly until the first "1" appears to detect the place where the first "1" is standing, thereby obtaining n. Since the data afterwards from the first "1" corresponds to $L/K \times 2^n = 10^{(C-n \times 30)/100}$, this data is converted $100 \times \log_{10}(L/KX2^n)$ using ROM and its look-up table. Then, the data 30×n is added with the converted data $100 \times \log_{10}(L/KX2^n)$, thereby obtaining C as defined in equation (8).

It is to be noted that according to the above described calculation for the exposure value data or for the memory data, there may be a case in which a calculated value results in a value smaller than zero. In such a case, a data corresponding to zero is given in place of actual exposure value data or memory data and, at the same time, an error marking "E" is displayed.

Figure 15A:
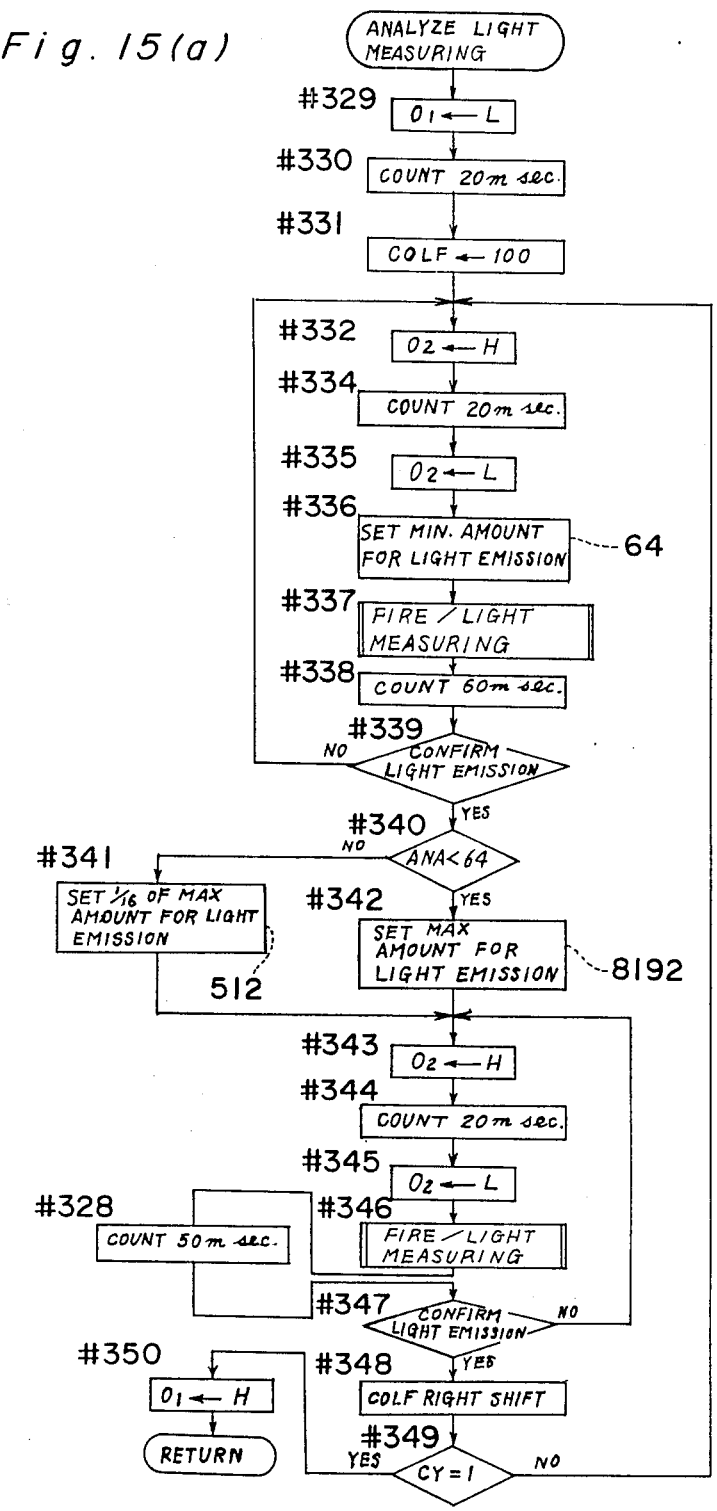
FIG. 15(a) is a flow chart showing an analyze light measuring subroutine.

Referring to FIG. 15(a), a flow chart of a subroutine for the analyze/light-measuring. At step #329, the terminal O1 produces "LOW" so as to stop the light emission from the xenon tubes XF and DG for the illumination. Then, at step #330, a counter counts 20 msec. As explained before, this time 20 msec. is necessary because the light emission for the illumination does not stop immediately after the production of "LOW" from the terminal O1, but after a short period of time which is at maximum 20 msec. At step #331, "100" is set in a color flag COLF, and thereafter, the program advances to step #332 wherein the color flag COLF is set with a data corresponding to the xenon tube which is to be actuated. For example, for actuating the blue xenon tube XB, the corresponding data "100" is set up, for the green xenon tube XG, it is "010", and for the red xenon tube XR, it is "001".

Figure 20:
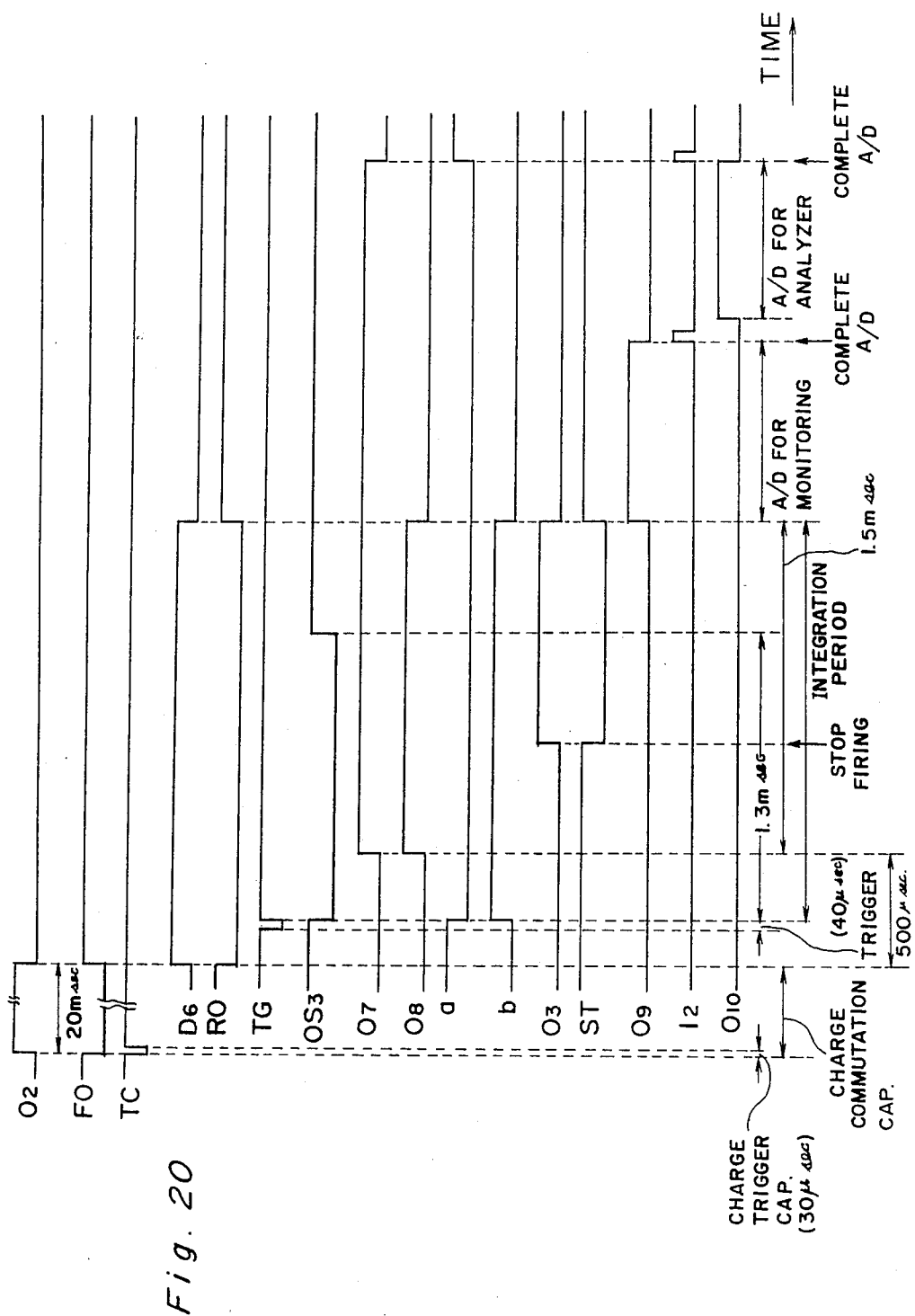
FIG. 20 is a time chart showing an operation of the microcomputer MC and the interface circuit IF when carrying out firing/light measuring operation.

At step #332, the terminal O2 produces "HIGH" and, 20 msec. thereafter, the terminal O2 produces "LOW". As shown in FIG. 18, the terminal O2 is connected to inputs of OR gates OR4 and OR5. The output of the OR gate OR4 is connected to the input of one-shot-circuit OS1. Thus, by the positive edge of a pulse produced from the terminal O1, a pulse having a pulse width of 30 microseconds is produced, and thus, the output TC of the NAND gate NA1 produces a "LOW" level pulse (FIG. 20, waveform TC). Accordingly, the light emitting diode LD0 shown in FIG. 21 emits light, thereby turning the photothyrister PS0 on, and immediately charging the commutation capacitor C16. Contrary, since the output of the OR gate OR5 is connected directly to the input of the NAND gate NA2, the NAND gate NA2 produces "LOW" while the output O2 is producing "HIGH" (FIG. 20, waveforms O2 and FO). Thereupon, the photodiodes LD10 and LD12 produce light to cause the thyristors SC8 and SC12 to turn to conductive state. Unlike the illumination for the focusing, no trigger is applied to the xenon tubes, thereby preventing xenon tube XF from emitting light. And, the commutation capacitor C52 is rapidly charged by a current flowing through thyristor SC8, normally-close relay switch RS, resistor R96 and thyristor SC12. Thus, the side (d) of the capacitor C52 is charged up to voltage at the terminal VH while the side (e) thereof is held ground level, within 5 msec. Thus, the thyristors SC8 and SC12 are turned to non-conductive state to complete the charging.

Referring to FIG. 21, a circuit defined by a register R98 connected parallel to the resistor R96 and a light emitting diode LD16 is an error operation detecting circuit. For example, if the thyristors SC14 and SC8 should conduct simultaneously due to, e.g., the error operation of the microcomputer MC, the light emitting diode LD16 continues to emit light longer than the above-mentioned 5 msec. Thus, the phototransistor PT6 continues to conduct more than 5 msec. When this occurs, the charge across the capacitor C68 increases to conduct the transistor BT10, thereby actuating the relay RL to cut off the switch RS. Thus, both the thyristors SC8 and SC14 are rendered non-conductive. Accordingly, the resistor R96 can be protected from a damage caused by a current flowing therethrough for a long period of time.

Referring again to FIG. 15(a), at step #336, a data corresponding to the minimum amount of light to be emitted in each firing is set and, thereafter, the program advance to step #337 in which the firing/light-measuring subroutine is carried out. The detail of the minimum amount of light to be emitted in each firing will be described later, but here it is to be noted that the minimum amount of light to be emitted corresponds to "64" as an A-D converted data from the monitor unit. Also, the detail of the firing/light-measuring subroutine will be described later in connection with FIG. 17. When the firing/light-measuring subroutine of step #337 completes, 60 msec. is counted in step #338 and, thereafter, the program advances to step #339. Here, the counting of 60 msec. in addition to counting of 20 msec. is necessary so as to provide a time interval of about 80 msec. between consecutive firings.

At step #339, it is confirmed or checked whether the xenon tubes have really fired, or not by making reference to the A-D converted data (referred to as a monitor data) obtained from the monitor unit MO. This checking is carried out by finding whether or not the light emitted from the xenon tube exceeds "16". If it is found that no firing is carried out, that may be the case when the voltage at the terminal VH (FIG. 4) is below 150 volts. If the firing is confirmed, the program advances to step #340, but if not, the program returns back to step #332 to try again to emit the minimum amount of light from the xenon tubes.

At step #340, it is determined whether or not the A-D converted data (referred to as analyze data ANA) obtained from the light receiver AN in the step #337 is smaller than "64". If it is discriminated such that the analyze data ANA is smaller than "64", data of emitting period corresponding to the maximum amount of light to be omitted in one shot (corresponding to "8192" according to monitor data) is set. But, if it is discriminated that the analyze data ANA is greater than or equal to "64", data of emitting period corresponding to 1/16 of the maximum amount of light to be emitted in one shot (corresponding to "512" according to monitor data) is set. Then, at step #343, the terminal O2 produces "HIGH" for 20 msec. and then, the trigger capacitor C16 and commutation capacitor C52 are charged. Thereafter, firing/light-measuring subroutine is carried out. Then, at step #328, 50 msec. is counted, so that together with 20 msec. spent in step #344 and 10 msec. spent in step #346 for the subroutine, 80 msec. is provided for the time interval between the consecutive firing of the xenon tube.

Next, at step #347, it is determined whether or not the monitor data MON is greater than "15". If the monitor data MON is equal to or smaller than "15", it is so determined that no firing is carried out. In this case, the program returns back to step #343. If the monitor data MON is equal to or greater than "16", it is so determined that the xenon tube is properly fired. Thus, in this case, the program advances to step #348, thereby shifting the data carried in color flag COLF one bit rightwardly. And, at step #349, it is determined whether or not a carry is present. If the carry is not present, the program returns back to step #332 for effecting the firing of the next xenon tube. If the carry is present, it is so determined that the firing of all three xenon tubes XB, XG and XR is completed and that reading of monitor data and analyze data is completed. Then, the terminal O1 produces "HIGH", ready for carrying out the firing of xenon tubes XF and XG for the illumination. Thereafter, the program returns back to step #316 or #301 of the main flow.

Figure 15B:
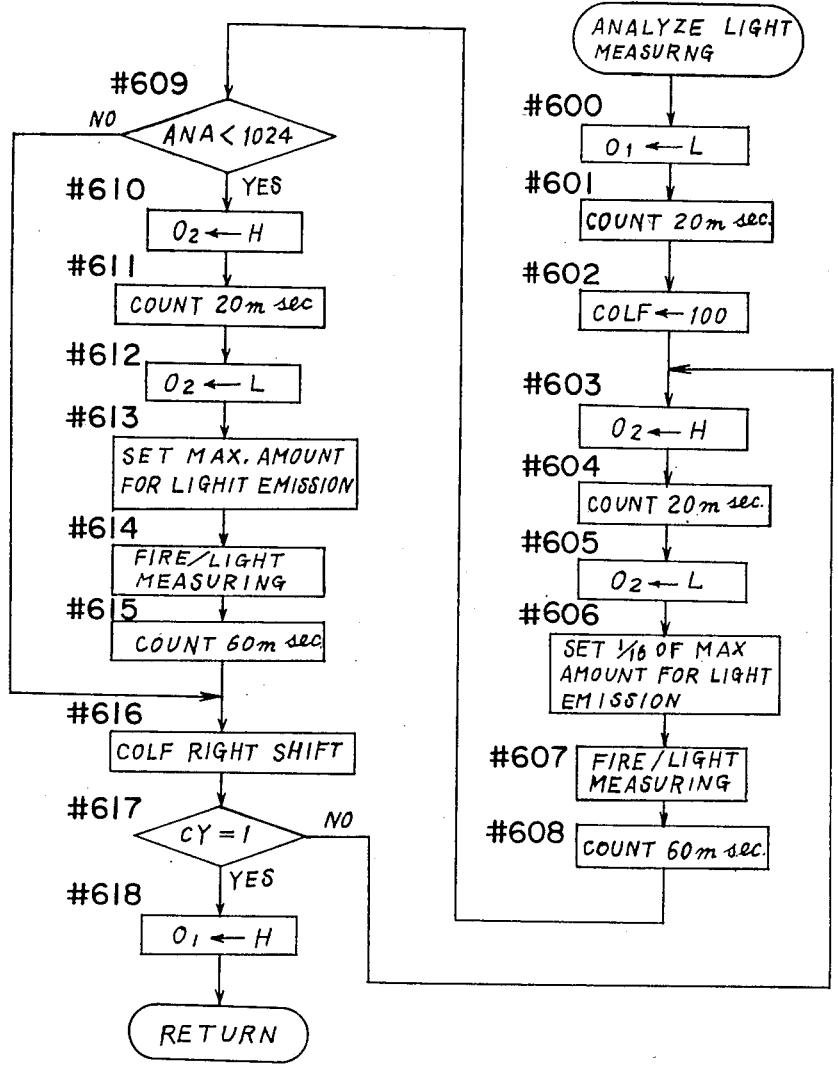
FIG. 15(b) is a flow chart similar to FIG. 15(a), but particularly showing a modification thereof.

Referring to FIG. 15(b), an analyze/light-measuring subroutine according to one modification is shown. At step #600, the terminal O1 produces "LOW", thereby stopping the firing for the illumination. Then, at step #601, 20 msec. is counted, because the emission of light from xenon tube does not stop immediately, but after a short period of time, at longest 20 msec., as has been described above in connection with FIG. 15(a). At step #602, "100" is set in the color flag COLF, so that the blue xenon tube XB is now ready to emit light. Like the program described above in connection with FIG. 15(a), the terminal O2 produces "HIGH" at step #603 and, 20 msec. thereafter, the terminal O2 produces "LOW". Then, at step #606, data of emitting period corresponding to 1/16 of the maximum amount of light to be emitted in one shot (corresponding to "512" according to monitor data) is set. Thereafter, the firing/light-measuring subroutine (FIG. 17) is carried out at step #607, in which the firing is carried out with a light amount equal to 1/16 of the maximum amount of light to be emitted in one shot. When the firing/light-measuring subroutine at step #607 completes, 60 msec. is counted in step #608 for taking enough interval between consecutive fires, thereby preventing the xenon tube from being overworked. Then, at step #609, it is determined whether or not the analyze data ANA obtained at step #607 is smaller than "1024". If the analyze data ANA is greater than or equal to "1024", it is understood that the analyze data ANA has enough amount to be evaluated. But, if the analyze data ANA is smaller than "1024", it is so determined that the analyze data ANA is not enough to be evaluated. In this case, the program jumps to step #610 to carry out the measurement with a stronger light emission. At step #610, the terminal O2 produces "HIGH", in a similar manner as carried out in the previous step #603. And after counting 20 msec., the terminal O2 produces "LOW". Then, at step #613, data of emitting period corresponding to the maximum amount of light to be emitted in one shot (corresponding to "8192" according to monitor data) is set. Thereafter, the firing/light-measuring subroutine of step #614 is carried out under the maximum amount of light emitted in each shot. At step #615, 60 msec. is counted for the same reason described above at step #608. Then, at step #616, the data in the color flag COLF is shifted one bit rightwardly and, at step #617, it is determined whether or not the carry is present. If the carry is not present, the measuring of three colors is not finished yet. Thus, in this case, the program returns back to step #603 to effect the emission of light from the next xenon tube, and again it is determined whether the carry is present, or not. If the carry is present, it is so determined that the light emission from the xenon tubes XB, XG and XR is completed and that the reading of monitor data and analyze data is completed. Then, the terminal O1 produces "HIGH" again, ready for emitting light for the illumination. Thereafter, the program returns back to step #316 or #301 of the main flow.

According to the flow chart of FIG. 15(b), no step is provided for confirming whether the xenon tube has fired or not, such as steps #339 and #347 of FIG. 15(a). The reason for this is explained below. According to the flow chart having a loop, such as that shown in FIG. 15(a), in which it is checked whether or not the light emission is carried out, the procedure continues to repeat the loop again and again until the light emission is actually carried out. In such a flow chart, a correct measuring value can be obtained when the analyze/light-measuring subroutine completes, but if the xenon tube breaks and stop producing the light, the procedure just continues to repeat the loop again and again. Then, such a case may occur wherein the procedure can not get out of the subroutine no matter what operation the operator makes through the control box. When such a case occurs, it is difficult to determined whether the fault is in xenon tube or whether it is in microcomputer MC. In contrast to this, according to the flow chart of FIG. 15(b), when no light emission is effected by an error, both the A-D converted data of the monitor unit MO and A-D converted data of the analyzer AN show zero, thereby failing to obtain the correct measured amount. But, with the flow chart of FIG. 15(b), there is no fear of being trapped in the subroutine. After the subroutine, the obtained error data, such as A-D converted data of the monitor unit MO, can be checked whether or not it is greater than a predetermined level. And, if it is smaller, an error indication may be displayed to show that there was an error in analyze/light-measuring. In this case, the fault is not in the microcomputer so that it is possible to further carry out other programs.

As understood from the description given above in connection with FIGS. 15(a) and 15(b), there are two major features in the analyze/light-measuring subroutine. The first one is to present two different levels for the light emission whereby the light measuring operation can be carried out either with a high intensity light or low intensity light. The second one is to determine which of the two levels of light should be emitted, by the utilization of light measuring carried out under a certain amount of light emission and determining whether the measured light is greater than a predetermined level, or not.

According to the flow chart of FIG. 15(a), the certain amount of light emission mentioned in the second feature is less than either one of the two different levels of the light emission mentioned in the first feature.

Contrary, according to the flow chart of FIG. 15(b), the certain amount of light emission mentioned in the second feature is equal to the smaller one of the two different levels of the light emission mentioned in the first feature. According to the flow chart of FIG. 15(b), since the preceding light emission carried out for the selection has the same light amount as that of the smaller one of the two, the result of light-measurement obtained while the preceding light emission is carried out can be used, when it is so determined that the smaller one of the two should be emitted, as the data which will be obtained when the smaller one is emitted. In this case, the emission of the smaller one can be omitted, resulting in single shot of light emission.

Figure 5:
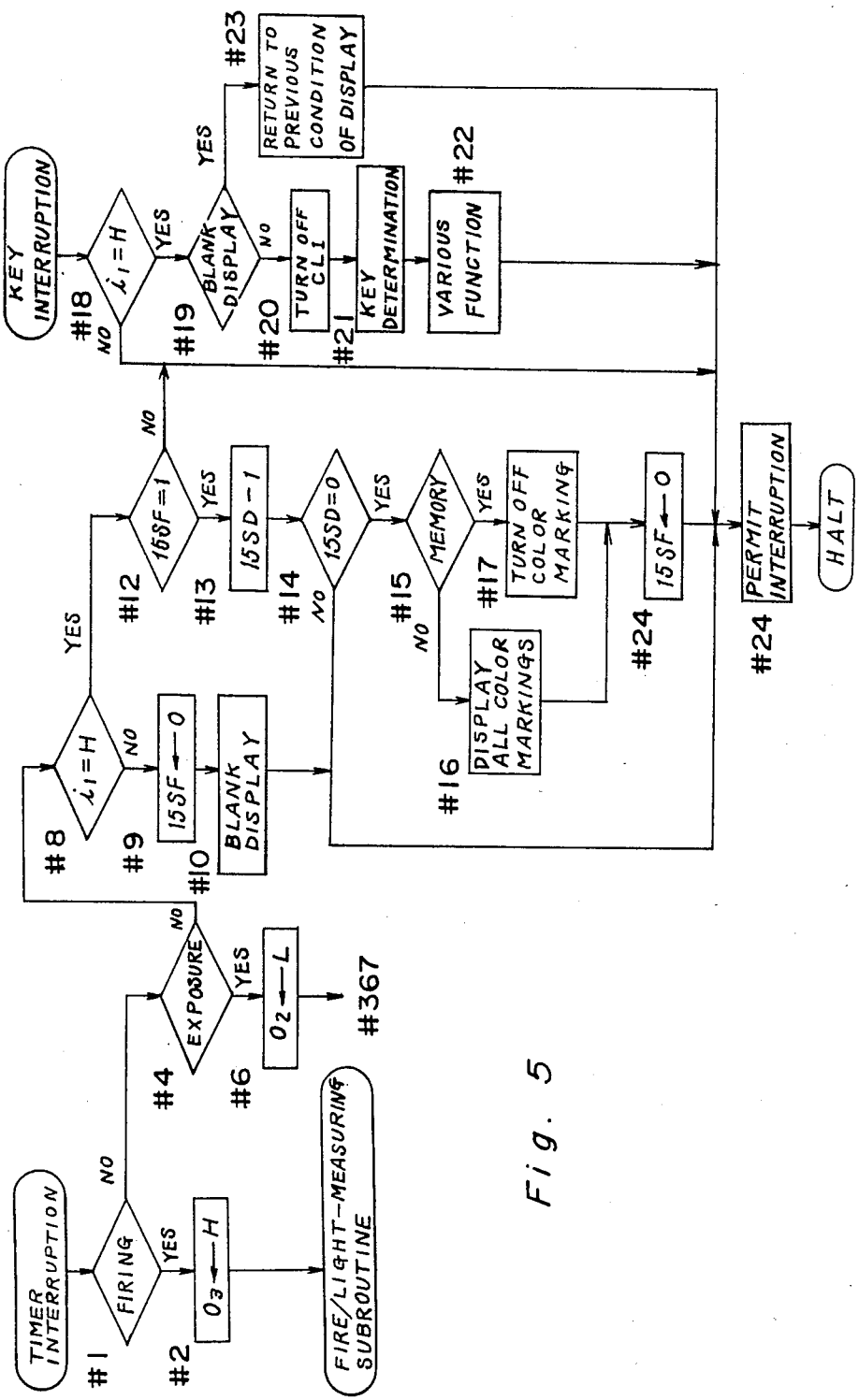
FIG. 5 is a flow chart showing the main flow of an operation of microcomputer MC.
Figure 16A:
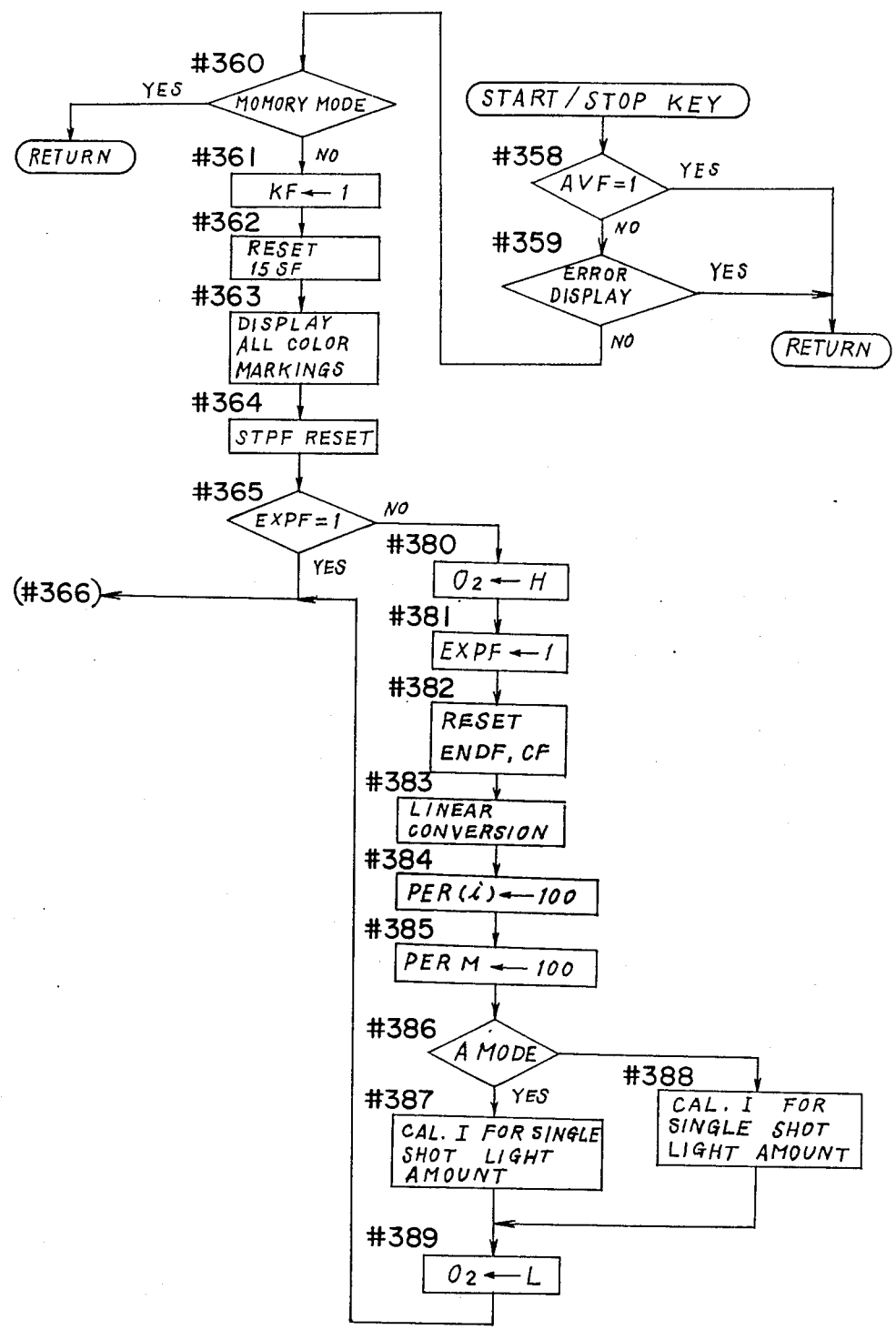
FIGS. 16(a) to 16(h) taken together show a flow chart of operation of microcomputer MC when a start/stop key STK is depressed.
Figure 16B:
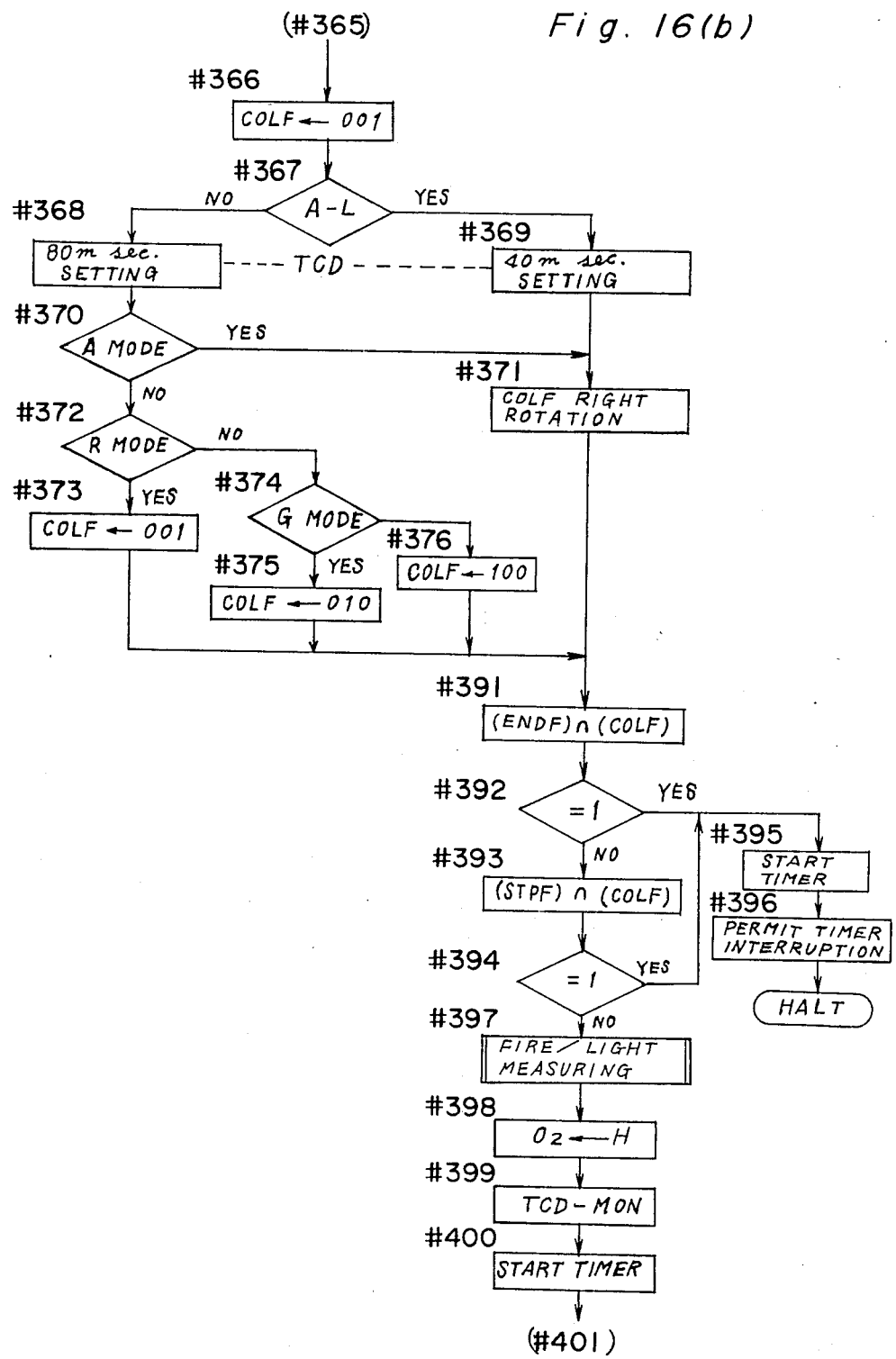

FIGS. 16(a) to 16(h) show a flow chart for carrying out an exposure operation upon depression of the start/-stop key STK. Referring particularly to FIGS. 16(a) and 16(b), at step #358, it is determined whether or not the register AVF is carrying "1". When the register AVF is carrying "1", that is when the program is in a condition ready to carry out the average calculation as established upon depression of analyze key ANK and average key AVK simultaneously, with no analyze/-memory operation or analyze start operation been carried out since then, the program returns to step #25 (FIG. 5). At step #359, it is determined whether or not the error marking is being displayed. If the error marking is displayed, the program returns back to step #25. At step #359, if it is so determined that no error marking is displayed, it is further determined at step #360 whether the mode is memory mode or not. If it is the memory mode, the program returns back to the step #25, and if not, the program advances to step #361.

It is to be noted that at steps #358 to #360, the program returns back to step #25 when no exposure value data is being displayed through exposuring areas RDD, GDD and BDD, such as shown in FIGS. 3(d) to 3(h). In these cases, the operator is not informed with exposure value data and, therefor, it is not so programmed as to immediately carry out the exposuring operation.

At step #361, "1" is set in a key flag KF. This key flag KF is used for determining whether or not the operator has depressed and released his finger from the start/stop key STK. Then, a 15-second flag 15SF is reset and, at the same time, all of the color markings are displayed. Thereafter, a register STPF is reset. The register STPF is provided for interrupting the exposure while carrying out the exposuring operation, and its detail will be described later. Then, it is determined at step #365 whether or not a flag EXPF for the indication of exposuring operation is carrying "1" or not. If the flag EXPF is carrying "1", it means that the exposuring operation is being started again after the interruption, and in this case, the program advances to step #366. Contrary, if the flag EXPF is carrying "0", the exposure operation will be carried out from the very beginning and, in this case, the program advance to step #380.

At step #380, the terminal O2 produces "HIGH" so as to start charging the trigger capacitor C16 and commutation capacitor C52. Then, at step #381, "1" is set in the flag EXPF for the indication of exposuring and, at step #382, registers ENDF and CF are reset. The register ENDF is provided for the determination of completion of exposure, and the register CF is provided to determine whether or not the correction of amount of light to be emitted for each shot is effect so as to increase the preciseness of the total exposuring amount of light. The details of these registers ENDF and CF will be described later.

At step #383, the exposure value data given in logarithmic domain is converted to that in the linear domain and then, registers PER(i) (i=R, G, B) for indicating how many percentage left for completing the exposure are set with data representing 100%, and, at the same time, a register PERM for setting the percentage which is equal to the most smallest percentage carried in the registers PER(i) is set with data representing 100%. Then at step #386, it is determined whether or not the print mode is the additive print mode. If it is an additive print mode, the program advances to step #387 in which a calculation I for calculating the amount of light for a single shot is carried out. If it is not an additive mode, that is if it is additive low mode or separation mode, the program advances to step #388 in which a calculation II for calculating the amount of light for a single shot is carried out.

Now, the description is particularly directed to the calculations for the calculating the amount of light for a single shot. Table 5 shows a relationship between exposure value data given in logarithmic domain and that in the linear domain and also an amount of light to be emitted in each range of exposure value data.

TABLE 5

| Logarithmically Compressed Domain | Linear Domain | Light Amount for a Single Shot | |
|---|---|---|---|
| | | Additive mode | Additive Low Separation modes |
| 0-29 | $2^{11}$ - $4 \times 10^3$ | $2^7$ | $2^6$ |
| 30-59 | $2^{12}$ - $8 \times 10^3$ | $2^8$ | $2^6$ |
| 60-89 | $2^{13}$ - $16 \times 10^3$ | $2^9$ | $2^6$ |
| 90-119 | $2^{14}$ - $32 \times 10^3$ | $2^{10}$ | $2^6$ |
| 120-149 | $2^{15}$ - $64 \times 10^3$ | $2^{11}$ | $2^7$ |
| 150-179 | $2^{16}$ - $128 \times 10^3$ | $2^{12}$ | $2^8$ |
| 180-209 | $2^{17}$ - $256 \times 10^3$ | $2^{13}$ | $2^9$ |
| 210-239 | $2^{18}$ - $512 \times 10^3$ | $2^{13}$ | $2^{10}$ |
| 240-255 | $2^{19}$ - $726 \times 10^3$ | $2^{13}$ | $2^{10}$ |

The calculation of light amount for a single shot is carried out first by determining which region does the exposure value data belongs to under the logarithmically compressed domain. Then, the light amount for the single shot for the detected region is set up. For example, if the exposure value data under the logarithmically compressed domain is "130", a light amount of $2^{11}$ is emitted each shot when the printing is in additive mode, and a light amount of $2^7$ is emitted each shot when the printing is in additive low mode or separation mode.

Referring again to FIGS. 16(a) and 16(b), when the calculation of light amount for the single shot completes, the terminal O2 produces "LOW" at step #389 to stop the charging of the capacitor C52 and, thereafer, the program advances to step #366. Then, "001" (corresponding to red) is set in color flag COLF and 40 msec. is set in a timer if the printing mode is additive low mode, and 80 msec. if it is other than the additive low mode. The timer counts 40 msec. or 80 msec. as time intervals between consecutive firings for the additive low mode or for modes other than additive low mode. It is to be noted that these data 40 msec. and 80 msec. to be counted by the timer is generally referred to as data TCD.

When the procedure at step #368 completes, it is determined at step #370 whether or not the mode is additive mode or not. If it is additive mode, the program advances to step #371 for shifting the content of the color flag one bit rightwardly. Also, when the procedure at the step #369 completes, the program jumps to step #371. At step #370, if it is determined that the mode is other than additive mode, it means that the mode is separation mode. In this case, it is determined which one of the three color lights should be emitted, and if it is determined as red, the color flag COLF carries "001"; if green, the color flag COLF carries "010"; and if blue, the color flag COLF carries "100".

Then, at step #391, a bit at which "1" is standing in the flag COLF and a bit corresponding to that in the register ENDF are ANDed, and at step #392, it is determined whether or not the result is "1". If the result is "1", the program advances to step #395, but if not, the program goes to step #393. As will be described later for the register ENDF, when the exposure of one color ends, "1" stands in the flag ENDF at a bit corresponding to that color and, therefore, it is possible to determine whether or not the emission of that color light has ended. At step #393, a bit at which "1" is standing in the flag COLF and a corresponding bit in STPF are ANDed, and at step #395, it is determined whether or not the result is "1". If the result is "1", the program advances to step #395, but if not, the program goes to step #397. As will be described later for the STPF, when the interruption completes while carrying out exposure of one color, "1" stands at a bit corresponding to that color and, therefore, it is possible to determine whether or not the interruption has ended. The interruption procedure will be described later. At step #395, timer starts set the program in "HALT" state, thereby permitting the timer interruption. The program starting from step #395 is for the case in which the light emission of that color is not necded. In this case, the emission of light for the next color is carried out after the same time interval as that taken during the emission of light for the present color. Thus, from the condition of "HALT", the timer interruption is carried out after 40 msec. under the additive low mode and, after 80 msec. under the mode other than additive low mode. Then, after carrying out steps #4 and #6 shown in FIG. 5, the program jumps to step #367 for the preparation of light emission of next color. Now, in the case where no light emission takes place, the commutation capacitor C52 is not discharged. Thus, the terminal O2 continues to produce "LOW". Therefore, the operation at step #6 is worthless, but if the timer interruption is to be carried out after the light emission, as will be described later, it is worth while to have the terminal O2 produce "HIGH".

At step #397, the operation by the firing/light-measuring subroutine is carried out and, after that, the terminal O2 produces "HIGH". Thus, the trigger capacitor C16 and commutation capacitor C52 are charged. Then, the data TCD for the timer is subtracted by the A-D converted data MON representing the amount of light received by the monitor unit MO, thereby obtaining a difference TCD-MON. Thereafer, a timer starts to count a period of time corresponding to that difference TCD-MON, and the program advances to step #401. Therefore, the time necessary for the A-D conversion added with the time counted by the timer results in 80 msec. or 40 msec. This means that the light shots are repeated with a constant time interval regardless of variation of time necessary for the A-D conversion.

Figure 16C:
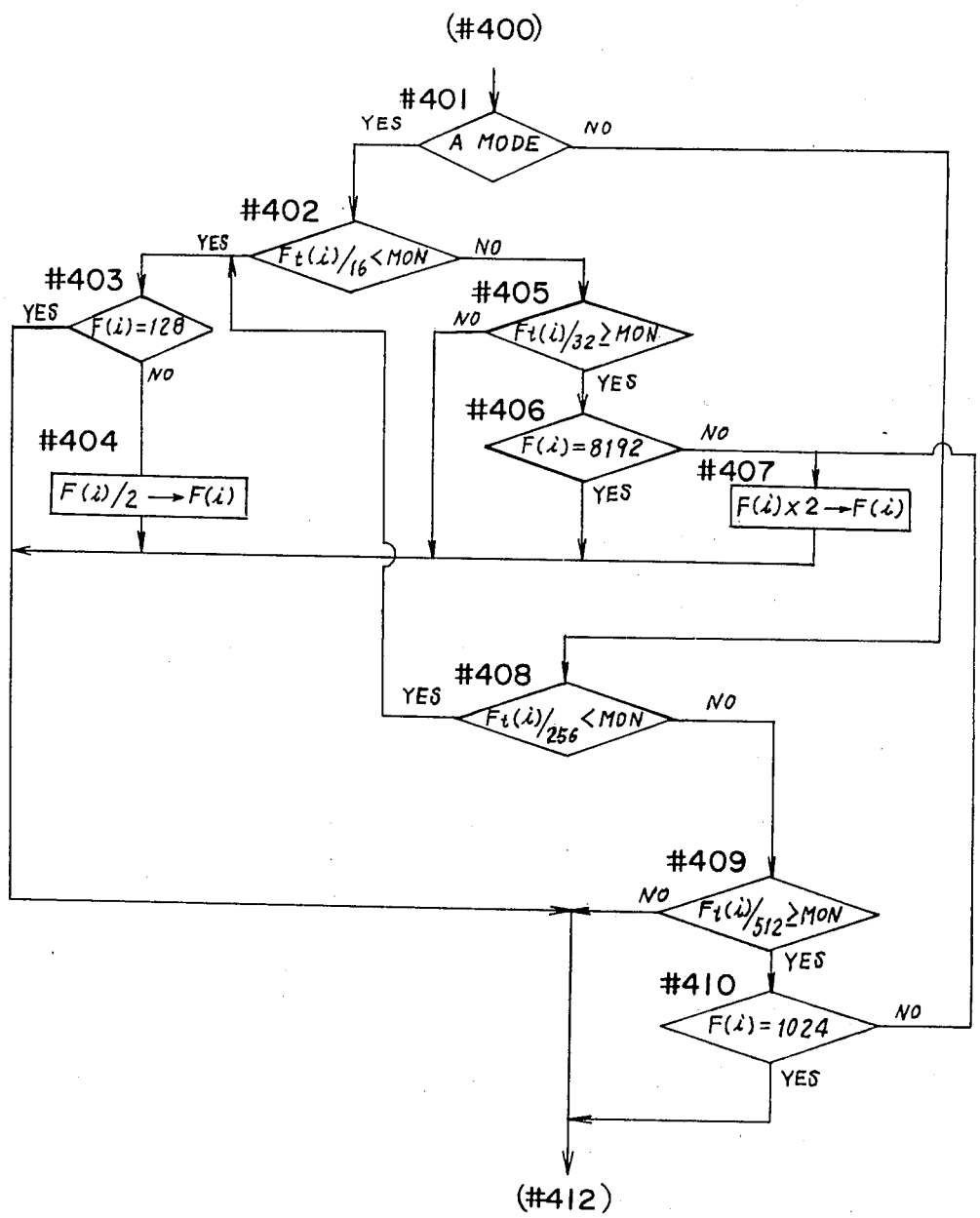
Figure 16D:
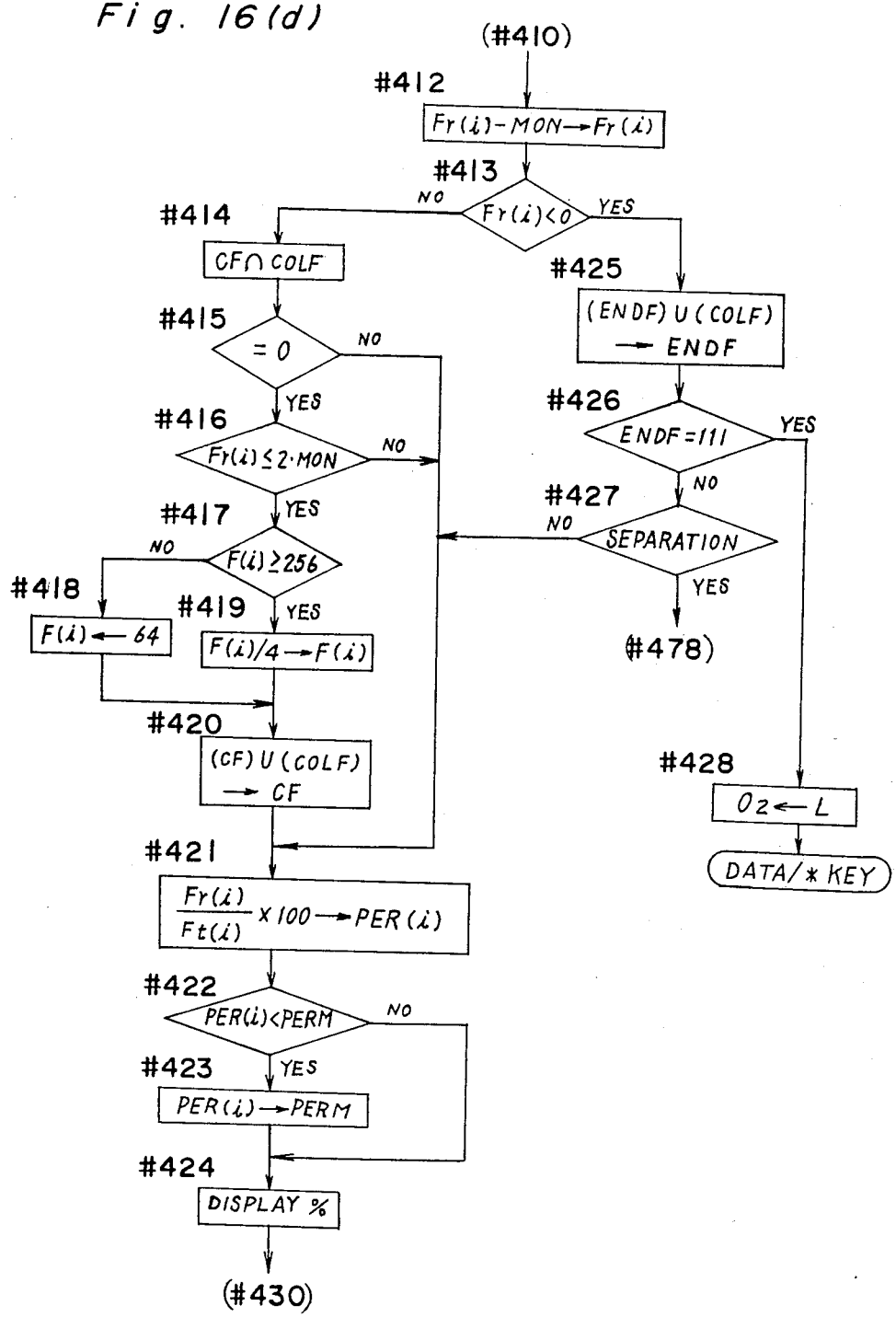

Referring now to FIGS. 16(c) and 16(d), at step #401, it is determined whether or not the mode is additive mode. If it is additive mode, it is further determined at step #402 whether or not a value which is equal to the total exposure value Ft(i) divided by 16 is greater than A-D converted monitored value MON. If
$Ft(i)/16 < MON$,
it is understood from Table 5 that the light amount for single shot is more than enough, i.e., the xenon tubes emit more than enough lights. In this case, the program advancese to step #403 in which it is determined whether the light amount of one shot is equal to "64" (minimum amount) or not. Then, if the light amount of one shot is equal to "64", the program immediately advances to step #412, and if not, the single shot light amount F(i) is cut down to a half and, thereafter, the program advances to step #412. If it is so determined at step #402 that
$Ft(i)/16 \geq MON$,
it is further determined at step #405 whether or not
$Ft(i)/32 \geq MON$.
If it is so determined that
$Ft(i)/32 < MON$,
it is understood that
$Ft(i)/16 \geq MON > Ft(i)/32$.
Thus, the xenon tubes are emitting an appropriate amount of light, as understood from Table 5 and, therefore, the program advances to step #412. Contrary, if it is so determined at step #405 that
$Ft(i)/32 \geq MON$,
it is understood that the light emitted from the xenon tubes is not enough. In this case, the program advance to step #406 in which it is determined whether or not the single shot light amount is equal to the maximum amount, "8192". If it is equal to the maximum amount "8192", the program advances to step #412, and if not, the single shot light amount is doubled and, thereafter, the program advances to step #412. The operation so far described has advantages that the burning can be carried out almost in a constant period of time no matter how much exposure amount is, and that the unevenness of the exposure due to the undesirable variation of light amount emitted from the xenon tube can be avoided.

At step #401, if it is determined that the mode is not an additive mode, the program advances to step #408 in which it is determined whether
$Ft(i)/256 < MON$,
or not. If it is so determined at step #408 that
$Ft(i)/256 < MON$,
it is further determined whether F(i) is equal to "64", or not. If it is equal to "64", the program advances directly to step #412, and if not, the single shot light amount F(i) is cut down to a half and, thereafter, the program advances to step #412. At step #408, if it is determined that
$Ft(i)/256 \geq MON$,
it is further determined in step #409 whether or not
$Ft(i)/512 \geq MON$.
If it is determined that
$Ft(i)/512 < MON$,
it is understood that
$Ft(i)/256 \geq MON > Ft(i)/512$.
This means that the amount of light emitted from the xenon tube is appropriate, as understood from Table 5. Thereafter, the program advances to step #412. On the contrary, if it is determined at step #409 that
$Ft(i)/512 \geq MON$,
it is understood that the amount of light emitted from the xenon tube is not enough. In this case, it is determined at step #410 whether the single shot light amount F(i) is equal to "1024", or not. If it is "1024", the program directly advances to step #412, but if not, the single shot light amount F(i) is doubled and, thereafter, the program advances to step #412.

At step #412, remaining exposure value is subtracted by monitored value to calculate the remaining exposure value, and the calculated value is stored in a register Fr(i). Then, at step #413, it is determined whether or not the content of the register Fr(i) is below zero. If it is below zero, the program advances to step #425, but if not, the program advances to step #414.

At step #414, a bit at which "1" is standing in the register COLF and a bit in the same register CF are ANDed, and if the result is "1", the program advances to step #421, but if not, the program goes to step #416. At step #416, it is determined whether
$$Fr(i) \leq 2MON,$$
or not. If it is determined that
$$Fr(i) > 2MON, \text{ the program advance to step #421.}$$
Contrary, if it is determined that
$$Fr(i) \leq 2MON,$$
meaning that the remaining exposure amount is relatively low, the single shot light amount F(i) is cut down to a small amount for the precise control of the total exposure amount. Then, at step #417, it is determined whether
$$F(i) \geq 256$$
or not. If it is determined that
$$F(i) \geq 256,$$
the single shot light amount F(i) is cut down to ¼. And if it is determined that
$$F(i) < 256,$$
the minimum exposure amount "64" is set for the single shot light amount F(i). Thereafter, the program advances to step #420. At step #420, the data in register CF and the data in register COLF are ORed, and the result is stored in the register CF. Then, when the remaining exposure value becomes small, the single shot light amount F(i) is reduced for the precise adjustment of total light emission, and "1" stands at a bit corresponding to the color changed of the single shot light amount in the register CF.

At step #421, Fr(i)/Ft(i)×100 is calculated to obtain a current ratio of remaining exposure value to total exposure value. And the obtained current ratio is stored in the register PER(i). Then, the content of the register PERM carrying the smallest one of the data in the registers PER(R), PER(B) and PER(G) is compared with the current data stored in the register PER(i), and if it is such that
$$PER(i) \geq PERM,$$
the program advances to FIG. 24 but if it is such that
$$PER(i) < PERM,$$
the content of the register PER(i) is set in the register PERM to replace the data formerly carried therein, and thereafter, the program advances to step #424, in which a new percentage is displayed with reference to the current content of the register PER(i) which has been stored with a new data.

At step #413, if it is determined that
$$Fr(i) \leq 0,$$
the contents of the registers ENDF and COLF are ORed, and the result is stored in the register ENDF. Therefore, when the exposure of one color completes, "1" stands at a bit corresponding to the completed color. Then, at step #426, if the content of the register ENDF is "111", the terminal O2 produces "LOW" and, the program follows the steps of data/ring key flow shown in FIG. 10, thereby completing the exposure operation as described before. At step #426, if the content of the register ENDF is not "111", it is determined at step #427 whether the mode is separation mode or not. If the mode is separation mode, the program advances to step #478 (FIG. 16(h)), at which the key on is detected. If the mode is not separation mode, the program advances to step #421.

Figure 16E:
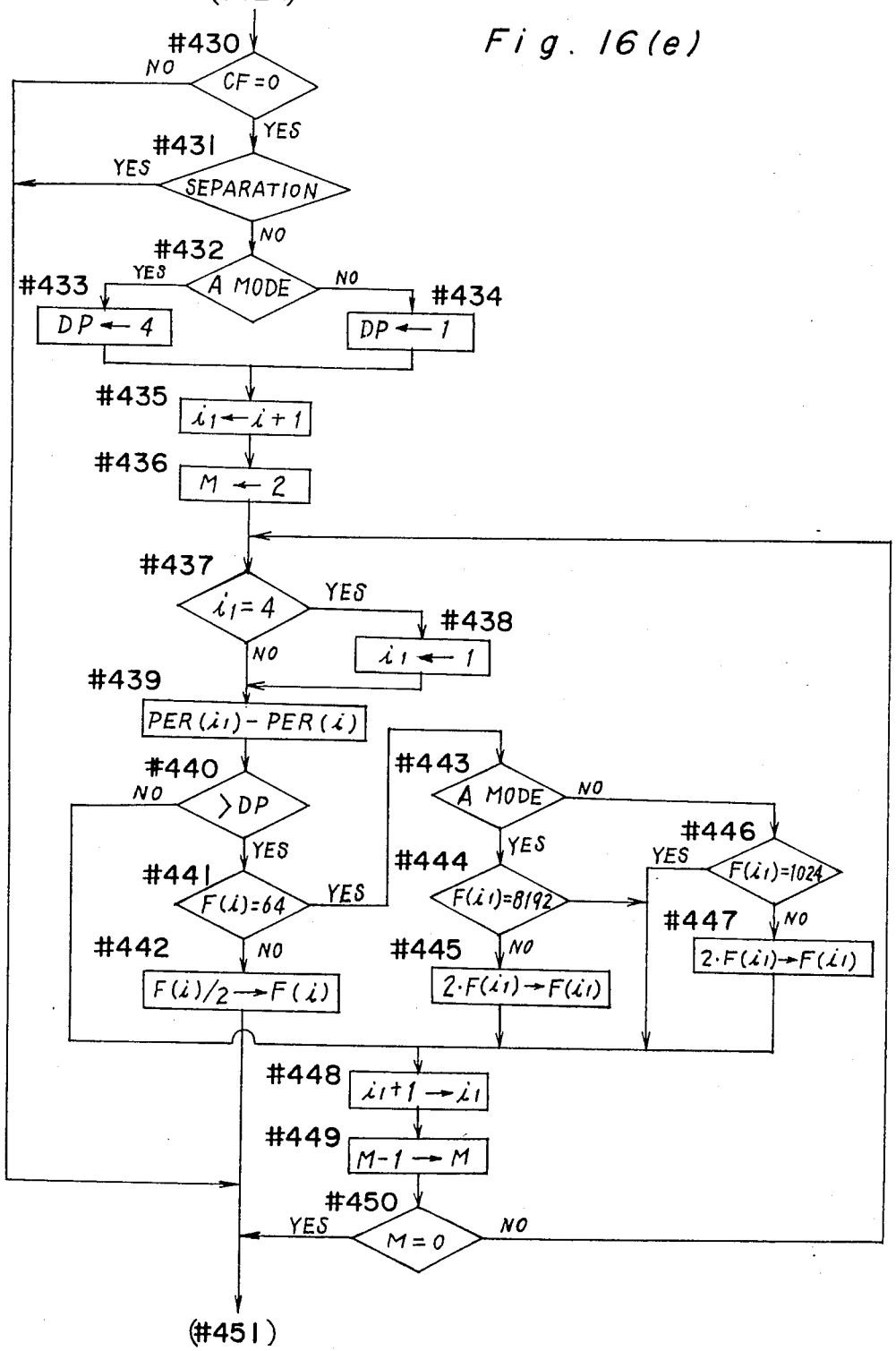
Figure 16F:
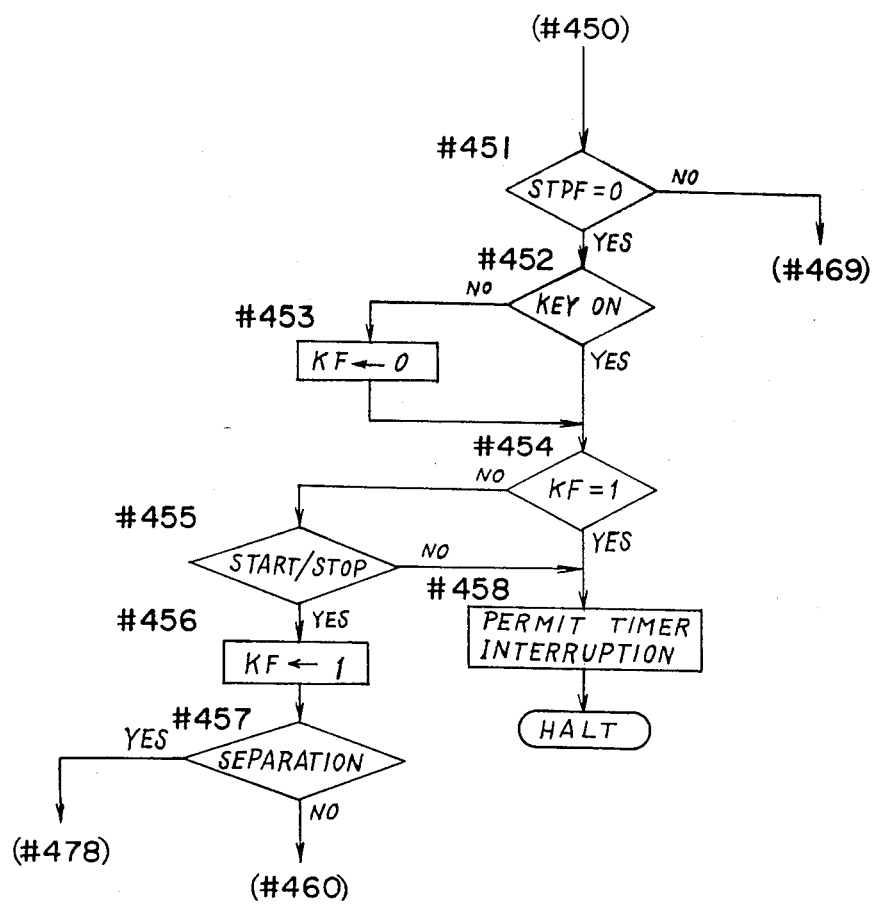

Referring now to FIGS. 16(e) and 16(f), it is determined at step #430 whether the content of the register CF is zero or not. If it is not zero, it is understood that the exposure is about to the end, and thus the single shot light amount is reduced. In this case, the program immediately advances to step #451. Then, at the next step, it is determined whether the mode is separation mode or not. If it is separation mode, the program also immediately advances to step #451. The flow starting from step #432 is provided for the purpose of controlling the firing of xenon tubes such that the ratio of the remaining exposure value to the total exposure value is identical among the three colors throughout the firing periods. It is to be noted that under the separation mode, such a control is not necessary and, therefore, this flow will not be effected under the separation mode. Further, even in the additive mode or the additive low mode, the above flow will not be effected at the ending stage of exposure to avoid such a case that the exposure would be completed under a rough control.

At step #432, it is determined whether the mode is additive mode, or not. If it is additive mode, "4" is stored in the register DP, and if it is additive low mode, "1" is stored in the register DP. Accordingly, during the additive mode, the ratio of remaining light amount to the total exposure value is kept identical among three colors with an error not greater than 4%, and during the additive low mode, the ratio is kept identical among three colors with an error not greater than 1%. Next, at step #435, "1" is added to "i" and the sum i+1 is store in register i1. Thereafter, "2" is set in a register M. Then, at step #437, it is determined whether the content of i1 is equal to "4", or not. If the content of i1 is equal to "4", "1" is set in the register i1. If not, the program advances to step #439. Then, at step #439, it is determined whether or not
$$PER(i1) - PER(i) < DP.$$
If it is so determined that
$$PER(i1) - PER(i) \leq DP,$$
it is indicated that the variation is within the tolerance for the remaining exposure value of the color i and i1. Thus, in this case, the program advances immediately to the step #448. On the other hand, when
$$PER(i1) - PER(i) > DP,$$
it is determined whether the single shot light amount F(i) is equal to "64" or not. If F(i) is not equal to "64", F(i) is cut down to half and, thereafter, the program advances to step #451. Contrary, if F(i) is equal to "64", it is determined whether the mode is additive mode or not. If the mode is additive mode, it is further determined whether F(i1) is equal to "8192" or not. If F(i1) is equal to "8192", the program directly advance to step #448. But, if F(i1) is not equal to "8192", the F(i1) is doubled and, thereafter, the program advances to step #448. At step #443, if it is so determined that the mode is additive low mode, it is further determined whether F(i1) is equal to "1024" or not. If F(i1) is equal to "1024", the program advances to step #448, and if not, the F(i1) is doubled and, thereafter, the program advances to step #448.

At step #448, the content of i1 is added with "1", and the sum thereof is used for the next color data. Then, after subtracting "1" from the content of the register M, it is determined whether the content of the register M is equal to "0". If it is equal to "0", the program advances to step #451, and if not, then the program returns back to step #437, thereby carrying out a ratio correction with respect to the other color. In summary, the above described operation is such that when the percentage of the remaining exposure value of one color just exposed is smaller by a certain amount than the percentage of the remaining exposure values of the other two colors, it is understood that the exposure of said one color is overdone with respect to the other colors. Therefore in this case, the single shot light amount F(i) of said one color is cut down to half. In the case where that amount F(i) is minimum can not be cut down, the single shot light amount F(i) of other two colors is doubled. Accordingly, the ratio of three colors can be maintained at a required ratio.

At step #451, it is determined whether the content of the register STPF is equal to "0" or not. If the content of the register STPF is not equal to "0", the program advances to step #469, but if it is "0", the program advances to step #452. The purpose of providing the register STPF will be described later. At step #452, it is determined whether or not the key input is present. If no key input is present, "0" is set in the key flag KF, and if key input is present, the program advances to step #454. Then, it is determined whether or not the key flag KF is carrying "1". If the key flag KF is carrying "1", it is indicated such that the start/stop key STK has been kept depressed from the beginning. Thus, at step #458, the timer interruption is permitted and, at the same time, the color enlarger is set in a "HALT" condition. Then, when the light emission interval time passes, the operation of steps #1, #4 and #6 of FIG. 5 is carried out. Then, the program advances to step #367 (FIG. 16(b)) for the light emission of next color. Contrary, at step #454, if the key flag KF is carrying "0", it is indicated that the start/stop key STK is depressed and released. In this case, it is determined at step #455 whether or not the start/stop key STK is depressed for the second time. If not, then the program advances to step #458. By the above described operation, the light emission of each color is repeated again and again, thereby completing the exposure operation.

If the start/stop key STK is depressed while the procedure is at step #455, the program goes to an interruption procedure. At step #456, "1" is set in key flag KF and it is determined whether or not the mode is separation mode. If the mode is separation mode, the program advances to step #478, shown in FIG. 16(h), at which it is waited until the next key input is effected. Contrary, if the mode is not separation mode, the program goes to step #460, shown in FIG. 16(g), from which a procedure for restricting the variation of remaining exposure amount (%) within 1%.

Figure 16G:
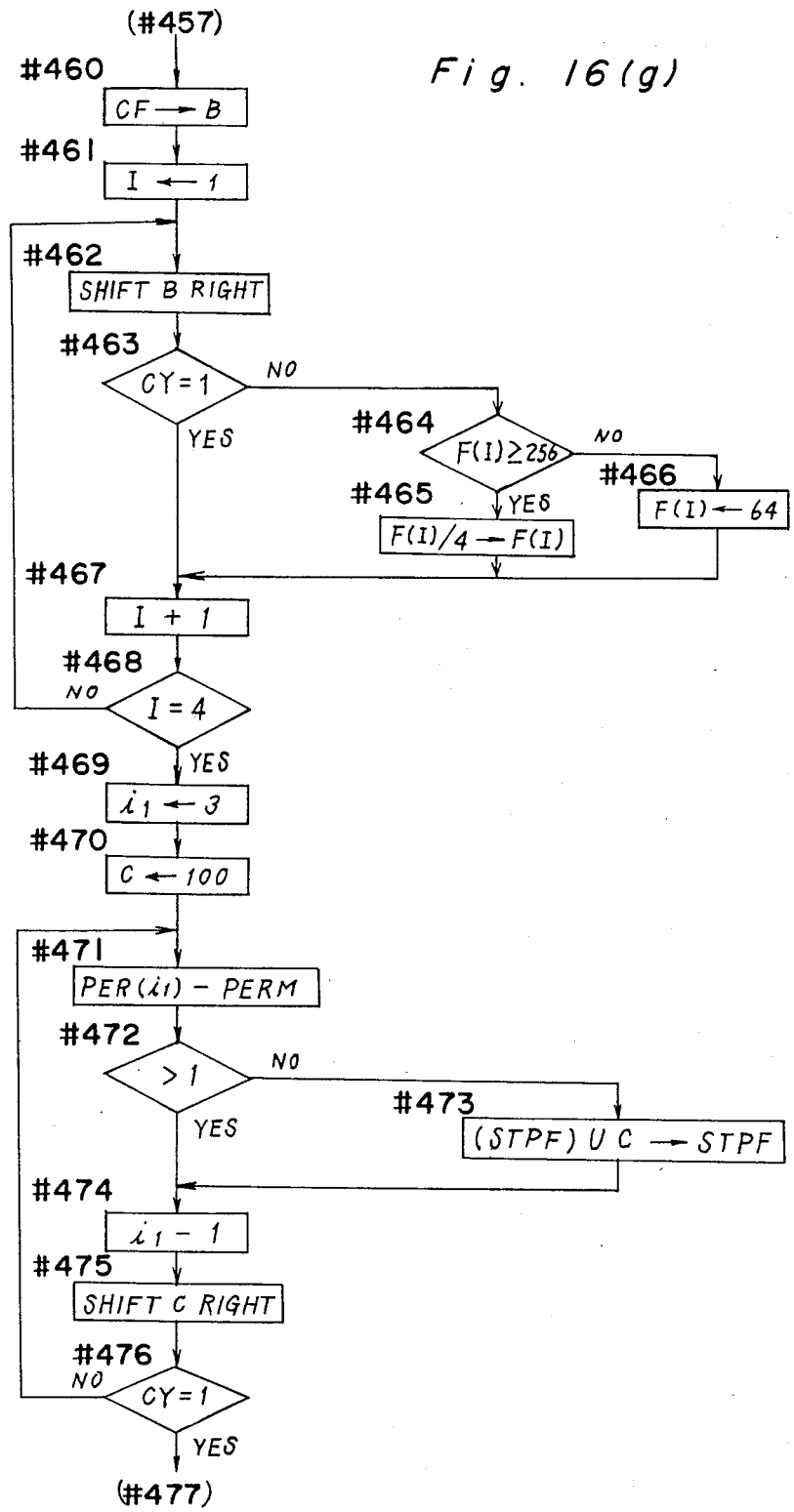
Figure 16H:
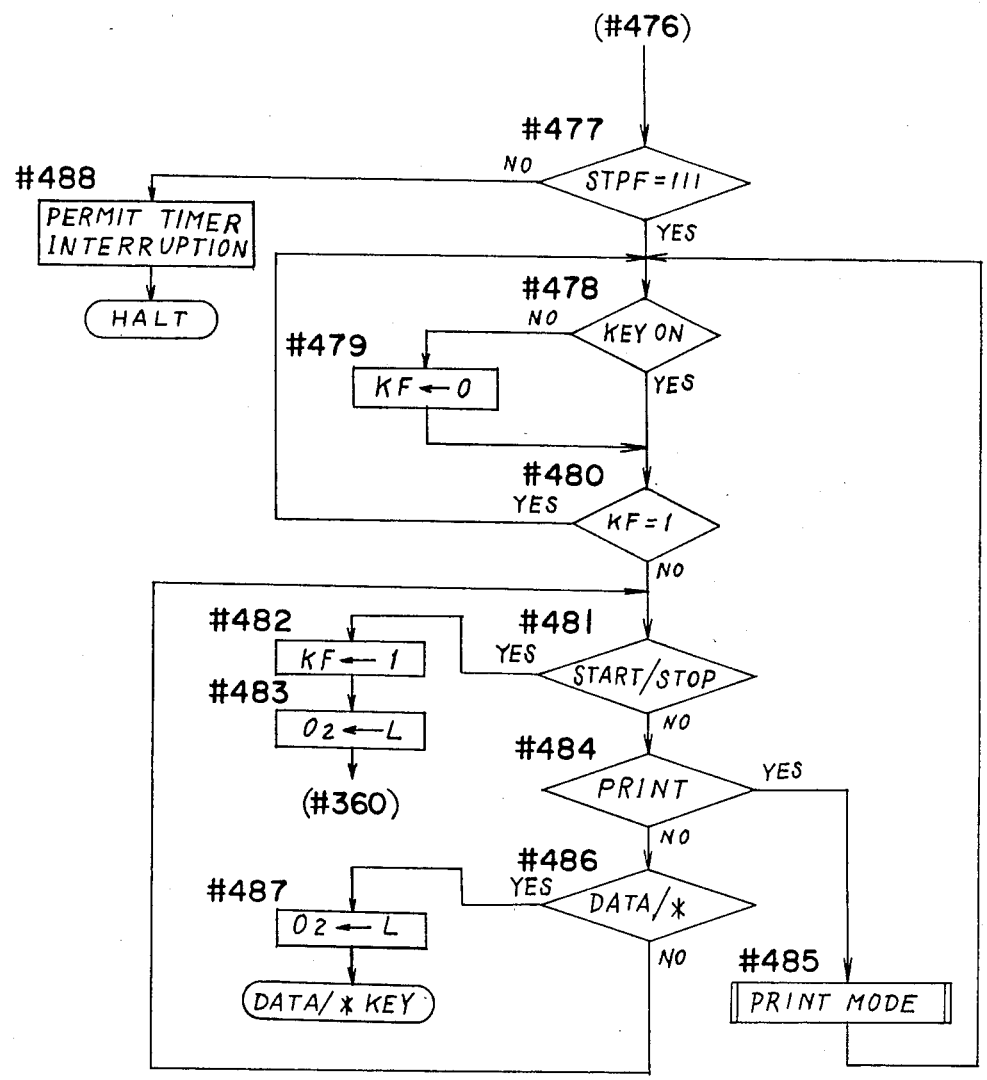

Referring to FIG. 16(g), at step #460, the content of the register CF is shifted to a register B, and at step #461, "1" is set in a register I. Then, at step #462, the content of the register B is shifted one bit rightwardly. At step #463, it is checked whether the carry is present or not. If the carry is present, it is indicated that the single shot light amount F(i) has been changed just before the completion of exposure of a color corresponding to I. In this case, no particular procedure takes place except that "1" is added to the register I. Then, at step #468, it is determined whether the content of the register I is equal to "4", or not. If it is not equal to "4", the program returns back to step #462. At step #463, if there is no carry, it is determined at step #464 whether or not
$F(I) \geq 256$.
If it is so determined that
$F(I) \geq 256$,
the program advances to step #465 and, the F(I) is cut down to a quarter. Contrary, if it is so determined that
$F(I) < 256$,
the program advances to step #466 and, "64" is set in the F(I). Thereafter, the program advances to step #467. In summary, in the program described above, when the single shot light amount F(i) has been changed just before the completion of the exposure, the exposure continues with the right amount as it is, and when no change is given to the single shot light amount F(i), the amount F(i) is cut down to a preferable amount, thereby controlling the total light amount with high accuracy.

When I=4 is satisfied at step #468, "3" is set in the register i1 at step #469, and at step #470, "100" is set in a register C. Then, a difference between PER(i1) and the register PERM (carrying the minimum %) is calculated, and if
$PER(i1) - PERM < 1$,
it is necessary to further carry out the light emission of the color corresponding to PER(i1) and, therefore, the program advances to step #474. Contrary, if
$PER(i1) - PERM \leq 1$,
it is not necessary to carry out the light emission of the color corresponding to i1. Thus, the contents of the registers STPF and C are ORed, and the result is stored in the register STPF. Therefore, "1" is set at the bit corresponding to each color of the register STPF, when the further light emission of that color is made unnecessary. At step #474, "1" is subtracted from i1, and the content of the C register is shifted one bit rightwardly. Then, when the carry is holding "0", the program advances to step #471, and when the carry is holding "1", the program advances to step #477. In summary, according to the above described procedure, no light emission is carried out for the color that has the ratio of remaining exposure value to total exposure value identical with the minimum ratio with an error less than 1%.

At step #477, it is determined whether the register STPF is carrying "111" or not. If it is not carrying "111", the timer interruption is permitted, and the enlarger is set in the "HALT" condition. If the timer interruption is present, the next light emission operation takes place. Contrary, at step #477, if the register STPF is carrying "111", it is indicated that the light emitting operation accompanying interruption is completed. Then, the program continues from step #478.

At step #478, it is determined whether the key is on or not. If the key input is not present, key flag KF carries "0". Contrary, if there is any key input, the program advances directly to step #480. Then, if the key flag KF is carrying "1", it is indicated that the start/stop key STK is held depressed for the temporary interruption or the print mode key PRK is held depressed. In this case, the program returns back to step #478. This procedure is repeated again and again until the key is released from being depressed. When it is determined that the key is released, it is further determined whether the start/stop key STK is depressed. If it is depressed, "1" is set in the key flag KF, and the terminal O2 produces "LOW". Thereafter, the program returns back to step #360, thereby restarting the light emission of the exposure. If the start/stop key is not depressed, it is further determined whether the print mode key PRK is depressed or not. If it is depressed, the operation for changing the print mode, as shown in FIG. 7, is carried out and, thereafter, the program returns back to step #478. If it is determined at step #484 that the print mode key PRK is not depressed, it is further determined whether the data/ring key DAK is depressed or not. If it is depressed, the terminal O2 produces "LOW" and, thereafter, the program of FIG. 10 is carried out. Then, the exposure operation ends. Contrary, if the data/ring key DAK is not depressed at the step #486, it is waited at step #481 until the key input is effected.

Figure 17:
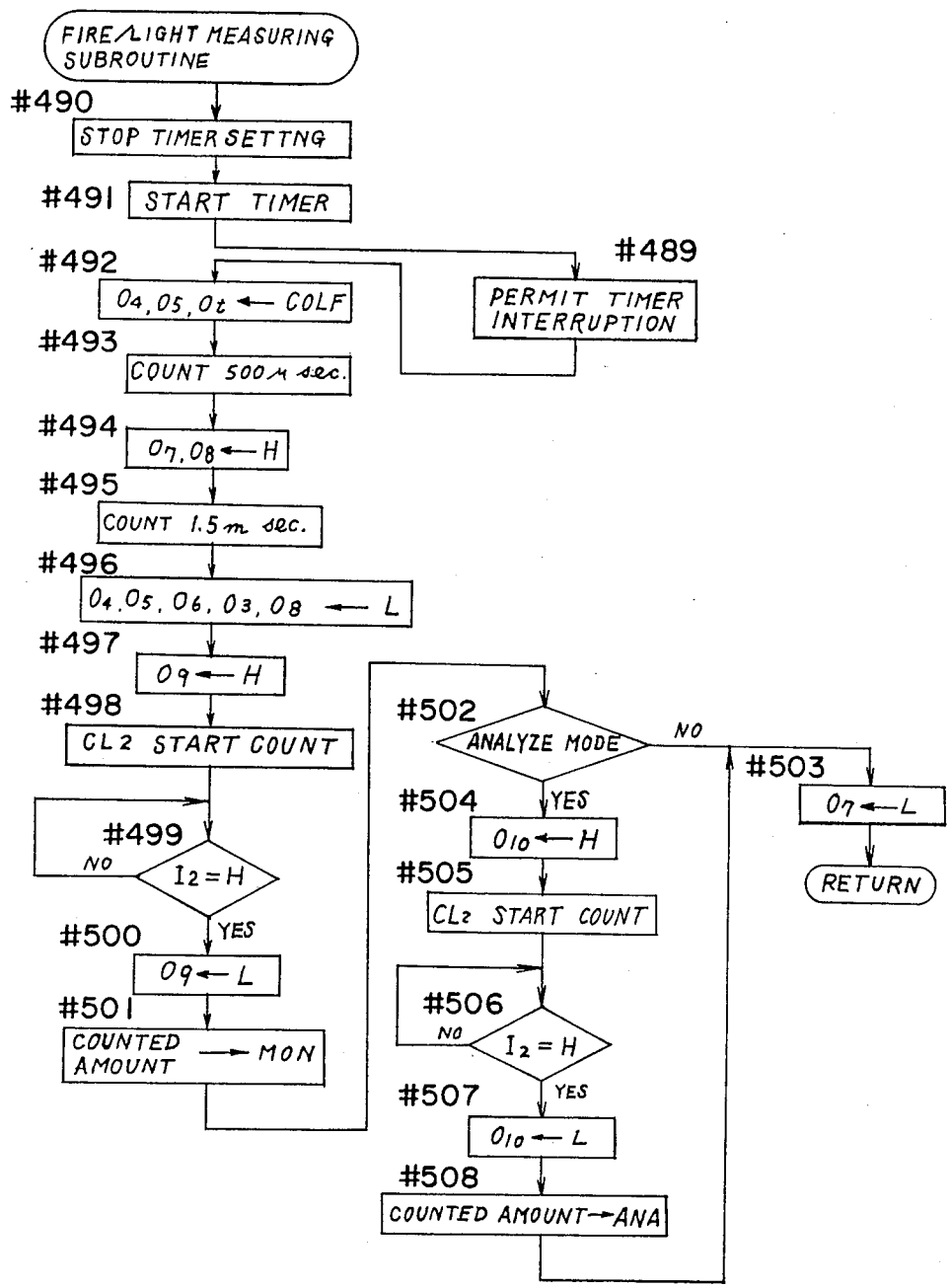
FIG. 17 is a flow chart showing firing/light measuring subroutine.

Referring to FIG. 17, a flow chart of a firing/light-measuring subroutine is shown. With reference to the flow chart shown, the operation of light measuring circuit of FIG. 4, interface circuit of FIG. 18 and light emission circuit of FIG. 21 will be described. It is to be noted that FIG. 20 shows time chart showing the operation of the firing and light-measuring. First, at step #490, a data of light emitting period corresponding to the single shot light amount F(i) is set and, thereafter, the timer starts to count the light emitting period and the timer interruption is permitted to occur at the completion of the counting by the timer. Then, the content of the register COLF is outputted through the terminals 04, 06 and 06. In FIG. 20, a case in which the terminal 06 produces "HIGH" to emit red light from the xenon tube XR, i.e., a case in which the register COLF is carrying "100" is shown.

When the terminal 06 produces "HIGH", the output RO of the NAND gate NA7 produces "LOW" (FIG. 20, waveform RO). Then, the light emitting diode LD4 emits light to turn each of photothyristor PS2 and thyristor SC2 on. Furthermore, when the terminal 06 produces "HIGH", the output of the OR gate OR7 produces "HIGH". Then, after the delay of 160 microseconds by the delay circuit DL1, the delay circuit DL1 produces "HIGH", thereby producing a positive going pulse, having a pulse width of 40 microseconds, from one-shot circuit OS2. The positive going pulse produced from the one-shot circuit is converted to negative going by a NAND gate NA4. Thus, the terminal TG produces a negative going pulse, as shown by a waveform TG in FIG. 20. In response to the negative going pulse from the terminal TG, the light emitting diode LD2 emits light, whereby trigger transformer TR triggers each of the xenon tubes XR, XG, XB and XF. Since the thyrister SC2 is in conductive state, xenon tube XR emits light. Then, by resistor R54, capacitors C52 and C38, and resistor R56, the thyristor SC10 turns to conductive state.

After the delay of 40 microseconds, which is equal to the pulse width of a pulse from the one-shot circuit OS2, the delay circuit DL2 produces "HIGH". This "HIGH" causes one-shot circuit OS3 to produce a negative going pulse having a pulse width of 1.3 msec. Accordingly, the AND gate AN3 produces "LOW" from its output (a), and the NAND gate NA8 produces "HIGH" from its output (b). Thus, the analog switches AS3 and AS6 (FIG. 4) are turned off, and the analog switches AS1 and AS4 (FIG. 4) are turned on. Thus, the voltage signals from the operational amplifiers OA1 and OA3, corresponding to the intensity of incident light into the light receiving element MPD for monitoring and the light receiving element APD for the analyze operation, respectively, are converted to current signals by the resistors R2 and R5. The current signals are used for charging capacitors C1 and C2. It is to be noted that the delay circuit DL2 is provided for holding the integration circuit inoperative, thereby preventing any noise signals from being transmitted to the integration circuit while the triggering of xenon tube is carried out.

The microcomputer MC counts 500 microseconds after the start of light emission. After the counting, the terminals 07 and 08 produce "HIGH". Accordingly, inverters IN1 and IN2 produce "LOW", and one-shot circuit OS3 produces "HIGH". But, the AND gate AN3 continues to produce "LOW" from its output (a), and the NAND circuit NA8 continues to produce "HIGH" from its output (b). Then, when a light emission period corresponding to the single shot light amount F(i) passes, the timer interruption is carried out. Thereafter, the operation of steps #1 and #2 (FIG. 5) is carried out, and then, the program returns back to the firing/light-measuring subroutine (FIG. 17). It is to be noted here that at step #2, the terminal 03 produces "HIGH". Accordingly, the OR gate OR6 produces "HIGH", and the NAND gate NA3 produces "LOW" from its output ST. Thus, the light emitting diode LD14, shown in FIG. 21, emits light, thereby turning phototransistor PT4 on, transistor BT6 on, and transistor BT8 off. Furthermore, the thyristor SC14 is turned to conductive state. Accordingly, the electric potential at the side (e) of the capacitor C52 drops below ground level and, accordingly, the thyristor SC10 turns to nonconductive state. Then, when the electric potential at the side (e) is charged to a voltage equal to that at the terminal VH, a current flowing through thyristor SC2, xenon tube XR and thyristor SC14 is cut, and accordingly, the light emission from the xenon tube XR stops.

In the flow chart of FIG. 17, terminals 07 and 08 produce "HIGH" at the step #494 and, thereafter, 1.5 msec. are counted. After counting, the terminals 03, 04, 05, 06 and 08 produce "LOW" so as to stop emitting light from the light emitting diode LD4 and, at the same time, to produce "LOW" from the terminal (b). Then, the analog switches AS1 and AS4 are turned off and the integration by the capacitors C1 and C2 is terminated. Since the enlarger is usually used in a dark room, no integration current will flow even if there is a short period of time between when the light emission stops and when the analog switches AS1 and AS4 are turned completely off. Thus, there will be no change in the integrated value. In the case where the light receiving elements or other elements have an undesirable leakage current, even if the enlarger is located in the dark room, a variation caused by such a leakage current can be corrected by the steps of: integrating the leakage current in the capacitors C1 and C2 while the xenon tubes are not emitting any light in the firing/light-measuring subroutine; taking an A-D conversion of the integrated value through a method described later; and subtracting the A-D converted value of leakage current from the A-D converted value of the charge for firing the xenon tube.

Referring to FIG. 17, the terminal 09 produces "HIGH" at step #497, thereby turning the analog switches AS2 and AS7 on. Thus, the microcomputer MC starts counting the clock pulses applied to its terminal CL2 from the oscillator OSC1 through the NOR gate NR1. Thereafter, it is waited until the comparator AC produces "HIGH", which is applied to the input I2 of the microcomputer MC. As shown in FIG. 4, the capacitor C1 is charged in a reverse direction by a constant current defined by a constant voltage source CE and a register R3. Thus, the output voltage of the operational amplifier OA2 gradually decreases, and when it is dropped down to ground level, the comparator AC produces "HIGH", thereby maintaining the output of the NOR gate NR1 "LOW". When it is determined that the terminal I2 of the microcomputer MC receives "HIGH" from the comparator AC, the terminal 09 produces "LOW", thereby turning the analog switches AS2 and AS7 off. Then, the counted number of clock pulses applied to the terminal CL2 is used as an A-D converted value MON representing the amount light received by the light receiving element of the monitor unit. Thereafter, the program advances to step #502.

At step #502, it is determined whether or not this subroutine is carried out while carrying out the operation of analyze mode. If this subroutine is carried out while carrying out the operation of analyze mode, the program advances to step #504. But, if this subroutine is carried out while carrying out the operation of exposure mode, the program advances to step #503. Furthermore, during the operation of exposure mode, it is not necessary to carry out the A-D conversion of amount of light received by the analyzer portion. Thus, the output 07 produces "LOW", thereby producing "HIGH" from the output (a) of the AND gate AN3 (FIG. 18). Thus, the analog switches AS3 and AS6 (FIG. 4) turn on to reset capacitors C1 and C2. Thereafter, the program goes to step #398 shown in FIG. 16(b).

Contrary, if the mode is analyze mode, the terminal 010 produces "HIGH", thereby turning the analog switches AS5 and AS8 (FIG. 4) on. Thus, the microcomputer MC starts counting the clock pulses applied to its terminal CL2 from the oscillator OSC1 through the NOR gate NR1. Thereafter, it is waited until the comparator AC produces "HIGH", which is applied to the input I2 of the microcomputer MC. As shown in FIG. 4, the capacitor C2 is charged in a reverse direction by a constant current defined by the constant voltage source CE and register R3. Thus, the output voltage of the operational amplifier OA4 gradually decreases, and when it is dropped down to ground level, the comparator AC produces "HIGH", thereby transmitting no more pulses through the NOR gate NR1. When it is determined that the terminal I2 of the microcomputer MC receives "HIGH" from the comparator AC, the terminal 010 produces "LOW", thereby turning the analog switches AS5 and AS8 off. Then, the counted number of clock pulses applied to the terminal CL2 is used as an analyze data ANA. Thereafter, the program advances to step #503 in which the terminal 07 produces "LOW", thereby producing "HIGH" from the terminal (a). Then, the analog switches AS3 and AS6 are turned on and, thereafter, the program returns to step #338 or #328 of the analyze light-measuring subroutine, shown in FIG. 15.

Although the above description is particularly directed to a case of exposuring red light wherein the xenon tube XR emits light when the content of the register COLF is "100". The same can be said to a case of exposure green light and blue light. More particularly, when the content of the register COLF is "010", the terminal 05 produces "HIGH" and, accordingly, the OR gates OR7 and OR8 produce "HIGH". Thus, the xenon tube XG emit light. Furthermore, when the content of the register COLF is "001", the terminal 04 produces "HIGH", thereby producing "LOW" from the terminal (BO). Thus, the terminal TG produces "LOW", effecting emission of light from the xenon tube XB.

Next, the modifications of the embodiment described above will be described.

In FIG. 1, the lighting control 3 is not necessarily be provided inside the exposure head 2, but can be provided, e.g., inside the power unit VSU or inside the control box COB. When such a modification is employed, the xenon tubes XR, XG, XB and XF provided in the exposure head 2 can be electrically connected with the lighting control 3 through a suitable connecting line extending therebetween. With this arrangement, the exposure head 2 can be made compact in size.

In FIG. 2, the color key COK is provided for shifting the data from one color to another, and the operator selects his desired color by releasing his finger from the color key COK when shifted to the required color. Instead of providing the color key COK, it is possible to provide one key for one color. In this manner, the operator can select his desired color immediately by depressing a key corresponding to the requested color. Also, in place of the right key RIK and left key LEK, it is possible to provide a conventional so-called "ten-key" type data input board, so that the operator may immediately input his required value by operating the ten-key board.

Furthermore, in addition to the display described above for displaying modified values, it is possible to provide an auxiliary display for displaying original data. Thus, the operator can see the amount of modification he has given. Instead of displaying the original data, the auxiliary display can be so designed as to display the modified amount.

Moreover, the display panel can be so arranged as to display the original data even during the ring mode.

Also, it is possible to provide an indicator for indicating which one of ring mode, manual setting, memory mode, and analyze start operation is the displayed data representing. Also, the display for the memory data, display for the exposure value data and display for the ring data can be provided separately.

In FIG. 14, it is described that when the memory key MEK is depressed while focusing, the lighting for illumination stops to carry out the program of FIG. 7 and, thereafter, the program returns back to step #25 of FIG. 5. Instead, it is possible to arrange in such a manner that when the memory key MEK is depressed, the program of FIG. 8 is carried out without stopping the illumination for focusing and, thereafter, the program returns back to step #251 of FIG. 14. When this modification is employed, it is possible to automatically set the average of a plurality of data optionally selected among exposure value data calculated using the memory data stored in the memory channel 1, exposure value data calculated using the memory data stored in the memory channel 2 and exposure value data calculated using the memory data stored in the memory channel 3.

In this way, it is very simple to set an average between a data obtained through the spot light measuring and a data obtained through the light measuring using diffusion plate.

An example of operation for the above modification is given. It is assumed that in the memory channel 1, memory data of measurement of human skin portion is stored, and in the memory channel 2, memory data of measurement obtained by positioning the diffusion plate below the projection lens LE is stored. Then, the analyze key ANK and average key AVK are depressed simultaneously to permit the calculation of average. Next, the memory channel 1 is selected using the memory key MEK and, under this condition, the analyze key ANK and start/stop key STK are depressed simultaneously while the light receiver is so located as to receive light at a portion of the human skin, thereby obtaining the exposure value data at that portion. Then, memory channel 2 is selected using the memory key MEK and, under this condition, the analyze key ANK and start/stop key STK are depressed simultaneously while placing the diffusion plate immediately below the projection lens LE, thereby obtaining exposure value data of diffused light, representing the average brightness and color of the image. Then, when the average key AVK is depressed, an average between the exposure value data obtained through the spot measurement of the human skin portion and the exposure value data obtained using the diffusion plate is automatically obtained.

Another example is given. In the memory channel 1, memory data representing the skin color of a white people is stored, and in the memory channel 2, memory data representing the skin color of a black people is stored. Then, when printing a picture with both black and white people, it is possible to obtain automatically an average between the exposure value data based on the skin color of white people and the exposure value data based on the skin color of black people.

As has been described fully above, the enlarger according to the present invention has setting portion for setting various data of exposure values for blue, green and red exposuring lights, and exposure control means having means for controlling the start and stop of the exposuring operation, which are located separately from the exposure head, with a suitable electric connecting means extending between the exposure head and exposure control means. Thus, all the operation necessary for the exposure control for burning, including analyze operation, can be carried out on the plain for placing the photographic paper. Thus, the enlarger of the present invention has a simple operability and many functions.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A color enlarger for use in photography capable of printing a color copy from a color original film comprising:

means for separately generating a plurality of source lights corresponding to a plurality of primary colors;

means for separately picking-up the plurality of source lights to monitor the light generation from said generating means and producing a generated color signal;

means for providing a color data signal representative of a color to be reproduced on the color copy;

means for separately measuring, prior to printing the color copy, the plurality of source lights transmitted through the color original film and producing a measured color signal;

means for separately calculating, prior to printing the color copy, the whole light quantities for the plurality of source lights to be generated upon printing the color copy, in response to the color signal, the color data signal and the measured color signal; and means for controlling said generating means upon printing the color copy in automatic response to said calculating means.

2. The color enlarger according to claim 1, further comprising means for setting the whole light quantities for the plurality of source lights to be generated upon printing the color copy, respectively, wherein said controlling means is further responsive to said manually setting means in place of said calculating means.

3. The color enlarger according to claim 2, wherein said providing means includes means for calculating the color data in response to said picking-up means, said measuring means and said light quantity setting means.

4. The color enlarger according to claim 1, wherein said providing means includes means for setting the color data.

5. The color enlarger according to claim 1 further comprising an exposure head casing for containing said generating means and picking-up means, and means for connecting said casing to said light quantity calculating means and said controlling means.

6. The color enlarger according to claim 5, further comprising means for connecting said measuring means to said light quantity calculating means.

7. The color enlarger according to claim 1, wherein said controlling means includes means for manually starting the printing of the color copy.

8. The color enlarger according to claim 1, further comprising means, responsive to said picking-up means and said calculating means, for estimating a ratio of the actually monitored light quantity to the whole light quantity to be generated upon printing the color copy during the generation of the source light, with respect to each of the source lights, respectively, wherein said controlling means includes means, connected to said generating means, for dividedly firing the whole source light unit by unit with respect to each of the source lights, respectively, so that the firings of the unit of source lights time-sharedly occur in a mixed order, the amount of the unit of the source light being determined in accordance with said whole light quantity with respect to each of the source lights, respectively, and means, responsive to said estimating means, for governing said firing means to unify the ratios for the respective source lights on the way from the initiation to the termination of generating the whole source lights.

9. The color enlarger according to claim 1, further comprising means for selecting between a first and a second modes of exposing the color copy to the source lights transmitted through the original film, wherein said controlling means includes means, connected to said generating means, for dividedly firing the whole source light unit by unit with respect to each of the source lights, respectively, so that the firings of the unit of source lights time-sharedly occur in a mixed order, and means for determining the amount of the unit of the source light at a first value in accordance with the whole light quantity in said first mode and at a second value less than the first value in said second mode, with respect to each of the source lights.

10. The color enlarger according to claim 1 further comprising means for selecting between a first and a second modes of exposing the color copy to the source lights transmitted through the original film, wherein said controlling means includes means for advancing the generation of the plurality of source lights in accordance with said whole light quantities, and means responsive to said selecting means for governing said advancing means so that the advancement of all the plurality of source lights occurs in a substantially parallel manner in said first mode and that the advancement of an optionally chosen one of the plurality of source lights is only extracted in said second mode.

11. A color enlarger for use in photography capable of printing a color copy from a color original film comprising:

means for separately generating a plurality of source lights corresponding to a plurality of primary colors;

means for separately picking-up the plurality of source lights to monitor the light generation from said generating means;

means for separately producing a plurality of exposure data representative of the whole light quantities for the plurality of source lights to be generated upon printing the color copy, respectively;

means, responsive to said picking-up means and said producing means, for estimating a ratio of the actually monitored light quantity to the whole light quantity represented by the exposure data during the generation of the source light, with respect to each of the source lights, respectively, before the termination of generating the whole source lights represented by the exposure data;

means, connected to said generating means, for dividedly firing the whole source light unit by unit with respect to each of the source lights, respectively, so that the firings of the unit of source lights time-sharedly occur in a mixed order, the amount of the unit of the source light being determined in accordance with said producing means; and means, responsive to the ratios from said estimating means, for governing said firing means to unify the ratios for the respective source lights during the period of time from the initiation to the termination of generating the whole source lights represented by the exposure data.

12. The color enlarger according to claim 11, wherein said governing means includes means for always unifying the ratios throughout the generation of the whole source lights.

13. The color enlarger according to claim 12, wherein said unifying means includes means for examining the relation among the ratios, and means responsive to said examining means for separately amending the advancement of firing the source lights when the ratio for at least one of the source lights differs from that of the other source lights.

14. The color enlarger according to claim 13, wherein said amending means includes means for altering the amount of the unit of source light in response to said examining means.

15. The color enlarger according to claim 11, further comprising means for interrupting the generation of the source lights prior to the termination thereof, wherein said governing means includes means for unifying the ratios at the stage when the generation of the source lights are interrupted.

16. The color enlarger according to claim 15, wherein said unifying means includes means, responsive to said estimating means and said interrupting means, for stopping the generation of the source light having the maximum ratio upon the interruption by said interrupting means, means for examining the relation among the ratios, and means for separately continuing the firing of the other source lights until the ratios thereof each coincide with the maximum ratio, respectively.

17. The color enlarger according to claim 16, wherein said unifying means further includes means for reducing the amount of the unit of the source light in response to said interrupting means to improve the accuracy of coincidence among the ratios.

18. A color enlarger for use in photography capable of printing a color copy from a color original comprising:

means for separately generating a plurality of source lights corresponding to a plurality of primary colors;

means for selecting between a first and a second mode of exposing the color copy to the source lights transmitted through the original color film;

means for separately producing a plurality of exposure data representative of the whole light quantities for the plurality of source lights to be generated upon printing the color copy, respectively;

means connected to said generating means, for dividedly firing the whole source light unit by unit with respect to each of the source lights, respectively, so that the firings of the unit of source lights time-sharedly occur in a mixed order; and means for determining the amount of the unit of the source light at a first value in accordance with the exposure data generated by said producing means in said first mode and at a second value less than the first value in said second mode, with respect to each of the source lights.

19. A color enlarger for use in photography capable of printing a color copy from a color original film comprising:

means for separately generating a plurality of source lights corresponding to a plurality of primary colors;

means for selecting between first and second modes of exposing the color copy to the source lights transmitted through the original color film;

means for separately producing a plurality of exposure data representative of the whole light quantities for the plurality of source lights to be generated upon printing the color copy, respectively;

means for actuating the generation of the plurality of source lights in accordance with said producing means;

means responsive to said selecting means for governing said actuating means so that the actuation of generation of all the plurality of source lights occur in a substantially parallel manner in said first mode and so that the generation of a selected one of the plurality of source lights is advanced with the generation of the remaining source lights suspended in said second mode.

20. The color enlarger according to claim 19, wherein said actuating means includes means connected to said generating means, for dividedly firing the source lights, respectively, so that the firings of the unit of source lights occur serially, and means for determining the amount of the unit of the source light in accordance with said producing means, and wherein said governing means includes means for time-sharing the occurrence of firings of the unit of source lights in a mixed order in said first mode, and means for causing a succession of firings of only the unit of the selected one source light in said second mode.

21. The color enlarger according to claim 20, further comprising means for reducing the amount of unit of the chosen one source light in said second mode.

22. A color enlarger for use in photography capable of printing a color copy from a color original film comprising:
- means for separately generating a plurality of source lights corresponding to a plurality of primary colors;
- means for separately picking-up the plurality of source lights to monitor the light generation from said generating means;
- means for separately producing a plurality of exposure data representative of the whole light quantities for the plurality of source lights to be generated upon printing the color copy, respectively;
- means, connected to said generating means, for advancing the generation of all the plurality of source lights in a substantially parallel manner;
- means, responsive to said picking-up means and said producing means, for governing said advancing means to unify a ratio of the actually monitored light quantity to the whole light quantity represented by the exposure data among all the plurality of source lights, on the way from the initiation to the termination of generating the whole source lights represented by the exposure data.

23. The color enlarger according to claim 22, wherein said advancing means includes means connected to said generating means, for dividedly firing the source light unit by unit with respect to each of the source lights, respectively, so that the firings of the unit of source lights occur serially, and means for determining the amount of the unit of the source light in accordance with said providing means, and wherein said governing means includes means for time-sharing the occurrence of firings of the unit of source lights in a mixed order.

24. A color enlarger for use in photography capable of printing a color copy from a color original film comprising:
- means for separately generating a plurality of source lights corresponding to a plurality of primary colors;
- means for separately picking-up the plurality of source lights to monitor the light generation from said generating means;
- means for separately producing a plurality of exposure data representative of the whole light quantities for the plurality of source lights to be generated upon printing the color copy, respectively;
- means, responsive to said picking-up means and said producing means, for estimating a ratio of the actually monitored light quantity to the whole light quantity represented by the exposure data during the generation of the source light, with respect to each of the source lights, respectively before the termination of generating the whole source lights represented by the exposure data;
- means for interrupting the generation of the source lights prior to the termination thereof; and
- means responsive to the ratios from said estimating means, for governing said firing means to unify the ratios for the respective source lights at the state when the generation of the source lights are interrupted.

25. An enlarger for use in photography capable of printing a copy from an original film comprising;
- means for generating a source light;
- means for selecting between first and second modes of exposing the copy to the source light transmitted through the original film;
- means for producing an exposure data representative of the whole light quantities for the light source to be generated upon printing the copy; and
- means for automatically controlling said generating means upon printing the copy in accordance with said exposure data, including means for determining the rate of advancing the generation of the whole light quantity at a first rate in accordance with said providing means in said first mode and at a second rated slower than the first rate in said second mode.

* * * * *